US010917624B2

(12) United States Patent
Otsuka et al.

(10) Patent No.: US 10,917,624 B2
(45) Date of Patent: Feb. 9, 2021

(54) RECEPTION DEVICE, DISPLAY CONTROL METHOD, TRANSMISSION DEVICE, AND TRANSMISSION METHOD FOR PROGRAM CONTENT TYPE

(75) Inventors: Satoshi Otsuka, Hitachi (JP); Sadao Tsuruga, Yokohama (JP)

(73) Assignee: MAXELL, LTD., Kyoto (JP)

( * ) Notice: Subject to any disclaimer, the term of this patent is extended or adjusted under 35 U.S.C. 154(b) by 205 days.

(21) Appl. No.: 13/699,775

(22) PCT Filed: Mar. 28, 2011

(86) PCT No.: PCT/JP2011/001800
§ 371 (c)(1),
(2), (4) Date: Apr. 5, 2013

(87) PCT Pub. No.: WO2011/151959
PCT Pub. Date: Dec. 8, 2011

(65) Prior Publication Data
US 2013/0182067 A1 Jul. 18, 2013

(30) Foreign Application Priority Data

Jun. 2, 2010 (JP) ................. 2010-126444
Jun. 2, 2010 (JP) ................. 2010-126445
Jun. 14, 2010 (JP) ................. 2010-134652

(51) Int. Cl.
*H04N 13/00* (2018.01)
*H04N 13/178* (2018.01)
(Continued)

(52) U.S. Cl.
CPC ......... *H04N 13/178* (2018.05); *H04N 13/106* (2018.05); *H04N 13/139* (2018.05);
(Continued)

(58) Field of Classification Search
CPC ............. H04N 21/816; H04N 13/0007; H04N 21/4345; H04N 21/4821; H04N 13/0059
(Continued)

(56) References Cited

U.S. PATENT DOCUMENTS 6,925,250 B1  8/2005  Oshima et al.
8,111,758 B2  2/2012  Yun et al.
(Continued)

FOREIGN PATENT DOCUMENTS

CN  1882106 A  12/2006
JP  7-274216  10/1995
(Continued)

OTHER PUBLICATIONS

JP Office Action for Japanese Application No. 2012-223803, dated Sep. 10, 2013.
(Continued)

*Primary Examiner* — Joon Kwon
(74) *Attorney, Agent, or Firm* — Mattingly & Malur, PC

(57) ABSTRACT

Previously, users could not be notified when the 3D mode type of a program being received by a digital broadcast receiver was not compatible with the digital broadcast receiver. A reception device is provided with: a reception unit which receives program content including video information and identification information including information for distinguishing whether the program content is 2D program content or 3D program content; and a display control unit which controls the display so as to display whether the aforementioned program content is 2D program content or 3D program content in response to the received aforementioned identification information.

20 Claims, 47 Drawing Sheets

(51) Int. Cl.
  *H04N 13/106* (2018.01)
  *H04N 13/139* (2018.01)
  *H04N 13/194* (2018.01)
  *H04N 13/359* (2018.01)
  *H04N 21/434* (2011.01)
  *H04N 21/81* (2011.01)
  *H04N 21/482* (2011.01)

(52) U.S. Cl.
  CPC ......... *H04N 13/194* (2018.05); *H04N 13/359* (2018.05); *H04N 21/4345* (2013.01); *H04N 21/4821* (2013.01); *H04N 21/816* (2013.01)

(58) Field of Classification Search
  USPC .......................................................... 348/42
  See application file for complete search history.

(56) References Cited

U.S. PATENT DOCUMENTS

| | | | |
|---|---|---|---|
| 2004/0120396 | A1 | 6/2004 | Yun et al. |
| 2006/0279750 | A1 | 12/2006 | Ha |
| 2007/0008575 | A1 | 1/2007 | Yu et al. |
| 2008/0303832 | A1* | 12/2008 | Kim et al. .................... 345/501 |
| 2009/0103833 | A1 | 4/2009 | Mitsuhashi et al. |
| 2010/0021141 | A1* | 1/2010 | Yamashita et al. ........... 386/109 |
| 2010/0182404 | A1 | 7/2010 | Kuno |
| 2011/0023066 | A1* | 1/2011 | Jang .................... H04N 13/0048 725/54 |
| 2011/0050853 | A1* | 3/2011 | Zhang .................. H04N 13/261 348/44 |
| 2011/0058016 | A1* | 3/2011 | Hulyalkar ............ H04N 19/597 348/42 |
| 2011/0078737 | A1* | 3/2011 | Kanemaru ......... H04N 13/0059 725/40 |
| 2011/0090304 | A1* | 4/2011 | Song .................... H04N 21/816 348/42 |
| 2011/0149036 | A1* | 6/2011 | Suh .................... H04N 13/0066 348/43 |
| 2011/0292177 | A1* | 12/2011 | Sakurai et al. ................. 348/44 |
| 2013/0081087 | A1* | 3/2013 | Lee .................... H04N 13/0059 725/54 |
| 2013/0127990 | A1* | 5/2013 | Lin et al. ........................ 348/43 |

FOREIGN PATENT DOCUMENTS

| | | |
|---|---|---|
| JP | 11-191895 | 7/1999 |
| JP | 2001-333345 | 11/2001 |
| JP | 2003-9033 | 1/2003 |
| JP | 2003-333624 | 11/2003 |
| JP | 2005-6114 | 1/2005 |
| JP | 2005006114 A * | 1/2005 |
| JP | 2005-510187 | 4/2005 |
| JP | 2006121553 A | 5/2006 |
| JP | 2006-352876 | 12/2006 |
| JP | 4399677 | 11/2009 |
| WO | WO 2007/148434 A1 | 12/2007 |
| WO | WO 2010/064448 A1 | 6/2010 |

OTHER PUBLICATIONS

JP Office Action for Japanese Patent Application No. 2012-161134, dated Apr. 1, 2013.
European Search Report for Application No./Patent No. 11789374.3—1908 / 2579583 PCT/JP2011001800, dated Jul. 2, 2014.
DVB Organization: "Sony 3D SIPIS Proposal for DVB GBS 18th May 2010.pdf", DVB, Digital Video Broadcasting, C/O EBU—17A Ancienne Route—CH-1218 Grand Saconnex, Geneva—Switzerland, May 18, 2010.
DVB Organization: "gbs0665—Samsung 3d_signalling proposal.pdf", DVB, Digital Video Broadcasting, C/O EBU—17A Ancienne Route—CH-1218 Grand Saconnex, Geneva Switzerland, Sep. 25, 2010.
Chinese Office Action dated Oct. 27, 2014 in Chinese Patent Application No. 201180025919.0 (Partial Translation of Office Action).

* cited by examiner

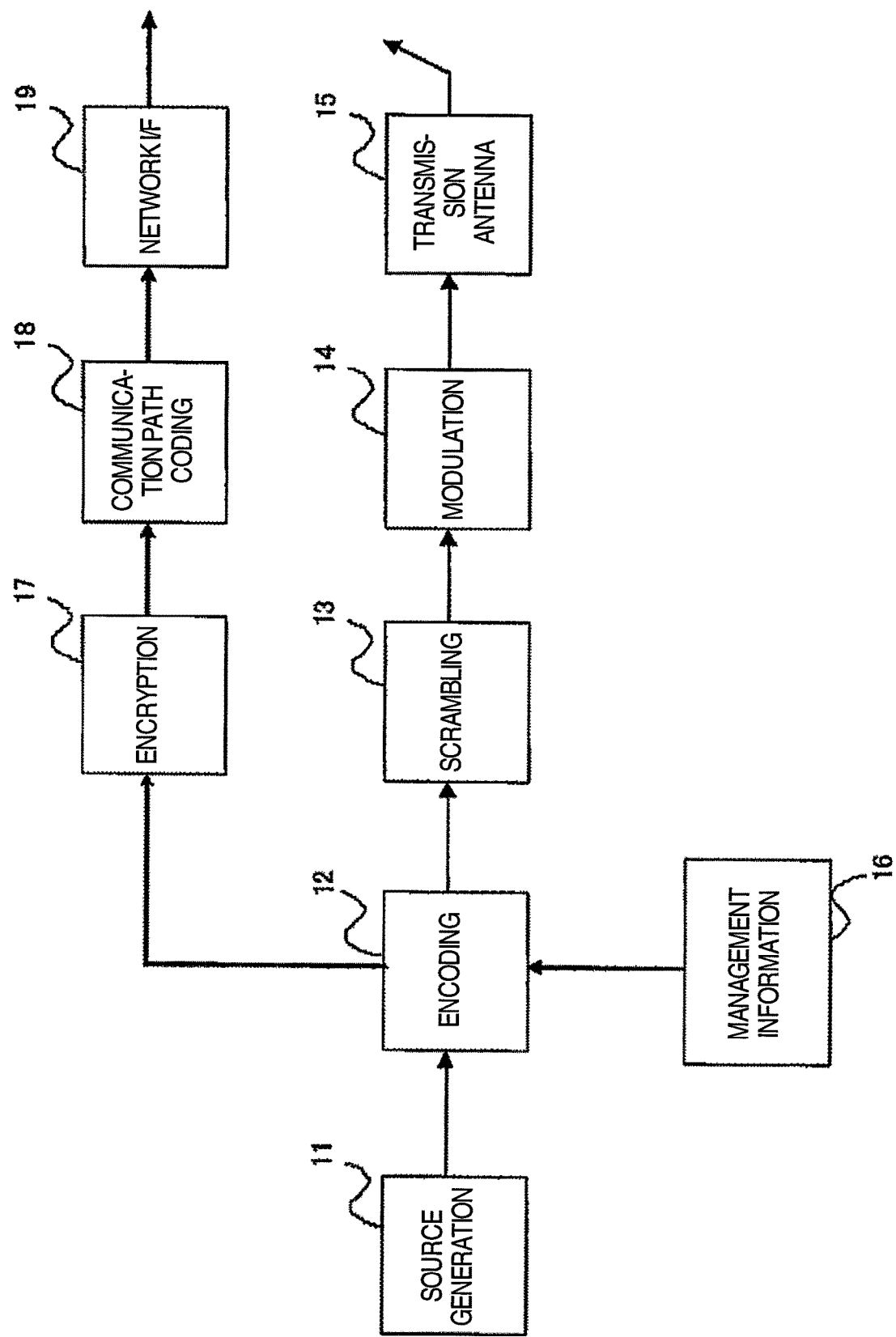

FIG. 3

ASSIGNMENT OF STREAM FORMAT TYPE

| STREAM FORMAT TYPE | MEANING |
|---|---|
| 0x00 | UNDEFINED |
| 0x01 | ISO/IEC 11172-2 VIDEO (MPEG1 VIDEO) |
| 0x02 | H.262 (MPEG2) BASE-VIEW BIT STREAM (MAIN VIEWPOINT) WHEN TRANSMITTING ITU-T RECOMMENDATION H.262 \| ISO/IEC 13818-2 VIDEO OR ISO/IEC 11172-2 CONSTRAINT PARAMETER VIDEO STREAM OR A PLURALITY OF VIEWPOINTS OF 3D VIDEO IN DIFFERENT STREAMS. |
| 0x03 | ISO/IEC 11172-3 SOUND |
| 0x04 | ISO/IEC 13818-3 SOUND |
| 0x05 | ITU-T RECOMMENDATION H.222.0 \| ISO/IEC 13818-1 PRIVATE SECTION |
| 0x06 | ITU-T RECOMMENDATION H.222.0 \| ISO/IEC 13818-1 PES PACKET ACCOMMODATING PRIVATE DATA |
| 0x08 | ITU-T RECOMMENDATION H.222.0 \| ISO/IEC 13818-1 APPENDIX A DSM-CC |
| 0x09 | ITU-T RECOMMENDATION H.222.1 |
| 0x0A | ISO/IEC 13818-6 (TYPE A) |
| 0x0B | ISO/IEC 13818-6 (TYPE B) |
| 0x0C | ISO/IEC 13818-6 (TYPE C) |
| 0x0D | ISO/IEC 13818-6 (TYPE D) (DATA CAROUSEL) |
| 0x0E | DATA TYPE DEFINED IN ITU-T RECOMMENDATION H.222.0 \| ISO/IEC 13818-1, OTHER THAN ABOVE RECOMMENDATION |
| 0x0F | ISO/IEC 13818-7 SOUND (ADTS TRANSPORT STRUCTURE) (MPEG2 AAC) |
| 0x10 | ISO/IEC 14496-2 VIDEO |
| 0x11 | ISO/IEC 14496-3 SOUND (LATM TRANSPORT STRUCTURE DEFINED IN ISO/IEC 14496-3/AMD 1) |
| 0x12 | ISO/IEC 14496-1 SL PACKETIZED STREAM OR FLEX MAX STREAM TRANSMITTED BY PES PACKET |
| 0X13 | ISO/IEC 14496-1 SL PACKETIZED STREAM OR FLEX MAX STREAM TRANSMITTED BY ISO/IEC 14496 SECTION |
| 0x14 | ISO/IEC 13818-6 SYNCHRONOUS DOWNLOAD PROTOCOL |
| 0x15 | META DATA TRANSMITTED BY PES PACKET |
| 0x16 | META DATA TRANSMITTED BY META DATA SECTION |
| 0x17 | META DATA TRANSMITTED BY ISO/IEC 13818-6 DATA CAROUSEL |
| 0x18 | META DATA TRANSMITTED BY ISO/IEC 13818-6 OBJECT CAROUSEL |
| 0x19 | META DATA TRANSMITTED BY ISO/IEC 13818-6 SYNCHRONOUS DOWNLOAD PROTOCOL |
| 0x1A | IPMP STREAM (MPEG-2 IPMP DEFINED IN ISO/IEC 13818-11) |
| 0x1B | AVC VIDEO STREAM DEFINED IN ITU-T RECOMMENDATION H.264 \| ISO/IEC 14496-10 VIDEO OR BASE-VIEW SUBBIT STREAM OF MULTI-VIEWPOINT VIDEO CODING (E.G., H.264/MVC) STREAM (MAIN VIEWPOINT) |
| 0x1C | ISO/IEC 14496-3 SOUND (USING NO ADDITIONAL TRANSPORT STRUCTURE SUCH AS DST, ALS, SLS) |
| 0x1D | ISO/IEC 14496-17 TEXT |
| 0x1E | AUXILIARY VIDEO STREAM DEFINED IN ISO/IEC 23002-3 |
| 0x1F | SCALABLE VIDEO CODING (E.G., H.264/SVC) STREAM |
| 0x20 | SUBBIT STREAM OF MULTI-VIEWPOINT VIDEO CODING (E.G., H.264/MVC) STREAM (OTHER VIEWPOINT) |
| 0x21 | H.262 (MPEG2) OTHER VIEWPOINT BIT STREAM WHEN TRANSMITTING A PLURALITY OF VIEWPOINTS OF 3D VIDEO IN DIFFERENT STREAMS |
| 0x22 | AVC STREAM OTHER VIEWPOINT BIT STREAM DEFINED IN ITU-T RECOMMENDATION H.264 \| ISO/IEC 14496-10 VIDEO WHEN TRANSMITTING A PLURALITY OF VIEWPOINTS OF 3D VIDEO IN DIFFERENT STREAMS |
| 0x23-0x7E | UNDEFINED |
| 0x7F | IPMP STREAM |
| 0x80-0xFF | USER REGION |

FIG. 4

COMPONENT DESCRIPTORS

| DATA STRUCTURE | NUMBER OF BITS | BIT STRING NOTATION |
|---|---|---|
| component_descriptor () { | | |
|     descriptor_tag | 8 | uimsbf |
|     descriptor_length | 8 | uimsbf |
|     reserved_future_use | 4 | bslbf |
|     stream_content | 4 | uimsbf |
|     component_type | 8 | uimsbf |
|     component_tag | 8 | uimsbf |
|     ISO_639_language_code | 24 | bslbf |
|     for (i=0;i<N;i++){ | | |
|         text_char | 8 | uimsbf |
|     } | | |
| } | | |

FIG. 5(a)

COMPONENT CONTENTS AND COMPONENT TYPE

| COMPONENT CONTENTS | COMPONENT TYPE | DESCRIPTION |
|---|---|---|
| 0x00 | 0x00 - 0xFF | RESERVED FOR FUTURE USE |
| 0x01 | 0x00 | RESERVED FOR FUTURE USE |
| 0x01 | 0x01 | VIDEO 480i (525i), ASPECT RATIO 4:3 |
| 0x01 | 0x02 | VIDEO 480i (525i), ASPECT RATIO 16:9 WITH PANVECTOR |
| 0x01 | 0x03 | VIDEO 480i (525i), ASPECT RATIO 16:9 NO PANVECTOR |
| 0x01 | 0x04 | VIDEO 480i (525i), ASPECT RATIO>16:9 |
| 0x01 | 0x05 - 0x90 | RESERVED FOR FUTURE USE |
| 0x01 | 0x91 | VIDEO 2160p, ASPECT RATIO 4:3 |
| 0x01 | 0x92 | VIDEO 2160p, ASPECT RATIO 16:9 WITH PANVECTOR |
| 0x01 | 0x93 | VIDEO 2160p, ASPECT RATIO 16:9 NO PANVECTOR |
| 0x01 | 0x94 | VIDEO 2160p, ASPECT RATIO>16:9 |
| 0x01 | 0x95 - 0xA0 | RESERVED FOR FUTURE USE |
| 0x01 | 0xA1 | VIDEO 480p (525p), ASPECT RATIO 4:3 |
| 0x01 | 0xA2 | VIDEO 480p (525p), ASPECT RATIO 16:9 WITH PANVECTOR |
| 0x01 | 0xA3 | VIDEO 480p (525p), ASPECT RATIO 16:9 NO PANVECTOR |
| 0x01 | 0xA4 | VIDEO 480p (525p), ASPECT RATIO>16:9 |
| 0x01 | 0xA5 - 0xB0 | RESERVED FOR FUTURE USE |
| 0x01 | 0xB1 | VIDEO 1080i (1125i), ASPECT RATIO 4:3 |
| 0x01 | 0xB2 | VIDEO 1080i (1125i), ASPECT RATIO 16:9 WITH PANVECTOR |
| 0x01 | 0xB3 | VIDEO 1080i (1125i), ASPECT RATIO 16:9 NO PANVECTOR |
| 0x01 | 0xB4 | VIDEO 1080i (1125i), ASPECT RATIO>16:9 |
| 0x01 | 0xB5 - 0xC0 | RESERVED FOR FUTURE USE |
| 0x01 | 0xC1 | VIDEO 720p (750p), ASPECT RATIO 4:3 |
| 0x01 | 0xC2 | VIDEO 720p (750p), ASPECT RATIO 16:9 WITH PANVECTOR |
| 0x01 | 0xC3 | VIDEO 720p (750p), ASPECT RATIO 16:9 NO PANVECTOR |
| 0x01 | 0xC4 | VIDEO 720p (750p), ASPECT RATIO>16:9 |
| 0x01 | 0xC5 - 0xD0 | RESERVED FOR FUTURE USE |
| 0x01 | 0xD1 | VIDEO 240p, ASPECT RATIO 4:3 |
| 0x01 | 0xD2 | VIDEO 240p, ASPECT RATIO 16:9 WITH PANVECTOR |
| 0x01 | 0xD3 | VIDEO 240p, ASPECT RATIO 16:9 NO PANVECTOR |
| 0x01 | 0xD4 | VIDEO 240p, ASPECT RATIO>16:9 |
| 0x01 | 0xD5 - 0xE0 | RESERVED FOR FUTURE USE |
| 0x01 | 0xE1 | VIDEO 1080p (1125p), ASPECT RATIO 4:3 |
| 0x01 | 0xE2 | VIDEO 1080p (1125p), ASPECT RATIO 16:9 WITH PANVECTOR |
| 0x01 | 0xE3 | VIDEO 1080p (1125p), ASPECT RATIO 16:9 NO PANVECTOR |
| 0x01 | 0xE4 | VIDEO 1080p (1125p), ASPECT RATIO>16:9 |
| 0x01 | 0xE5 - 0xFF | RESERVED FOR FUTURE USE |

FIG. 5(b)

COMPONENT CONTENTS AND COMPONENT TYPE

| COMPONENT CONTENTS | COMPONENT TYPE | DESCRIPTION |
|---|---|---|
| 0x05 | 0x00 | RESERVED FOR FUTURE USE |
| 0x05 | 0x01 | H.264 | MPEG-4 AVC, VIDEO 480i (525i), ASPECT RATIO 4:3 |
| 0x05 | 0x02 | H.264 | MPEG-4 AVC, VIDEO 480i (525i), ASPECT RATIO 16:9 WITH PANVECTOR |
| 0x05 | 0x03 | H.264 | MPEG-4 AVC, VIDEO 480i (525i), ASPECT RATIO 16:9 NO PANVECTOR |
| 0x05 | 0x04 | H.264 | MPEG-4 AVC, VIDEO 480i (525i), ASPECT RATIO >16:9 |
| 0x05 | 0x05 - 0x90 | RESERVED FOR FUTURE USE |
| 0x05 | 0x91 | H.264 | MPEG-4 AVC, VIDEO 2160p, ASPECT RATIO 4:3 |
| 0x05 | 0x92 | H.264 | MPEG-4 AVC, VIDEO 2160p, ASPECT RATIO 16:9 WITH PANVECTOR |
| 0x05 | 0x93 | H.264 | MPEG-4 AVC, VIDEO 2160p, ASPECT RATIO 16:9 NO PANVECTOR |
| 0x05 | 0x94 | H.264 | MPEG-4 AVC, VIDEO 2160p, ASPECT RATIO >16:9 |
| 0x05 | 0x95 - 0xA0 | RESERVED FOR FUTURE USE |
| 0x05 | 0xA1 | H.264 | MPEG-4 AVC, VIDEO 480p (525p), ASPECT RATIO 4:3 |
| 0x05 | 0xA2 | H.264 | MPEG-4 AVC, VIDEO 480p (525p), ASPECT RATIO 16:9 WITH PANVECTOR |
| 0x05 | 0xA3 | H.264 | MPEG-4 AVC, VIDEO 480p (525p), ASPECT RATIO 16:9 NO PANVECTOR |
| 0x05 | 0xA4 | H.264 | MPEG-4 AVC, VIDEO 480p (525p), ASPECT RATIO >16:9 |
| 0x05 | 0xA5 - 0xB0 | RESERVED FOR FUTURE USE |
| 0x05 | 0xB1 | H.264 | MPEG-4 AVC, VIDEO 1080i (1125i), ASPECT RATIO 4:3 |
| 0x05 | 0xB2 | H.264 | MPEG-4 AVC, VIDEO 1080i (1125i), ASPECT RATIO 16:9 WITH PANVECTOR |
| 0x05 | 0xB3 | H.264 | MPEG-4 AVC, VIDEO 1080i (1125i), ASPECT RATIO 16:9 NO PANVECTOR |
| 0x05 | 0xB4 | H.264 | MPEG-4 AVC, VIDEO 1080i (1125i), ASPECT RATIO >16:9 |
| 0x05 | 0xB5 - 0xC0 | RESERVED FOR FUTURE USE |
| 0x05 | 0xC1 | H.264 | MPEG-4 AVC, VIDEO 720p (750p), ASPECT RATIO 4:3 |
| 0x05 | 0xC2 | H.264 | MPEG-4 AVC, VIDEO 720p (750p), ASPECT RATIO 16:9 WITH PANVECTOR |
| 0x05 | 0xC3 | H.264 | MPEG-4 AVC, VIDEO 720p (750p), ASPECT RATIO 16:9 NO PANVECTOR |
| 0x05 | 0xC4 | H.264 | MPEG-4 AVC, VIDEO 720p (750p), ASPECT RATIO >16:9 |
| 0x05 | 0xC5 - 0xD0 | RESERVED FOR FUTURE USE |
| 0x05 | 0xD1 | H.264 | MPEG-4 AVC, VIDEO 240p, ASPECT RATIO 4:3 |
| 0x05 | 0xD2 | H.264 | MPEG-4 AVC, VIDEO 240p, ASPECT RATIO 16:9 WITH PANVECTOR |
| 0x05 | 0xD3 | H.264 | MPEG-4 AVC, VIDEO 240p, ASPECT RATIO 16:9 NO PANVECTOR |
| 0x05 | 0xD4 | H.264 | MPEG-4 AVC, VIDEO 240p, ASPECT RATIO >16:9 |
| 0x05 | 0xD5 - 0xE0 | RESERVED FOR FUTURE USE |
| 0x05 | 0xE1 | H.264 | MPEG-4 AVC, VIDEO 1080p (1125p), ASPECT RATIO 4:3 |
| 0x05 | 0xE2 | H.264 | MPEG-4 AVC, VIDEO 1080p (1125p), ASPECT RATIO 16:9 WITH PANVECTOR |
| 0x05 | 0xE3 | H.264 | MPEG-4 AVC, VIDEO 1080p (1125p), ASPECT RATIO 16:9 NO PANVECTOR |
| 0x05 | 0xE4 | H.264 | MPEG-4 AVC, VIDEO 1080p (1125p), ASPECT RATIO >16:9 |
| 0x05 | 0xE5 - 0xFF | RESERVED FOR FUTURE USE |

FIG. 5(c)
COMPONENT CONTENTS AND COMPONENT TYPE

| COMPONENT CONTENTS | COMPONENT TYPE | DESCRIPTION |
|---|---|---|
| 0x06 | 0x00 | RESERVED FOR FUTURE USE |
| 0x06 | 0x01 | MULTI-VIEWPOINT VIDEO CODING, VIDEO 480i (525i), ASPECT RATIO 4:3 |
| 0x06 | 0x02 | MULTI-VIEWPOINT VIDEO CODING, VIDEO 480i (525i), ASPECT RATIO 16:9 WITH PANVECTOR |
| 0x06 | 0x03 | MULTI-VIEWPOINT VIDEO CODING, VIDEO 480i (525i), ASPECT RATIO 16:9 NO PANVECTOR |
| 0x06 | 0x04 | MULTI-VIEWPOINT VIDEO CODING, VIDEO 480i (525i), ASPECT RATIO >16:9 |
| 0x06 | 0x05 – 0x90 | RESERVED FOR FUTURE USE |
| 0x06 | 0x91 | MULTI-VIEWPOINT VIDEO CODING, VIDEO 2160p, ASPECT RATIO 4:3 |
| 0x06 | 0x92 | MULTI-VIEWPOINT VIDEO CODING, VIDEO 2160p, ASPECT RATIO 16:9 WITH PANVECTOR |
| 0x06 | 0x93 | MULTI-VIEWPOINT VIDEO CODING, VIDEO 2160p, ASPECT RATIO 16:9 NO PANVECTOR |
| 0x06 | 0x94 | MULTI-VIEWPOINT VIDEO CODING, VIDEO 2160p, ASPECT RATIO >16:9 |
| 0x06 | 0x95 – 0xA0 | RESERVED FOR FUTURE USE |
| 0x06 | 0xA1 | MULTI-VIEWPOINT VIDEO CODING, VIDEO 480p (525p), ASPECT RATIO 4:3 |
| 0x06 | 0xA2 | MULTI-VIEWPOINT VIDEO CODING, VIDEO 480p (525p), ASPECT RATIO 16:9 WITH PANVECTOR |
| 0x06 | 0xA3 | MULTI-VIEWPOINT VIDEO CODING, VIDEO 480p (525p), ASPECT RATIO 16:9 NO PANVECTOR |
| 0x06 | 0xA4 | MULTI-VIEWPOINT VIDEO CODING, VIDEO 480p (525p), ASPECT RATIO >16:9 |
| 0x06 | 0xA5 – 0xB0 | RESERVED FOR FUTURE USE |
| 0x06 | 0xB1 | MULTI-VIEWPOINT VIDEO CODING, VIDEO 1080i (1125i), ASPECT RATIO 4:3 |
| 0x06 | 0xB2 | MULTI-VIEWPOINT VIDEO CODING, VIDEO 1080i (1125i), ASPECT RATIO 16:9 WITH PANVECTOR |
| 0x06 | 0xB3 | MULTI-VIEWPOINT VIDEO CODING, VIDEO 1080i (1125i), ASPECT RATIO 16:9 NO PANVECTOR |
| 0x06 | 0xB4 | MULTI-VIEWPOINT VIDEO CODING, VIDEO 1080i (1125i), ASPECT RATIO >16:9 |
| 0x06 | 0xB5 – 0xC0 | RESERVED FOR FUTURE USE |
| 0x06 | 0xC1 | MULTI-VIEWPOINT VIDEO CODING, VIDEO 720p (750p), ASPECT RATIO 4:3 |
| 0x06 | 0xC2 | MULTI-VIEWPOINT VIDEO CODING, VIDEO 720p (750p), ASPECT RATIO 16:9 WITH PANVECTOR |
| 0x06 | 0xC3 | MULTI-VIEWPOINT VIDEO CODING, VIDEO 720p (750p), ASPECT RATIO 16:9 NO PANVECTOR |
| 0x06 | 0xC4 | MULTI-VIEWPOINT VIDEO CODING, VIDEO 720p (750p), ASPECT RATIO >16:9 |
| 0x06 | 0xC5 – 0xD0 | RESERVED FOR FUTURE USE |
| 0x06 | 0xD1 | MULTI-VIEWPOINT VIDEO CODING, VIDEO 240p, ASPECT RATIO 4:3 |
| 0x06 | 0xD2 | MULTI-VIEWPOINT VIDEO CODING, VIDEO 240p, ASPECT RATIO 16:9 WITH PANVECTOR |
| 0x06 | 0xD3 | MULTI-VIEWPOINT VIDEO CODING, VIDEO 240p, ASPECT RATIO 16:9 NO PANVECTOR |
| 0x06 | 0xD4 | MULTI-VIEWPOINT VIDEO CODING, VIDEO 240p, ASPECT RATIO >16:9 |
| 0x06 | 0xD5 – 0xE0 | RESERVED FOR FUTURE USE |
| 0x06 | 0xE1 | MULTI-VIEWPOINT VIDEO CODING, VIDEO 1080p (1125p), ASPECT RATIO 4:3 |
| 0x06 | 0xE2 | MULTI-VIEWPOINT VIDEO CODING, VIDEO 1080p (1125p), ASPECT RATIO 16:9 WITH PANVECTOR |
| 0x06 | 0xE3 | MULTI-VIEWPOINT VIDEO CODING, VIDEO 1080p (1125p), ASPECT RATIO 16:9 NO PANVECTOR |
| 0x06 | 0xE4 | MULTI-VIEWPOINT VIDEO CODING, VIDEO 1080p (1125p), ASPECT RATIO >16:9 |
| 0x06 | 0xE5 – 0xFF | RESERVED FOR FUTURE USE |

FIG. 5(d)

COMPONENT CONTENTS AND COMPONENT TYPE

| COMPONENT CONTENTS | COMPONENT TYPE | DESCRIPTION |
|---|---|---|
| 0x07 | 0x00 | RESERVED FOR FUTURE USE |
| 0x07 | 0x01 | 3D VIDEO side-by-side 720p ASPECT RATIO 4:3 |
| 0x07 | 0x02 | 3D VIDEO side-by-side 720p, ASPECT RATIO 16:9 WITH PANVECTOR |
| 0x07 | 0x03 | 3D VIDEO side-by-side 720p, ASPECT RATIO 16:9 NO PANVECTOR |
| 0x07 | 0x04 | 3D VIDEO side-by-side 720p, ASPECT RATIO >16:9 |
| 0x07 | 0x05 -0x90 | RESERVED FOR FUTURE USE |
| 0x07 | 0x91 | 3D VIDEO side-by-side 1080i ASPECT RATIO 4:3 |
| 0x07 | 0x92 | 3D VIDEO side-by-side 1080i, ASPECT RATIO 16:9 WITH PANVECTOR |
| 0x07 | 0x93 | 3D VIDEO side-by-side 1080i, ASPECT RATIO 16:9 NO PANVECTOR |
| 0x07 | 0x94 | 3D VIDEO side-by-side 1080i, ASPECT RATIO >16:9 |
| 0x07 | 0x95 - 0xA0 | RESERVED FOR FUTURE USE |
| 0x07 | 0xA1 | 3D VIDEO side-by-side 1080p ASPECT RATIO 4:3 |
| 0x07 | 0xA2 | 3D VIDEO side-by-side 1080p, ASPECT RATIO 16:9 WITH PANVECTOR |
| 0x07 | 0xA3 | 3D VIDEO side-by-side 1080p, ASPECT RATIO 16:9 NO PANVECTOR |
| 0x07 | 0xA4 | 3D VIDEO side-by-side 1080p, ASPECT RATIO >16:9 |
| 0x07 | 0xA5 - 0xFF | RESERVED FOR FUTURE USE |

FIG. 5(e)

COMPONENT CONTENTS AND COMPONENT TYPE

| COMPONENT CONTENTS | COMPONENT TYPE | DESCRIPTION |
|---|---|---|
| 0x08 | 0x00 | RESERVED FOR FUTURE USE |
| 0x08 | 0x01 | 3D VIDEO top-and-bottom 720p, ASPECT RATIO 4:3 |
| 0x08 | 0x02 | 3D VIDEO top-and-bottom 720p, ASPECT RATIO 16:9 WITH PANVECTOR |
| 0x08 | 0x03 | 3D VIDEO top-and-bottom 720p, ASPECT RATIO 16:9 NO PANVECTOR |
| 0x08 | 0x04 | 3D VIDEO top-and-bottom 720p, ASPECT RATIO >16:9 |
| 0x08 | 0x05 - 0x90 | RESERVED FOR FUTURE USE |
| 0x08 | 0x91 | 3D VIDEO top-and-bottom 1080i, ASPECT RATIO 4:3 |
| 0x08 | 0x92 | 3D VIDEO top-and-bottom 1080i, ASPECT RATIO 16:9 WITH PANVECTOR |
| 0x08 | 0x93 | 3D VIDEO top-and-bottom 1080i, ASPECT RATIO 16:9 NO PANVECTOR |
| 0x08 | 0x94 | 3D VIDEO top-and-bottom 1080i, ASPECT RATIO >16:9 |
| 0x08 | 0x95 - 0xA0 | RESERVED FOR FUTURE USE |
| 0x08 | 0xA1 | 3D VIDEO top-and-bottom 1080p, ASPECT RATIO 4:3 |
| 0x08 | 0xA2 | 3D VIDEO top-and-bottom 1080p, ASPECT RATIO 16:9 WITH PANVECTOR |
| 0x08 | 0xA3 | 3D VIDEO top-and-bottom 1080p, ASPECT RATIO 16:9 NO PANVECTOR |
| 0x08 | 0xA4 | 3D VIDEO top-and-bottom 1080p, ASPECT RATIO >16:9 |
| 0x08 | 0xA5 - 0xFF | RESERVED FOR FUTURE USE |
| 0x09 - 0x0B | 0x00 - 0xFF | RESERVED FOR FUTURE USE |
| 0x0C - 0x0F | 0x00 - 0xFF | DEFINED BY PROVIDER |

FIG. 6
COMPONENT GROUP DESCRIPTOR

| DATA STRUCTURE | NUMBER OF BITS | BIT STRING NOTATION |
|---|---|---|
| component_group_descriptor () { | | |
|     descriptor_tag | 8 | uimsbf |
|     descriptor_length | 8 | uimsbf |
|     component_group_type | 3 | uimsbf |
|     total_bit_rate_flag | 1 | uimsbf |
|     num_of_group | 4 | uimsbf |
|     for(i=0; i< num_of_group; i++){ | | |
|         component_group_id | 4 | uimsbf |
|         num_of_CA_unit | 4 | uimsbf |
|         for(i=0; i< num_of_CA_unit; i++){ | | |
|             CA_unit_id | 4 | uimsbf |
|             num_of_component | 4 | uimsbf |
|             for(i=0; i< num_of_component; i++){ | | |
|                 component_tag | 8 | uimsbf |
|             } | | |
|         } | | |
|         if(total_bit_rate_flag==1){ | | |
|             total_bit_rate | 8 | uimsbf |
|         } | | |
|         text_length | 8 | uimsbf |
|         for(i=0; i< text_length; i++){ | | |
|             text_char | 8 | uimsbf |
|         } | | |
|     } | | |
| } | | |

FIG. 7
COMPONENT GROUP TYPE

| COMPONENT GROUP TYPE | DESCRIPTION |
|---|---|
| 000 | MULTI-VIEW TV SERVICE |
| 001 | 3DTV SERVICE |
| 002 - 111 | UNDEFINED |

FIG. 8
COMPONENT GROUP IDENTIFICATION

| COMPONENT GROUP IDENTIFICATION | DESCRIPTION |
|---|---|
| 0x0 | MAIN GROUP |
| 0x1 - 0xF | SUBGROUP |

FIG. 9
CHARGING UNIT IDENTIFICATION

| CHARGING UNIT IDENTIFICATION | DESCRIPTION |
|---|---|
| 0x0 | NON-CHARGING UNIT GROUP |
| 0x1 | CHARGING UNIT GROUP INCLUDING DEFAULT ES GROUP |
| 0x2 - 0xF | CHARGING UNIT GROUP OTHER THAN ABOVE |

FIG. 10(a)
3D PROGRAM DETAIL DESCRIPTOR

| DATA STRUCTURE | NUMBER OF BITS | BIT STRING NOTATION |
|---|---|---|
| 3d_encode_descriptor () { | | |
|     descriptor_tag | 8 | uimsbf |
|     descriptor_length | 8 | uimsbf |
|     3d_2d_type | 8 | uimsbf |
|     3d_method_type | 8 | uimsbf |
|     stream_type | 8 | uimsbf |
|     for(i=0;i<N;i++){ | | |
|         component_tag | 8 | uimsbf |
|     } | | |
| } | | |

FIG. 10(b)

3D/2D IDENTIFICATION

| 3D/2D IDENTIFICATION | DESCRIPTION |
|---|---|
| 0x00 | RESERVED FOR FUTURE USE |
| 0x01 | 3D VIDEO |
| 0x02 | 2D VIDEO |
| 0x03 - 0x0F | RESERVED FOR FUTURE USE |

FIG. 11

3D MODE IDENTIFICATION

| 3D MODE IDENTIFICATION | DESCRIPTION |
|---|---|
| 0x00 | RESERVED FOR FUTURE USE |
| 0x01 | 3D 2-VIEWPOINT IN RESPECTIVE ESs TRANSMISSION SCHEME |
| 0x02 | side-by-side SCHEME |
| 0x03 | top-and-bottom SCHEME |
| 0x04 - 0x0F | RESERVED FOR FUTURE USE |

FIG. 12

SERVICE DESCRIPTOR

| DATA STRUCTURE | NUMBER OF BITS | BIT STRING NOTATION |
|---|---|---|
| service_descriptor() { | | |
|     descriptor_tag | 8 | uimsbf |
|     descriptor_length | 8 | uimsbf |
|     service_type | 8 | uimsbf |
|     service_provider_name_length | 8 | uimsbf |
|     for (i=0;i<N;i++){ | | |
|         char | 8 | uimsbf |
|     } | | |
|     service_name_length | 8 | uimsbf |
|     for (i=0;i<N;i++){ | | |
|         char | 8 | uimsbf |
|     } | | |
| } | | |

FIG. 13

SERVICE FORMAT TYPE

| SERVICE FORMAT TYPE | MEANING |
|---|---|
| 0x00 | UNDEFINED |
| 0x01 | DIGITAL TV SERVICE |
| 0x02 | DIGITAL SOUND SERVICE |
| 0x03 - 0x10 | UNDEFINED |
| 0x11 | 3D VIDEO SERVICE |
| 0x12 - 0x7F | UNDEFINED |
| 0x80 - 0xA0 | DEFINED BY PROVIDER |
| 0xA1 | TEMPORARY VIDEO SERVICE |
| 0xA2 | TEMPORARY SOUND SERVICE |
| 0xA3 | TEMPORARY DATA SERVICE |
| 0xA4 | ENGINEERING SERVICE |
| 0xA5 | PROMOTION VIDEO SERVICE |
| 0xA6 | PROMOTION SOUND SERVICE |
| 0xA7 | PROMOTION DATA SERVICE |
| 0xA8 | DATA SERVICE FOR PRE-STORAGE |
| 0xA9 | STORAGE-ONLY DATA SERVICE |
| 0xAA | BOOKMARK LIST DATA SERVICE |
| 0xAB | SERVER TYPE SIMUL-SERVICE |
| 0xAC | INDEPENDENT FILE SERVICE |
| 0xAD - 0xBF | UNDEFINED (REGION DEFINED BY STANDARDIZATION ORGANIZATION) |
| 0xC0 | DATA SERVICE |
| 0xC1 | STORAGE TYPE SERVICE USING TLV |
| 0xC2 - 0xFF | UNDEFINED |

FIG. 14

SERVICE LIST DESCRIPTOR

| DATA STRUCTURE | NUMBER OF BITS | BIT STRING NOTATION |
|---|---|---|
| service_list_descriptor ( ) { | | |
|    descriptor_tag | 8 | uimsbf |
|    descriptor_length | 8 | uimsbf |
|    for (i=0;i<N;i++){ | | |
|       service_id | 16 | uimsbf |
|       service_type | 8 | uimsbf |
|    } | | |
| } | | |

FIG. 15

EXAMPLE OF COMPONENT DESCRIPTOR TRANSMISSION PROCESSING

| | DESCRIPTION EXAMPLE OF EACH FIELD |
|---|---|
| descriptor_tag | "0x50" IS DESCRIBED |
| descriptor_length | DESCRIPTOR LENGTH OF COMPONENT DESCRIPTOR IS DESCRIBED. MAXIMUM VALUE IS NOT DEFINED. |
| stream_content | "0x01" (VIDEO) IS DESCRIBED |
| component_type | VIDEO COMPONENT TYPE OF COMPONENT IS DESCRIBED |
| component_tag | COMPONENT TAG VALUE WHICH IS UNIQUE IN PROGRAM IS DESCRIBED |
| ISO_639_language_code | "jpn ("0x6A706E")" IS DESCRIBED |
| text_char | DESCRIBED IN 16 BYTES (8 FULL SIZE CHARACTERS) OR LESS AS NAME OF VIDEO TYPE WHEN THERE ARE A PLURALITY OF VIDEO COMPONENTS. NO LINE FEED CODE IS USED. THIS FIELD IS OMISSIBLE WHEN COMPONENT DESCRIPTION IS DEFAULT CHARACTER STRING. DEFAULT CHARACTER STRING IS "VIDEO." |

FIG. 16

EXAMPLE OF COMPONENT GROUP DESCRIPTOR TRANSMISSION PROCESSING

| | DESCRIPTION EXAMPLE OF EACH FIELD |
|---|---|
| descriptor_tag | "0xD9" IS DESCRIBED |
| descriptor_length | DESCRIPTOR LENGTH OF COMPONENT GROUP DESCRIPTOR IS DESCRIBED. NO MAXIMUM VALUE IS DEFINED. |
| component_group_type | TYPE OF COMPONENT GROUP IS INDICATED. '000': MULTIVIEW TELEVISION '001': 3D TELEVISION |
| total_bit_rate_flag | = '0': TOTAL BIT RATES IN GROUP IN EVENT ARE ALL DEFAULTS = '1': ANY ONE OF TOTAL BIT RATES IN GROUP IN EVENT EXCEEDS DEFAULT |
| num_of_group | NUMBER OF COMPONENT GROUPS IN EVENT IS DESCRIBED FOR MVTV, MAXIMUM: 3 FOR 3DTV, MAXIMUM 2 |
| component_group_id | COMPONENT GROUP IDENTIFICATION IS DESCRIBED. "0x0" IS ASSIGNED TO MAIN GROUP AND VALUE IS ASSIGNED TO EACH SUBGROUP BY BROADCASTING PROVIDER SO AS TO BE UNIQUE IN EVENT. |
| num_of_CA_unit | NUMBER OF CHARGING/NON-CHARGING UNITS IN COMPONENT GROUP IS DESCRIBED. MAXIMUM VALUE IS ASSUMED TO BE 2. "0x1" IS ASSUMED WHEN NO CHARGING COMPONENT IS INCLUDED IN COMPONENT GROUP. |
| CA_unit_id | CHARGING UNIT IDENTIFICATION IS DESCRIBED. ASSIGNED BY BROADCASTING PROVIDER SO AS TO BE UNIQUE IN EVENT. |
| num_of_component | NUMBER OF COMPONENTS THAT BELONG TO COMPONENT GROUP AND BELONG TO CHARGING/NON-CHARGING UNIT INDICATED BY IMMEDIATELY PRECEDING CA_unit_id IS DESCRIBED. MAXIMUM VALUE IS ASSUMED TO BE 15. |
| component_tag | VALUE OF COMPONENT TAG THAT BELONGS TO COMPONENT GROUP IS DESCRIBED |
| total_bit_rate | TOTAL BIT RATE IN COMPONENT GROUP IS DESCRIBED. IN CASE OF DEFAULT, "0x00" IS DESCRIBED. |
| text_length | BYTE LENGTH OF SUBSEQUENT COMPONENT GROUP DESCRIPTION IS DESCRIBED. MAXIMUM VALUE IS ASSUMED TO BE 16 (8 FULL SIZE CHARACTERS). |
| text_char | DESCRIPTION RELATING TO COMPONENT GROUP MUST BE PROVIDED. DEFAULT CHARACTER STRING IS NOT DEFINED. NO LINE FEED CODE IS USED. |

FIG. 17

EXAMPLE OF 3D PROGRAM DETAIL DESCRIPTOR TRANSMISSION PROCESSING

| | DESCRIPTION EXAMPLE OF EACH FIELD |
|---|---|
| descriptor_tag | "0xE1" IS DESCRIBED |
| descriptor_length | DESCRIPTOR LENGTH OF 3D PROGRAM DETAIL DESCRIPTOR IS DESCRIBED |
| 3d_2d_type | 3D/2D IDENTIFICATION IS DESCRIBED. SET FROM FIG. 10(B). |
| 3d_method_type | 3D MODE IDENTIFICATION IS DESCRIBED. SET FROM FIG. 11. |
| stream_type | ES FORMAT OF PROGRAM IS DESCRIBED. SET FROM FIG. 3. |
| component_tag | COMPONENT TAG VALUE WHICH IS UNIQUE IN PROGRAM IS DESCRIBED |

FIG. 18

EXAMPLE OF SERVICE DESCRIPTOR TRANSMISSION PROCESSING

| | DESCRIPTION EXAMPLE OF EACH FIELD |
|---|---|
| descriptor_tag | "0x48" IS DESCRIBED |
| descriptor_length | DESCRIPTOR LENGTH OF SERVICE DESCRIPTOR IS DESCRIBED |
| service_type | SERVICE FORMAT TYPE IS DESCRIBED. SET FROM FIG. 13 |
| service_provider_name_length | FOR BS/CS DIGITAL TELEVISION BROADCASTING, PROVIDER NAME LENGTH IS DESCRIBED. MAXIMUM VALUE IS ASSUMED TO BE 20. SINCE service_provider_name IS NOT USED IN DIGITAL TERRESTRIAL TELEVISION BROADCASTING, "0x00" IS DESCRIBED. |
| char | IN BS/CS DIGITAL TELEVISION BROADCASTING, PROVIDER NAME IS DESCRIBED. MAXIMUM 10 FULL SIZE CHARACTERS. IN DIGITAL TERRESTRIAL TELEVISION BROADCASTING, NOTHING IS DESCRIBED. |
| service_name_length | ORGANIZED CHANNEL NAME LENGTH IS DESCRIBED. MAXIMUM VALUE IS ASSUMED TO BE 20. |
| char | ORGANIZED CHANNEL NAME IS DESCRIBED. WITHIN 20 BYTES AND 10 FULL SIZE CHARACTERS. |

FIG. 19

EXAMPLE OF SERVICE LIST DESCRIPTOR TRANSMISSION PROCESSING

| | DESCRIPTION EXAMPLE OF EACH FIELD |
|---|---|
| descriptor_tag | "0x41" IS DESCRIBED |
| descriptor_length | DESCRIPTOR LENGTH OF SERVICE LIST DESCRIPTOR IS DESCRIBED |
| loop | LOOP OF NUMBER OF SERVICES INCLUDED IN TARGET TRANSPORT STREAM IS DESCRIBED |
| service_id | service_id INCLUDED IN TRANSPORT STREAM IS DESCRIBED |
| service_type | SERVICE TYPE OF TARGET SERVICE IS DESCRIBED. SET FROM FIG. 3. |

FIG. 20

EXAMPLE OF COMPONENT DESCRIPTOR RECEPTION PROCESSING

| | EXAMPLE OF RECEPTION PROCESSING CORRESPONDING TO EACH FIELD |
|---|---|
| descriptor_tag | IF "0x50," DESCRIPTOR IS DECIDED TO BE COMPONENT DESCRIPTOR |
| descriptor_length | DECIDED TO BE DESCRIPTOR LENGTH OF COMPONENT DESCRIPTOR |
| stream_content | = "0x01": DECIDED TO BE VALID (VIDEO) <br> ≠ "0x01": DESCRIPTOR IS DECIDED TO BE INVALID |
| component_type | DECIDED TO BE VIDEO COMPONENT TYPE OF COMPONENT (FOR COMPONENT TYPES, SEE FIG. 5) |
| component_tag | THIS IS COMPONENT TAG VALUE WHICH IS UNIQUE IN PROGRAM AND CAN BE USED IN ASSOCIATION WITH COMPONENT TAG VALUE OF PMT STREAM IDENTIFIER |
| ISO_639_language_code | EVEN WHEN THIS IS NOT "jpn ("0x6a706E")," CHARACTER CODE ARRANGED LATER IS HANDLED AS "jpn." |
| text_char | DESCRIPTION WITHIN 16 BYTES (8 FULL SIZE CHARACTERS) IS DECIDED TO BE COMPONENT DESCRIPTION. WHEN THIS FIELD IS OMITTED, DESCRIPTION IS DECIDED TO BE DEFAULT COMPONENT DESCRIPTION. DEFAULT CHARACTER STRING IS "VIDEO." |

FIG. 21

EXAMPLE OF COMPONENT GROUP DESCRIPTOR RECEPTION PROCESSING

| EXAMPLE OF RECEPTION PROCESSING CORRESPONDING TO EACH FIELD | |
|---|---|
| descriptor_tag | = "0xD9": DESCRIPTOR IS DECIDED TO BE COMPONENT GROUP DESCRIPTOR |
| descriptor_length | DECIDED TO BE DESCRIPTOR LENGTH OF COMPONENT GROUP DESCRIPTOR |
| component_group_type | '000': DECIDED TO BE MULTIVIEW TELEVISION SERVICE<br>'001': DECIDED TO BE 3D TELEVISION SERVICE |
| total_bit_rate_flag | = '0': TOTAL BIT RATE IN GROUP IN EVENT IS DECIDED NOT TO BE DESCRIBED IN DESCRIPTOR<br>= '1': TOTAL BIT RATE IN GROUP IN EVENT IS DECIDED TO BE DESCRIBED IN DESCRIPTOR |
| num_of_group | DECIDED TO BE NUMBER OF COMPONENT GROUPS IN EVENT. WHEN MAXIMUM VALUE EXISTS AND IF NUMBER OF COMPONENT GROUPS EXCEEDS THIS, IT MAY BE PROCESSED AS MAXIMUM VALUE. |
| component_group_id | = "0x0": DECIDED TO BE MAIN GROUP<br>≠ "0x0": DECIDED TO BE SUBGROUP |
| num_of_CA_unit | DECIDED TO BE NUMBER OF CHARGING/NON-CHARGING UNITS IN COMPONENT GROUP. WHEN NUMBER OF CHARGING/NON-CHARGING UNITS EXCEEDS MAXIMUM VALUE, IT MAY BE PROCESSED AS 2. |
| CA_unit_id | "0x0": DECIDED TO BE NON-CHARGING UNIT GROUP<br>"0x1": DECIDED TO BE CHARGING UNIT INCLUDING ES GROUP.<br>OTHER VALUES: DECIDED TO BE CHARGING UNIT IDENTIFICATION OTHER THAN ABOVE |
| num_of_component | DECIDED TO BE NUMBER OF COMPONENTS THAT BELONG TO COMPONENT GROUP AND BELONG TO CHARGING/NON-CHARGING UNIT INDICATED BY IMMEDIATELY PRECEDING CA_unit_id. WHEN NUMBER OF COMPONENTS EXCEEDS MAXIMUM VALUE, IT MAY BE PROCESSED AS 15. |
| component_tag | DECIDED TO BE VALUE OF COMPONENT TAG THAT BELONGS TO COMPONENT GROUP AND CAN BE USED IN ASSOCIATION WITH COMPONENT TAG VALUE OF PMT STREAM IDENTIFIER |
| total_bit_rate | DECIDED TO BE TOTAL BIT RATE IN COMPONENT GROUP  HOWEVER,<br>IF "0x00," IT IS DECIDED TO BE DEFAULT. |
| text_length | ≤16 (8 FULL SIZE CHARACTERS): DECIDED TO BE COMPONENT GROUP DESCRIPTION LENGTH<br>>16 (8 FULL SIZE CHARACTERS): DESCRIPTIVE TEXT HAVING COMPONENT GROUP DESCRIPTION LENGTH EXCEEDING 16 (8 FULL SIZE CHARACTERS) MAY BE IGNORED. |
| text_char | INDICATES DESCRIPTIVE TEXT RELATING TO COMPONENT GROUP |

FIG. 22

EXAMPLE OF 3D PROGRAM DETAIL DESCRIPTOR RECEPTION PROCESSING

| EXAMPLE OF RECEPTION PROCESSING CORRESPONDING TO EACH FIELD ||
|---|---|
| descriptor_tag | "0xE1" IS DESCRIBED |
| descriptor_length | DESCRIPTOR LENGTH OF 3D PROGRAM DETAIL DESCRIPTOR IS DESCRIBED |
| 3d_2d_type | DECIDED TO BE 3D/2D IDENTIFICATION IN 3D PROGRAM. SPECIFIED FROM FIG. 10(b). |
| 3d_method_type | DECIDED TO BE 3D MODE IDENTIFICATION IN 3D PROGRAM. SPECIFIED FROM FIG. 11. |
| stream_type | DECIDED TO BE ES FORMAT OF 3D PROGRAM. SPECIFIED FROM FIG. 3. |
| component_tag | DECIDED TO BE COMPONENT TAG VALUE WHICH IS UNIQUE IN 3D PROGRAM. |

FIG. 23

EXAMPLE OF SERVICE DESCRIPTOR RECEPTION PROCESSING

| EXAMPLE OF RECEPTION PROCESSING CORRESPONDING TO EACH FIELD ||
|---|---|
| descriptor_tag | = "0x48": DESCRIPTOR IS DECIDED TO BE SERVICE DESCRIPTOR |
| descriptor_length | DECIDED TO BE DESCRIPTOR LENGTH OF SERVICE DESCRIPTOR |
| service_type | WHEN THIS IS OTHER THAN service_type SHOWN IN FIG. 13, DESCRIPTOR IS DECIDED TO BE INVALID |
| service_provider_name_length | BS/CS DIGITAL TELEVISION BROADCASTING: <br> ≤20: DECIDED TO BE PROVIDER NAME LENGTH <br> >20: PROVIDER NAME IS DECIDED TO BE INVALID <br> DIGITAL TERRESTRIAL TELEVISION BROADCASTING: <br> ANY VALUE OTHER THAN "0X00" IS DECIDED TO BE INVALID |
| char | BS/CS DIGITAL TELEVISION BROADCASTING: DECIDED TO BE PROVIDER NAME DIGITAL TERRESTRIAL TELEVISION BROADCASTING: CONTENTS DESCRIBED ARE IGNORED |
| service_name_length | ≤20: DECIDED TO BE ORGANIZED CHANNEL NAME LENGTH <br> >20: ORGANIZED CHANNEL NAME IS DECIDED TO BE INVALID |
| char | DECIDED TO BE ORGANIZED CHANNEL NAME |

FIG. 24

EXAMPLE OF SERVICE LIST DESCRIPTOR (NIT SECOND LOOP) RECEPTION PROCESSING

| EXAMPLE OF RECEPTION PROCESSING CORRESPONDING TO EACH FIELD | |
|---|---|
| descriptor_tag | IF "0x41," DESCRIPTOR IS DECIDED TO BE SERVICE LIST DESCRIPTOR |
| descriptor_length | DECIDED TO BE DESCRIPTOR LENGTH OF SERVICE LIST DESCRIPTOR |
| loop | LOOP OF NUMBER OF SERVICES INCLUDED IN TARGET TRANSPORT STREAM IS DESCRIBED |
| service_id | DECIDED TO BE service_id CORRESPONDING TO TRANSPORT STREAM |
| service_type | INDICATES SERVICE TYPE OF TARGET SERVICE. ANY TYPE OTHER THAN SERVICE TYPE DEFINED IN FIG. 13 IS DECIDED TO BE INVALID. |

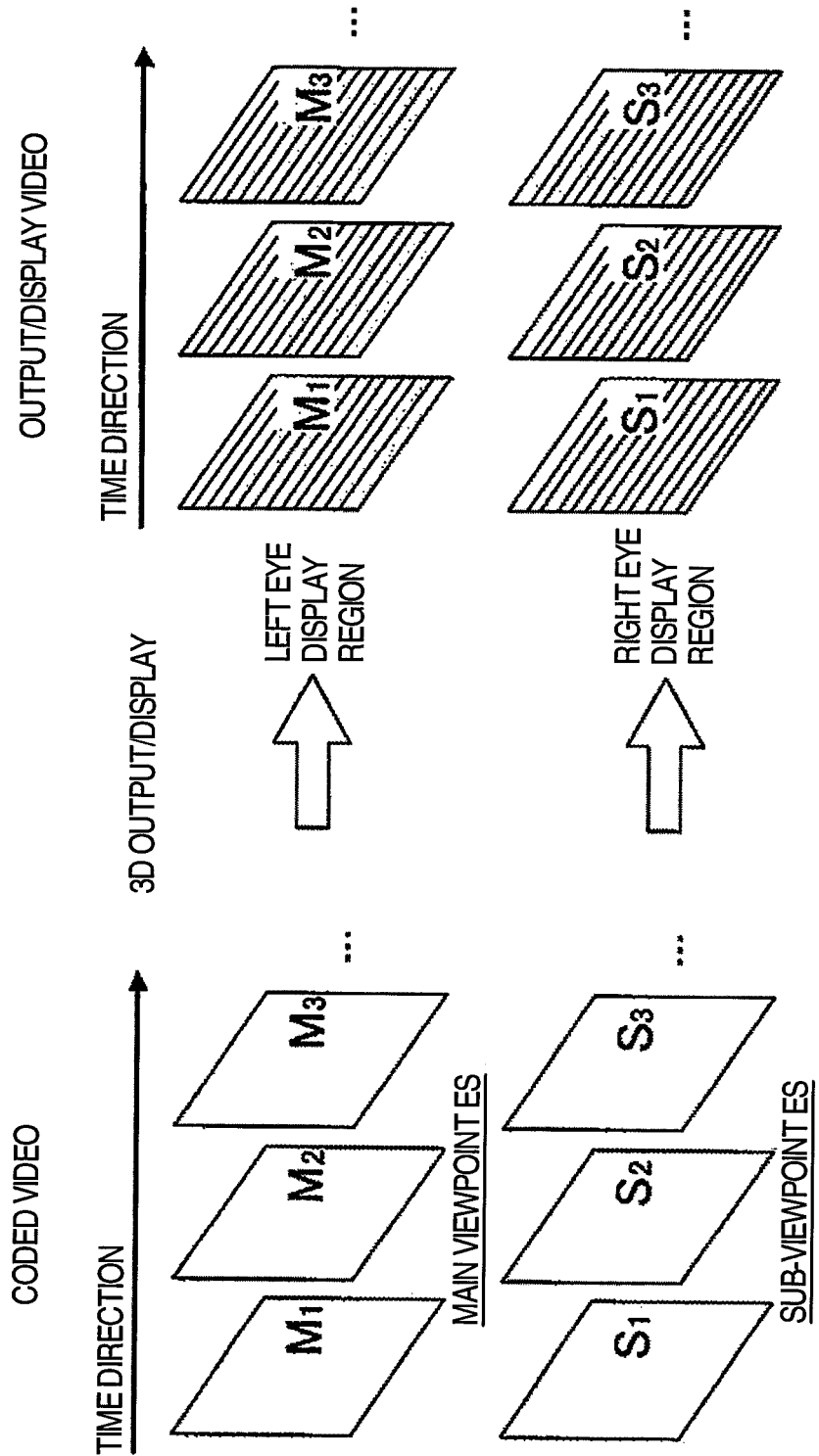

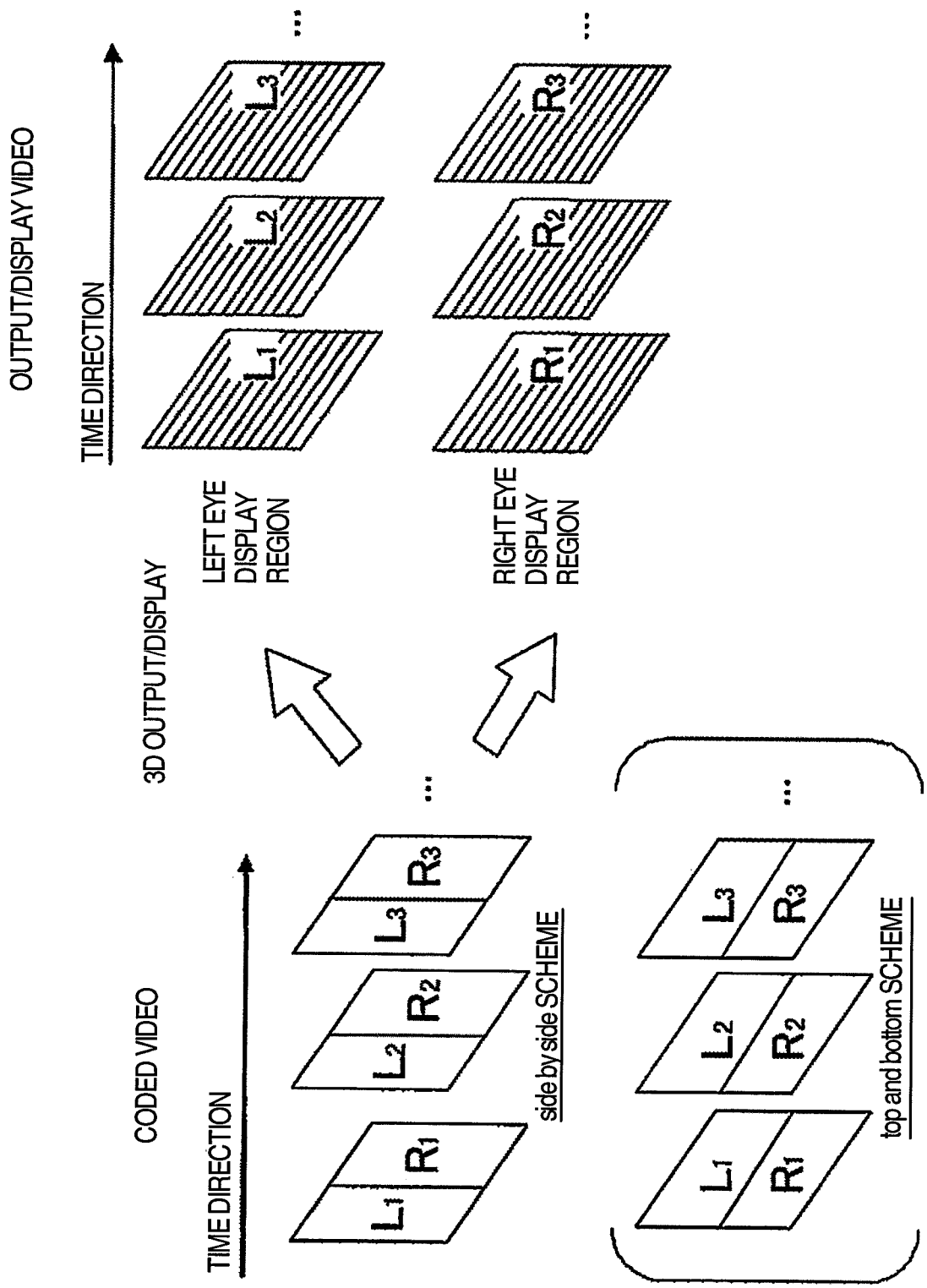

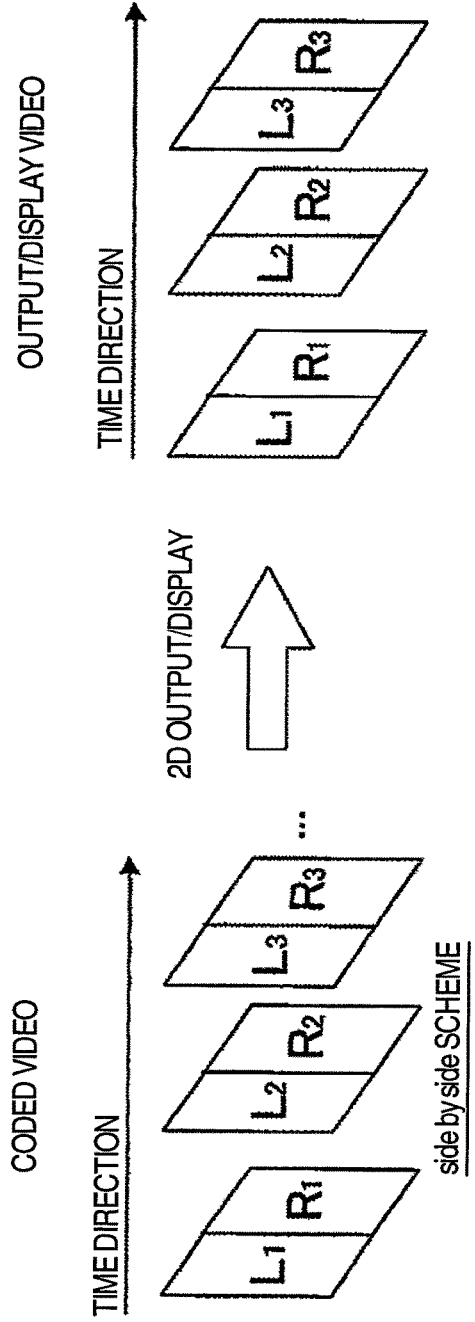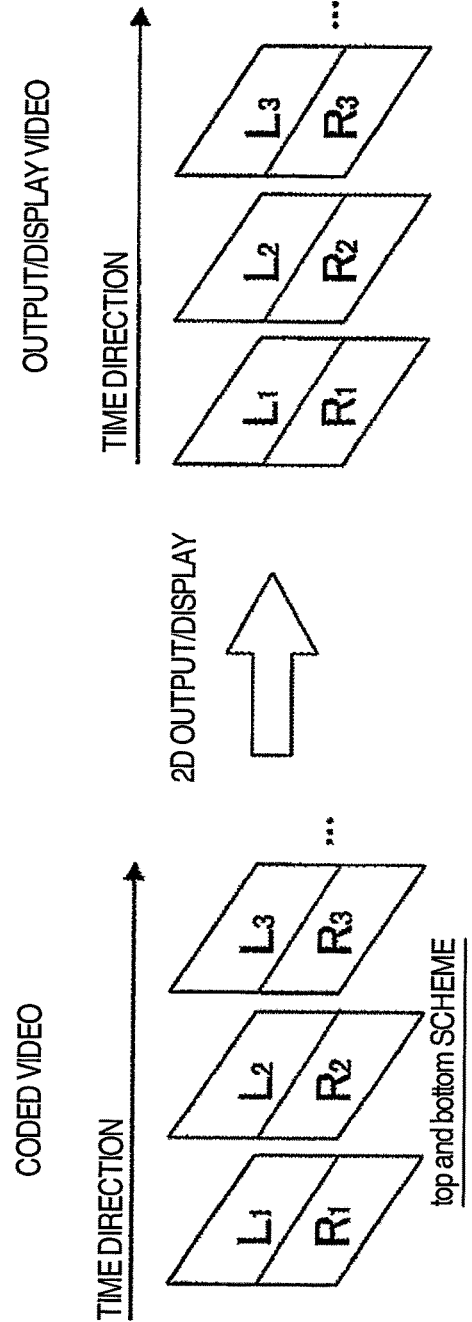

FIG. 47

FIG. 47 WHEN TRANSMITTING PLURALITY OF VIEWPOINTS OF 3D VIDEO IN DIFFERENT ESS EXAMPLE OF COMBINATION OF ("3D 2-VIEWPOINT IN RESPECTIVE ESs TRANSMISSION SCHEME") STREAMS

|  | MAIN VIEWPOINT (FOR LEFT EYE) VIDEO ES | SUB-VIEWPOINT (FOR RIGHT EYE) VIDEO ES |
|---|---|---|
| COMBINATION EXAMPLE 1 | BASE-VIEW SUBBIT STREAM OF MULTI-VIEWPOINT VIDEO CODING (E.G., H.264/MVC) STREAM (MAIN VIEWPOINT) (STREAM FORMAT TYPE 0x1B) | SUBBIT STREAM OF MULTI-VIEWPOINT VIDEO CODING (E.G., H.264/MVC) STREAM (OTHER VIEWPOINT) (STREAM FORMAT TYPE 0x20) |
| COMBINATION EXAMPLE 2 | BASE-VIEW BIT STREAM OF H.262 (MPEG2) SCHEME WHEN TRANSMITTING PLURALITY OF VIEWPOINTS OF 3D VIDEO IN DIFFERENT STREAMS (MAIN VIEWPOINT) (STREAM FORMAT TYPE 0x02) | OTHER VIEWPOINT BIT STREAM OF AVC STREAM SCHEME DEFINED IN ITU-T RECOMMENDATION H.264 \| ISO/IEC 14496-10 VIDEO WHEN TRANSMITTING PLURALITY OF VIEWPOINTS OF 3D VIDEO IN DIFFERENT STREAMS (STREAM FORMAT TYPE 0x22) |
| COMBINATION EXAMPLE 3 | BASE-VIEW BIT STREAM OF H.262 (MPEG2) SCHEME WHEN TRANSMITTING PLURALITY OF VIEWPOINTS OF 3D VIDEO IN DIFFERENT STREAMS (MAIN VIEWPOINT) (STREAM FORMAT TYPE 0x02) | OTHER VIEWPOINT BIT STREAM OF H.262 (MPEG2) SCHEME WHEN TRANSMITTING PLURALITY OF VIEWPOINTS OF 3D VIDEO IN DIFFERENT STREAMS (STREAM FORMAT TYPE 0x21) |
| COMBINATION EXAMPLE 4 | BASE-VIEW SUBBIT STREAM OF MULTI-VIEWPOINT VIDEO CODING (E.G., H.264/MVC) STREAM (MAIN VIEWPOINT) (STREAM FORMAT TYPE 0x1B) | OTHER VIEWPOINT BIT STREAM OF H.262 (MPEG2) SCHEME WHEN TRANSMITTING PLURALITY OF VIEWPOINTS OF 3D VIDEO IN DIFFERENT STREAMS (STREAM FORMAT TYPE 0x21) |

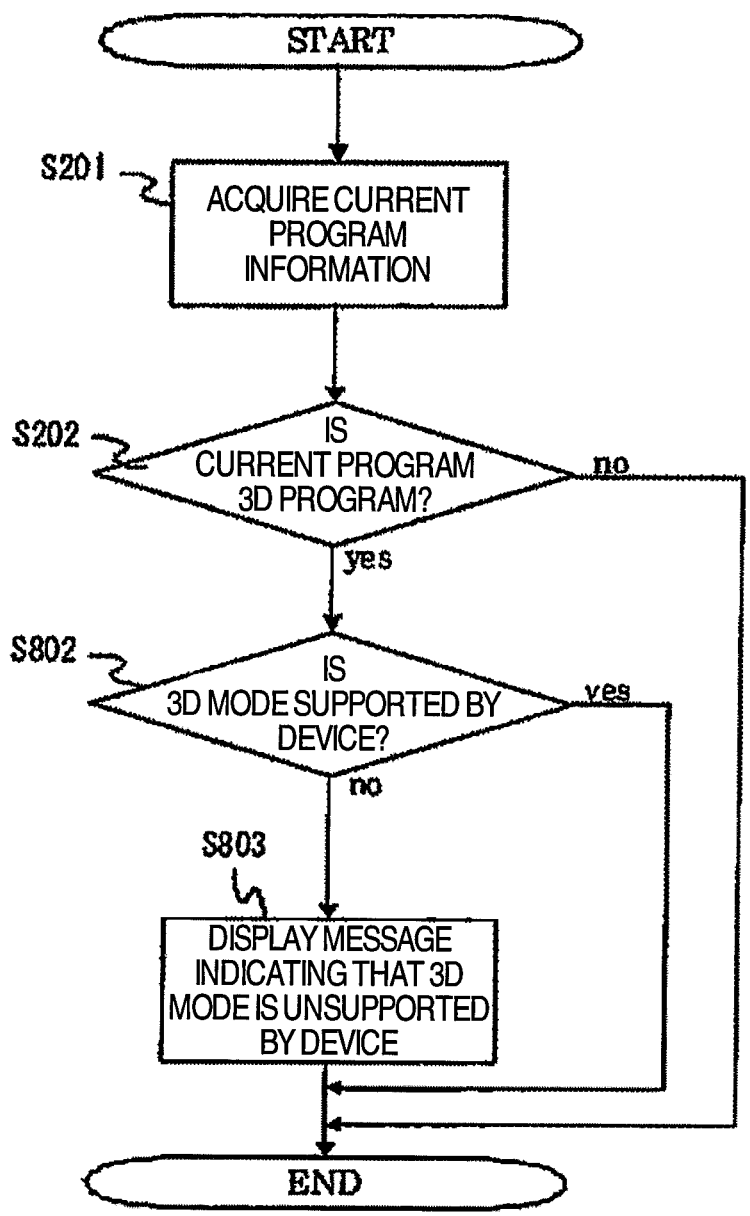

RECEPTION DEVICE, DISPLAY CONTROL METHOD, TRANSMISSION DEVICE, AND TRANSMISSION METHOD FOR PROGRAM CONTENT TYPE

TECHNICAL FIELD

The technical field relates to a three-dimensional (3D) video transmission technique, reception technique, display technique or output technique.

BACKGROUND ART

Patent Literature 1 assumes "providing a digital broadcasting reception device capable of dynamically announcing that a user-desired program starts on a certain channel or the like" (see Patent Literature 1 [0005]) as a technical problem and describes as the solution to the problem "including means for extracting program information included in a digital broadcasting wave and selecting a program to be announced using selection information registered by the user and means for displaying a message that announces the existence of the selected program to be announced by wedging it into a screen currently being displayed (see Patent Literature 1 [0006]).

CITATION LIST

Patent Literature

Patent Literature 1: JP-A-2003-9033

SUMMARY OF INVENTION

Technical Problem

However, Patent Literature 1 discloses nothing about viewing of 3D content. For this reason, there is a problem that it is not possible to distinguish whether a program that the receiver is currently receiving or will receive in the future is a 3D program or not.

Solution to Problem

In order to solve the above-described problem, an aspect of the present invention receives, for example, program content containing video information and identification information containing information identifying whether the program content is 2D program content or 3D program content, and controls a display showing whether the program content is 2D program content or 3D program content according to the received identification information.

Advantageous Effects of Invention

According to the above-described means, it is possible to distinguish whether a program that the receiver is currently receiving or will receive in the future is a 3D program or not and enhance the convenience of the user.

BRIEF DESCRIPTION OF DRAWINGS

FIG. 2 shows an example of a block diagram illustrating a configuration example of a transmission device 1.

FIG. 3 shows an example of assignment of stream format type.

FIG. 4 shows an example of structure of a component descriptor.

FIG. 5(a) shows an example of component contents and component type which are components of the component descriptor.

FIG. 5(b) shows an example of component contents and component type which are components of the component descriptor.

FIG. 5(c) shows an example of component contents and component type which are components of the component descriptor.

FIG. 5(d) shows an example of component contents and component type which are components of the component descriptor.

FIG. 5(e) shows an example of component contents and component type which are components of the component descriptor.

FIG. 6 shows an example of structure of a component group descriptor.

FIG. 7 shows an example of component group type.

FIG. 8 shows an example of component group identification.

FIG. 9 shows an example of charging unit identification.

FIG. 10(a) shows an example of structure of a 3D program detail descriptor.

FIG. 10(b) is a diagram illustrating an example of 3D/2D type.

FIG. 11 is a diagram illustrating an example of 3D mode type.

FIG. 12 shows an example of structure of a service descriptor.

FIG. 13 shows an example of service format type.

FIG. 14 shows an example of structure of a service list descriptor.

FIG. 15 shows an example of transmission processing on the component descriptor in the transmission device 1.

FIG. 16 shows an example of transmission processing on the component group descriptor in the transmission device 1.

FIG. 17 shows an example of transmission processing on the 3D program detail descriptor in the transmission device 1.

FIG. 18 shows an example of transmission processing on the service descriptor in the transmission device 1.

FIG. 19 shows an example of transmission processing on the service list descriptor in the transmission device 1.

FIG. 20 shows an example of processing on each field of the component descriptor in the reception device 4.

FIG. 21 shows an example of processing on each field of the component group descriptor in the reception device 4.

FIG. 22 shows an example of processing on each field of the 3D program detail descriptor in the reception device 4.

FIG. 23 shows an example of processing on each field of the service descriptor in the reception device 4.

FIG. 24 shows an example of processing on each field of the service list descriptor in the reception device 4.

FIG. 47 shows an example of combination of streams during 3D video transmission.
FIG. 51 shows an example of a flowchart when an unsupported 3D mode message is displayed.

DESCRIPTION OF EMBODIMENTS

Hereinafter, a preferred embodiment of the present invention will be described. However, the present invention is not limited to the present embodiment. The present embodiment will describe mainly a reception device and is preferably implemented in the reception device, but the present embodiment is not meant to hinder its application to anything other than the reception device. Moreover, all components of the embodiment need not be adopted but only some of the components may be selectable.

<System>

Figure 1:
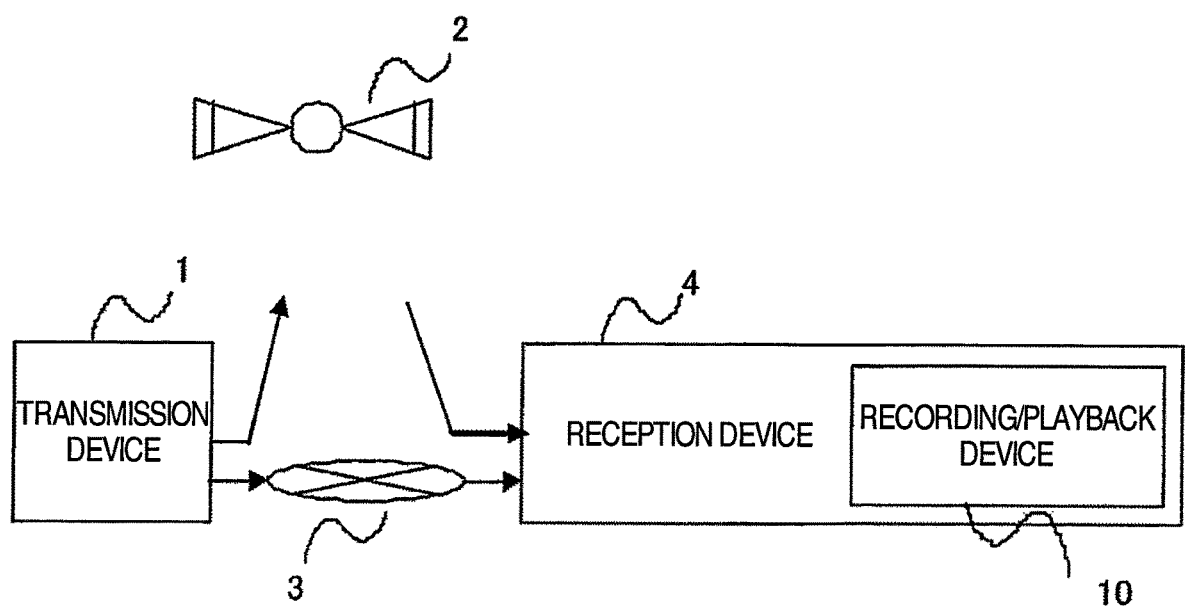
FIG. 1 shows an example of a block diagram illustrating a system configuration example.

FIG. 1 is a block diagram illustrating a system configuration example of the present embodiment. FIG. 1 illustrates a case where information is transmitted/received through broadcasting, and recorded or played back. However, information may be transmitted/received through not only broadcasting but also VOD through communication, and such transmission/reception is also generically called "delivery."

Reference numeral 1 denotes a transmission device set up in an information providing station such as a broadcasting station, 2 denotes a relay device set up in a relay station, broadcasting satellite or the like, 3 denotes a public network that connects a general household and a broadcasting station such as the Internet, 4 denotes a reception device set up in a user's house or the like, and 10 denotes a reception recording/playback unit incorporated in the reception device 4. The reception recording/playback unit 10 can record/play back broadcast information or play back content from a removable external medium.

The transmission device 1 transmits a signal radio wave modulated via the relay device 2. In addition to transmission by a satellite as shown in FIG. 1, transmission by cable, transmission by telephone lines, transmission by ground wave broadcasting, transmission via the public network 3 such as the Internet may also be used. This signal radio wave received by the reception device 4 is demodulated into an information signal as will be described later and then recorded into a recording medium if necessary. Alternatively, when a signal is transmitted via the public network 3, the signal is converted to a format such as a data format (IP packet) compliant with a protocol appropriate to the public network 3 (e.g., TCP/IP) and the reception device 4 that has received the data decodes the data into an information signal, converts it to a signal suitable for recording if necessary and records it into a recording medium. The user can watch and listen to video/audio data indicated by the information signal on a display when incorporated in the reception device 4, or by connecting the reception device 4 to a display (not shown) when not incorporated.

<Transmission Device>

FIG. 2 is a block diagram illustrating a configuration example of the transmission device 1 of the system in FIG. 1.

Reference numeral 11 denotes a source generator, 12 denotes an encoding unit that compresses a signal using MPEG2, H.264 scheme or the like and adds program information or the like, 13 denotes a scrambling unit, 14 denotes a modulation unit, 15 denotes a transmission antenna, and 16 denotes a management information adding unit. The video, audio or other information generated in the source generator 11 made up of a camera, recording/playback apparatus or the like is compressed in the data amount by the encoding unit 12 so as to be transmitted in less occupied bandwidth. Data transmission is encrypted by the scrambling unit 13 if necessary so as to be accessible only to specific users. After being modulated by the modulation unit 14 into a signal appropriate for transmission such as OFDM, TC8PSK, QPSK, multilevel QAM, the signal is transmitted as a radio wave from the transmission antenna 15 to the relay device 2. In this case, the management information adding unit 16 adds program-specific information such as an attribute of content created by the source generator 11 (e.g., video/audio coded information, audio coded information, program configuration, whether video is 3D or not) and also adds program array information created by a broadcasting station (e.g., configuration of a current program or the next program, service format, configuration information of programs for a week) or the like. Such program-specific information and program array information will be collectively called "program information" hereinafter.

A plurality of pieces of information are often multiplexed with one radio wave using time-sharing, spread spectrum or other methods. Although not shown in FIG. 2 for simplicity, there are a plurality of source generators 11 and encoding units 12 in this case, and a multiplexing unit that multiplexes a plurality of pieces of information is provided between the encoding unit 12 and the scrambling unit 13.

Regarding a signal transmitted via the public network 3, a signal created by the encoding unit 12 is likewise encrypted by an encryption unit 17 if necessary so as to be accessible to only specific users. After being coded by a communication path coding unit 18 so as to become a signal appropriate for transmission through the public network 3, the signal is transmitted from a network I/F (Interface) unit 19 to the public network 3.

<3D Transmission Scheme>

Figure 39A:
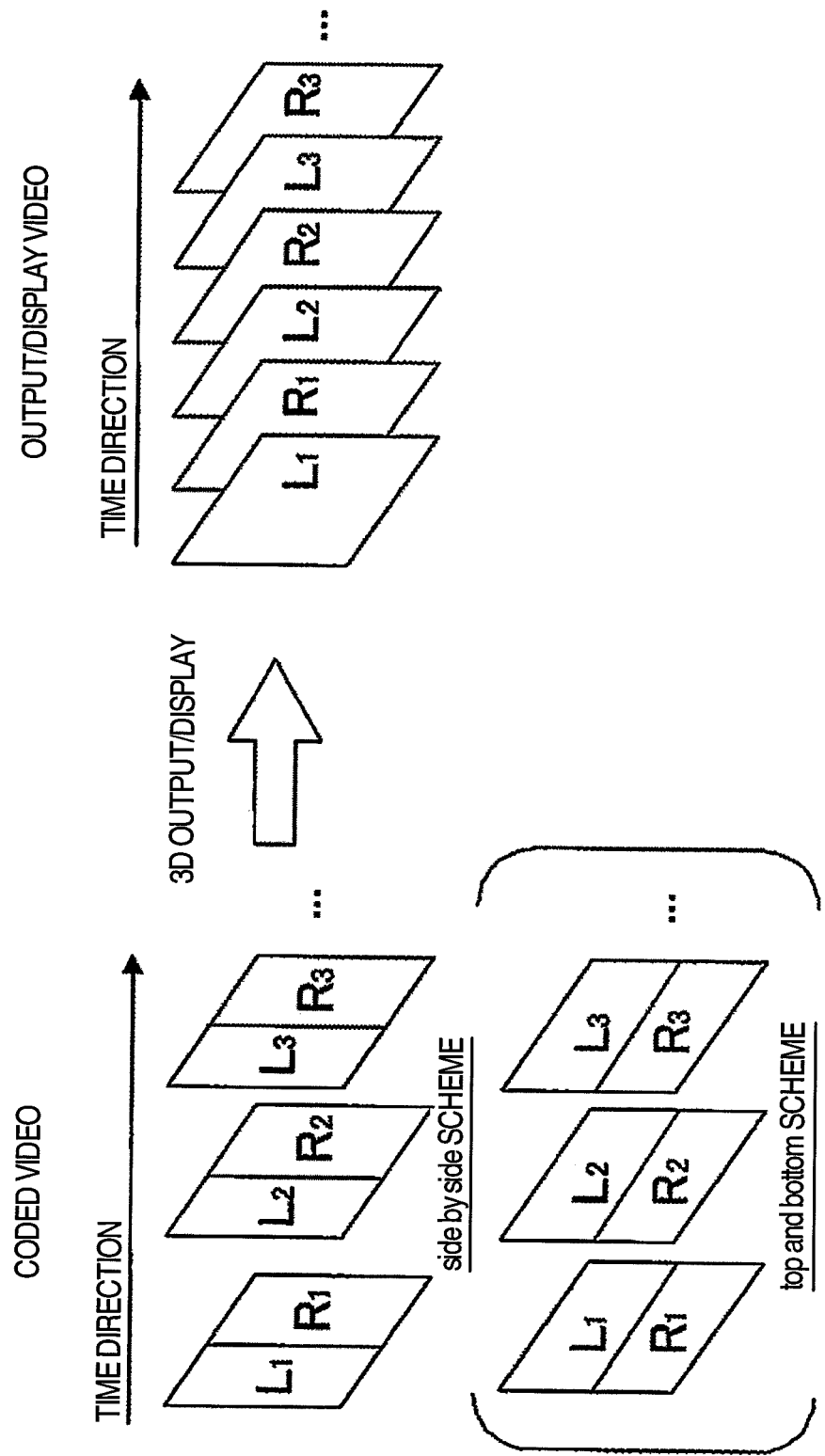
FIG. 39 is a diagram illustrating an example of 3D playback/output/display processing on 3D content.

The transmission scheme for a 3D program transmitted from the transmission device 1 can be roughly divided into two schemes. One is a scheme that stores videos for the right eye and the left eye in one image utilizing an existing 2D program broadcasting scheme. This scheme employs existing MPEG2 (Moving Picture Experts Group 2) or H.264 AVC as the video compression scheme and has a features that it is compatible with existing broadcasting, can use an existing relay infrastructure and can be received by an existing receiver (STB or the like), but 3D video is transmitted with resolution half the highest resolution of existing broadcasting (in vertical direction or horizontal direction). As shown in FIG. 39(*a*), examples of such a scheme include a "side-by-side" scheme whereby one image is divided into left and right halves and the divided images are accommodated in a screen whose widths in the horizontal direction of video (L) for the left eye and video (R) for the right eye are approximately half the width of the 2D program and whose width in the vertical direction is equal to the width of the 2D program, a "top-and-bottom" scheme whereby one image is divided into upper and lower halves and the divided images are accommodated in a screen whose widths in the horizontal direction of a video (L) for the left eye and a video (R) for the right eye are equal to the width of the 2D program and whose width in the vertical direction is approximately half the width of the 2D program, a "field alternative" scheme whereby images are accommodated using another interlace, a "line alternative" scheme whereby video for the left eye and video for the right eye are accommodated alternately for every one scan line, and a "left+depth" scheme storing information on a two-dimensional (one-side) video and depth (distance up to an object) per pixel of video. These schemes divide one image into a plurality of images and store images of a plurality of viewpoints and thus have a merit that the coding scheme itself can use coding schemes such as MPEG2 and H.264 AVC (except MVC) which are originally not multi-viewpoint video coding schemes without any modification and can perform 3D program broadcasting making the most of the broadcasting scheme of the existing 2D program. When, for example, a 2D program can be transmitted in a screen having a maximum size of 1920 dots in the horizontal direction and 1080 lines in the vertical direction, if 3D program broadcasting is performed using the "side-by-side" scheme, one image may be divided into left and right halves and the images may be transmitted accommodated in a screen having a size of 960 dots in the horizontal direction and 1080 lines in the vertical direction corresponding to video (L) for the left eye and video (R) for the right eye respectively. Similarly, when 3D program broadcasting is performed using the "top-and-bottom" scheme in this case, one image may be divided into left and right halves and the images may be transmitted accommodated in a screen having a size of 1920 dots in the horizontal direction and 540 lines in the vertical direction.

Another scheme is a scheme whereby video for the left eye and video for the right eye are transmitted in different streams (ESs). In the present embodiment, such a scheme is called "2-viewpoint in respective ESs transmission." One example of this scheme is a transmission scheme based on H.264 MVC which is a multi-viewpoint video coding scheme. A feature thereof is the ability to transmit 3D video with high resolution. Use of this scheme has an effect that 3D video can be transmitted with high resolution. The multi-viewpoint video coding scheme is a coding scheme standardized to code multi-viewpoint video, which can code multi-viewpoint video without dividing one image for every viewpoint and codes a different image for every viewpoint.

When transmitting 3D video using this scheme, the video may be transmitted by assuming, for example, a coded image with a viewpoint for the left eye as a main viewpoint image and assuming a coded image with a viewpoint for the right eye as a different viewpoint image. This makes it possible to maintain compatibility with the broadcasting scheme of the existing 2D program for the main viewpoint image. For example, when H.264 MVC is used as a multi-viewpoint video coding scheme, the main viewpoint image can maintain compatibility with H.264 AVC 2D images for H.264 MVC base substreams and the main viewpoint image can be displayed as a 2D image.

Furthermore, suppose the following schemes are also included as other examples of the "3D 2-viewpoint in respective ESs transmission scheme."

Another example of the "3D 2-viewpoint in respective ESs transmission scheme" is a scheme whereby a coded image for the left eye is coded using MPEG2 as a main viewpoint image and a coded image for the right eye is coded using H.264 AVC as a different viewpoint image to make the two images different streams. According to this scheme, since the main viewpoint image becomes MPEG2 compatible and can be displayed as a 2D image, it is possible to maintain compatibility with the broadcasting scheme of the existing 2D program for which coded images using MPEG2 are widely used.

A further example of the "3D 2-viewpoint in respective ESs transmission scheme" is a scheme whereby a coded image for the left eye is coded using MPEG2 as a main viewpoint image and a coded image for the right eye is coded using MPEG2 as a different viewpoint image to make the two images different streams. According to this scheme, the main viewpoint image also becomes MPEG2 compatible and can be displayed as a 2D image, and it is thereby possible to maintain compatibility with the broadcasting scheme of the existing 2D program for which coded images using MPEG2 are widely used.

A still further example of the "3D 2-viewpoint in respective ESs transmission scheme" may be a scheme whereby a coded image for the left eye is coded using H.264 AVC or H.264 MVC as a main viewpoint image and a coded image for the right eye is coded using MPEG2 as a different viewpoint image.

Besides the "3D 2-viewpoint in respective ESs transmission scheme," using even a coding scheme such as MPEG2 or H.264 AVC (except MVC) which is not a coding scheme originally defined as a multi-viewpoint video coding scheme, it is possible to realize 3D transmission by generating streams that alternately store video for the left eye and frame for the right eye.

<Program Information>

Program specific information and program array information are called "program information."

The program specific information is also called "PSI" which is information necessary to select a required program and is made up of four tables; PAT (Program Association Table) that specifies a packet identifier of a TS packet for transmitting a PMT (Program Map Table) associated with a broadcasting program, a PMT that specifies a packet identifier of a TS packet for transmitting each coded signal making up a broadcasting program and specifies a packet identifier of a TS packet for transmitting common information out of information associated with chargeable broadcasting, a NIT (Network Information Table) that transmits information that associates information on a transmission path such as modulation frequency with a broadcasting program, and a CAT (Conditional Access Table) that specifies a packet identifier of a TS packet for transmitting individual information out of information associated with chargeable broadcasting, and is defined in the MPEG2 system standard. The program specific information includes, for example, video coding information, audio coded information and program configuration. In the present invention, the program specific information additionally includes information indicating whether video is 3D or not or the like. The PSI is added by the management information adding unit 16.

The program array information is also called "SI (Service Information)" which is various types of information defined for convenience of program selection, also includes PSI information of the MPEG-2 system standard, and includes EIT (Event Information Table) that describes information associated with the program such as program name, broadcasting date and time, program contents, and SDT (Service Description Table) that describes information associated with organized channel (service) such as organized channel name, broadcasting provider name.

For example, the program array information includes information indicating the configuration of a program currently being broadcast or next program to be broadcast, service format or configuration information of programs for a week, and such information is added by the management information adding unit 16.

The program information includes components of the program information such as a component descriptor, component group descriptor, 3D program detail descriptor, service descriptor, service list descriptor. These descriptors are described in tables such as PMT, EIT [schedule basic/schedule extended/present/following], NIT and SDT.

Regarding how to use different tables of PMT and EIT, for example, PMT describes only information of a program currently being broadcast, and so information on programs to be broadcast in the future cannot be checked. However, the transmission period from the transmitting side is short and PMT has a feature of having high reliability in the sense that it is information on the program currently being broadcast, and it is therefore not changed. On the other hand, EIT [schedule basic/schedule extended] can acquire information of up to 7 days ahead in addition to the program currently being broadcast, but since the transmission period from the transmitting side is longer than that of PMT, EIT has demerits that a greater storage area is required for storing the information and its reliability is low in the sense that EIT deals with future events which may be possibly changed. EIT [following] can acquire information on a program of the next broadcasting time.

PMT of the program specific information uses a table structure defined in ISO/IEC13818-1 and can indicate the format of an ES of the program being broadcast according to stream_type (stream format type) which is 8-bit information described in its 2nd loop (loop per ES (Elementary Stream)). According to the embodiment of the present invention, the number of ES formats is increased compared to the conventional art and assigns an ES format of the program to be broadcast as shown in FIG. 3, for example.

First, regarding a base-view subbit stream (main viewpoint) of multi-viewpoint video coding (e.g., H.264/MVC) stream, 0x1B identical to an AVC video stream defined in existing ITU-T Recommendation H.264|ISO/IEC 14496-10 video is assigned. Next, a subbit stream (different viewpoint) of multi-viewpoint video coding stream (e.g., H.264 MVC) that can be used for a 3D video program is assigned to 0x20.

Furthermore, regarding an H262 (MPEG2)-based base-view bit stream (main viewpoint) when used for a "3D 2-viewpoint in respective ESs transmission scheme" that transmits a plurality of viewpoints of 3D video through a different stream, 0x02 identical to the existing ITU-T Recommendation H.262|ISO/IEC 13818-2 video is assigned. Here, the H.262 (MPEG2)-based base-view bit stream (main viewpoint) when transmitting a plurality of viewpoints of 3D video in different streams is a stream resulting from coding only video of a main viewpoint out of video of a plurality of viewpoints of 3D video using the H.262 (MPEG2) scheme.

Furthermore, a bit stream of another viewpoint of the H.262 (MPEG2) scheme when transmitting a plurality of viewpoints of 3D video in different streams is assigned to 0x21.

Furthermore, a bit stream of another viewpoint of the AVC stream defined in ITU-T Recommendation H.264|ISO/IEC 14496-10 video when transmitting a plurality of viewpoints of 3D video in different streams is assigned to 0x22.

The description here assumes that a subbit stream of multi-viewpoint video coding stream that can be used for a 3D video program is assigned to 0x20, a bit stream of another viewpoint of the H.262 (MPEG2) scheme when transmitting a plurality of viewpoints of 3D video in different streams is assigned to 0x21, and an AVC stream defined in ITU-T Recommendation H.264|ISO/IEC 14496-10 video when transmitting a plurality of viewpoints of 3D video in different streams is assigned to 0x22, but these streams may also be assigned to any one of 0x23 to 0x7E. Furthermore, the MVC video stream is only an example, and any video stream other than H.264/MVC may be used as long as it indicates a multi-viewpoint video coding stream that can be used for a 3D video program.

As described above, when a broadcasting provider on the transmission device 1 side transmits (broadcasts) a 3D program, by assigning stream_type (stream format type) bits, the embodiment of the present invention allows the 3D program to be transmitted in combinations of streams as shown, for example, in FIG. 47.

In combination example 1, a base-view subbit stream (main viewpoint) (stream format type 0x1B) of a multi-viewpoint video coding (e.g., H.264/MVC) stream is transmitted as the main viewpoint video stream (for the left eye), and another viewpoint subbit stream (stream format type 0x20) of the multi-viewpoint video coding (e.g., H.264/MVC) stream is transmitted as the sub-viewpoint video stream (for the right eye).

In this case, multi-viewpoint video coding (e.g., H.264/MVC)-based streams are used for both the main viewpoint (for the left eye) video stream and the sub-viewpoint video stream (for the right eye). The multi-viewpoint video coding (e.g., H.264 MVC) scheme is a scheme originally designed to transmit multi-viewpoint video and can transmit a 3D program most efficiently among combination examples in FIG. 47.

Furthermore, when displaying (outputting) a 3D program in 3D, the reception device can play back the 3D program by processing both the main viewpoint video stream (for the left eye) and sub-viewpoint video stream (for the right eye).

When displaying (outputting) a 3D program in 2D, the reception device can display (output) the 3D program as a 2D program by processing only the main viewpoint video stream (for the left eye).

Since the multi-viewpoint coding scheme H.264/MVC base-view subbit stream is compatible with the existing H.264/AVC (except MVC) video stream, assigning both stream format types to identical 0x1B as shown in FIG. 3 provides the following effect. That is, this is an effect that even when the reception device having no function of displaying (outputting) a 3D program in 3D receives the 3D program of combination example 1, if the reception device has only a function of displaying (outputting) a video stream (AVC video stream defined in ITU-T Recommendation H.264|ISO/IEC 14496-10 video) of the existing H.264/AVC (except MVC), it is possible to recognize the main viewpoint video stream (for the left eye) of the program as a stream similar to the existing H.264/AVC (except MVC) video stream based on the stream format type and display (output) the video stream as a normal 2D program.

Furthermore, since a non-conventional stream format type is assigned to the sub-viewpoint video stream (for the right eye), this is ignored by the existing reception device. This allows the existing reception device to prevent display (output) unintended on the broadcasting station side for the sub-viewpoint video stream (for the right eye).

Therefore, even when broadcasting of the 3D program in combination example 1 is newly started, it is possible to avoid a situation that the existing reception device having the function of displaying (outputting) a video stream of the existing H.264/AVC (except MVC) cannot display (output) the video stream. Even when the 3D program broadcasting is newly started in broadcasting that is run with advertisement revenues such as a CM (commercial message), this allows the user to view the program using even a reception device not supporting the 3D display (output) function, and can thereby avoid the audience rate from lowering due to limitations of the function of the reception device and provide a merit on the broadcasting station side, too.

In combination example 2, when a plurality of viewpoints of 3D video are transmitted in different streams, an H.262 (MPEG2)-based base-view bit stream (main viewpoint) (stream format type 0x02) is transmitted as the main viewpoint video stream (for the left eye), and when a plurality of viewpoints of 3D video are transmitted in different streams, an AVC stream (stream format type 0x22) defined in ITU-T Recommendation H.264|ISO/IEC 14496-10 video is transmitted as the sub-viewpoint video stream (for the right eye).

As in the case of combination example 1, when a 3D program is displayed (outputted) in 3D, the reception device can play back the 3D program by processing both the main viewpoint video stream (for the left eye) and the sub-viewpoint video stream (for the right eye). When displaying (outputting) the 3D program in 2D, the reception device can display (output) the 3D program as a 2D program by processing only the main viewpoint video stream (for the left eye).

Furthermore, by using a stream compatible with the existing ITU-T Recommendation H.262ISO/IEC 13818-2 video stream for the base-view bit stream (main viewpoint) of the H.262 (MPEG2) scheme when a plurality of viewpoints of 3D video are transmitted in different streams and assigning both stream format types to identical 0x1B as shown in FIG. 3, any reception device that has the function of displaying (outputting) the existing ITU-T Recommendation H.262|ISO/IEC 13818-2 video stream, and even one that has no 3D display (output) function, can display (output) the 3D program as a 2D program.

Furthermore, as in the case of combination example 1, since a non-conventional stream format type is assigned to the sub-viewpoint video stream (for the right eye), it is ignored by the existing reception device. This allows the existing reception device to prevent display (output) unintended by the broadcasting station side about the sub-viewpoint video stream (for the right eye).

Since reception devices having a display (output) function of existing ITU-T Recommendation H.262ISO/IEC 13818-2 video stream are widely used, it is possible to more efficiently prevent the audience rate from dropping due to restrictions on the function of the reception devices and realize the broadcasting most preferable to the broadcasting station.

Furthermore, using an AVC stream (stream format type 0x22) defined in the ITU-T Recommendation H.264ISO/IEC 14496-10 video for the sub-viewpoint video stream (for the right eye) makes it possible to transmit the sub-viewpoint video stream (for the right eye) with high compressibility.

That is, according to combination example 2, it is possible to make commercial merits of the broadcasting station compatible with technical merits through high efficiency transmission.

In combination example 3, a base-view bit stream (main viewpoint) (stream format type 0x02) of the H.262 (MPEG2) scheme when a plurality of viewpoints of 3D video are transmitted in different streams is transmitted as the main viewpoint video stream (for the left eye) and another viewpoint bit stream (stream format type 0x21) of the H.262 (MPEG2) scheme when a plurality of viewpoints of 3D video are transmitted in different streams is transmitted as the sub-viewpoint video stream (for the right eye).

In this case, as in the case of combination example 3, any reception device that has the function of displaying (outputting) the existing ITU-T Recommendation H.262|ISO/IEC 13818-2 video stream, and even one that has no 3D display (output) function, can display (output) the 3D program as a 2D program.

In addition to the commercial merit of further preventing the audience rate from dropping due to restrictions on the function of the reception device, unifying the coding scheme of the main viewpoint video stream (for the left eye) and that of the sub-viewpoint video stream (for the right eye) into the H.262 (MPEG2) scheme makes it possible to simplify the hardware configuration of the video decoding function of the reception apparatus.

As shown in combination example 4, it is also possible to transmit a base-view subbit stream (main viewpoint) (stream format type 0x1B) of a multi-viewpoint video coding (e.g., H.264/MVC) stream as the main viewpoint video stream (for the left eye) and transmit another viewpoint bit stream (stream format type 0x21) of the H.262 (MPEG2) scheme when a plurality of viewpoints of 3D video are transmitted in different streams as the sub-viewpoint video stream (for the right eye).

In the combinations in FIG. 47, instead of the base-view subbit stream (main viewpoint) (stream format type 0x1B) of the multi-viewpoint video coding (e.g., H.264/MVC) stream, using an AVC video stream (stream format type 0x1B) defined in the ITU-T Recommendation H.264|ISO/IEC 14496-10 video may also achieve a similar effect.

Furthermore, in the combinations in FIG. 47, instead of the base-view bit stream (main viewpoint) of the H.262 (MPEG2) scheme when a plurality of viewpoints of 3D video are transmitted in different streams, using an ITU-T Recommendation H.262|ISO/TEC 13818-2 video stream (stream format type 0x1B) may also achieve a similar effect.

FIG. 4 shows an example of the structure of a component descriptor which is one element of the program information.

The component descriptor indicates the type of a component (element making up a program such as video, sound, character, various types of data) and is also used to express an elementary stream in a character format. This descriptor is arranged in PMT and/or EIT.

The component descriptor has the following meanings. That is, descriptor_tag has an 8-bit field describing a value that allows this descriptor to be identified as a component descriptor. Descriptor_length has an 8-bit field describing the size of this descriptor. Stream_content (component contents) has a 4-bit field indicating the type of a stream (video, sound, data) and is coded according to FIG. 4. Component_type (component type) has an 8-bit field defining the type of component such as field, video, sound, data and is coded according to FIG. 4. Component_tag (component tag) has an 8-bit field. A component stream of a service can refer to the description contents (FIG. 5) indicated by the component descriptor using this 8-bit field.

In a program map section, values of component tags given to respective streams should have different values. The component tag is a label to identify a component stream and has the same value as the component tag in the stream identification descriptor (however, when the stream identification descriptor exists within PMT). The 24-bit field of ISO_639_language_code (language code) identifies the language of a component (sound or data) and the language of a character description contained in this descriptor.

The language code is represented by an alphabetical 3-character code defined in ISO 639-2(22). Each character is coded with 8 bits according to ISO 8859-1(24) and inserted into a 24-bit field in that order. For example, Japanese is "jpn" in an alphabetical 3-character code and coded as "0110 1010 0111 0000 0110 1110". Text_char (component description) has an 8-bit field. A series of component description fields defines the character description of a component stream.

FIGS. 5(*a*) to (*e*) show examples of stream_content (component contents) and component_type (component type) which are components of the component descriptor. 0x01 of the component contents shown in FIG. 5(*a*) represents various video formats of a video stream compressed in an MPEG2 format.

0x05 of the component contents shown in FIG. 5(*b*) represents various video formats of a video stream compressed in an H.264 AVC format. 0x06 of the component contents shown in FIG. 5(*c*) represents various video formats of a 3D video stream compressed in a multi-viewpoint video coding (e.g., H.264 MVC format).

0x07 of the component contents shown in FIG. 5(*d*) represents various video formats of a side-by-side format stream of 3D video compressed in an MPEG2 or H.264 AVC format. In this example, the component contents have the same value between the MPEG2 and H.264 AVC formats, but different values may also be set between MPEG2 and H.264 AVC.

0x08 of the component contents shown in FIG. 5(*e*) represents various video formats of a stream in a top-and-bottom format of 3D video compressed in the MPEG2 or H.264 AVC format. In this example, the component contents have the same value between the MPEG2 and H.264 AVC formats, but different values may also be set between MPEG2 and H.264 AVC.

As shown in FIG. 5(*d*) and FIG. 5(*e*), by adopting a configuration showing a combination of whether video is 3D or not, scheme of 3D video, resolution, aspect ratio according to the combination of stream_content (component contents) and component_type (component type) which are components of the component descriptor, it is possible to transmit various types of video mode information including identification of 2D program/3D program with a small amount of transmission even in the case of 3D and 2D mixed broadcasting.

Particularly when a 3D video program is transmitted by including images of a plurality of viewpoints in one image of a side-by-side format, top-and-bottom format or the like using a coding scheme such as MPEG2, H.264 AVC (except MVC) which are not the coding schemes originally defined as multi-viewpoint video coding schemes, it is difficult to distinguish whether transmission is performed by including images of a plurality of viewpoints in one image for the 3D video program or a normal image of one viewpoint, based on only the aforementioned stream_type (stream format type). In this case, the program may identify various video schemes including 2D program/3D program identification using a combination of stream_content (component contents) and component_type (component type). Furthermore, by delivering component descriptors regarding a program currently being broadcast or to be broadcast in the future using EIT and by the reception device 4 acquiring EIT, it is possible to create EPG (program table), and create EPG information as to whether video is 3D video or not, scheme of 3D video, resolution, aspect ratio, whether video is 3D video or not. The reception device has a merit that such information can be displayed in (outputted to) EPG.

As described above, the reception device 4 monitors stream_content and component_type, and thereby provides an effect that it is possible to recognize that a program currently being received or received in the future is a 3D program.

FIG. 6 shows an example of the structure of a component group descriptor which is one element of the program information. The component group descriptor defines and identifies a combination of components in an event. That is, the component group descriptor describes grouping information of a plurality of components. This descriptor is arranged in EIT.

The component group descriptor has the following meanings. That is, descriptor_tag is an 8-bit field describing a value that allows this descriptor to be identified as a component group descriptor. Descriptor_length has an 8-bit field describing the size of this descriptor. Component_group_type (component group type) has a 3-bit field representing the group type of a component according to FIG. 7.

Here, 001 represents a 3D TV service and is distinguished from a multi-view TV service of 000. Here, the "multi-view TV service" is a TV service that can display 2D video of a plurality of viewpoints by being switched for each viewpoint. For example, in a multi-viewpoint video coding video stream or a stream of a coding scheme which is not a coding scheme originally defined as a multi-viewpoint video coding scheme, there may also be a case where a stream transmitted by including images of a plurality of viewpoints in one screen is used not only for a 3D video program but also for a multi-view TV program. In this case, even when the stream includes multi-viewpoint video, it may not be possible to identify whether a program is a 3D video program or multi-view TV program based on only aforementioned stream_type (stream format type). In such a case, identification by component_group_type (component group type) is effective. Total_bit_rate_flag (total bit rate flag) is a 1-bit flag indicating the description state of a total bit rate in a component group in an event. When this bit is "0," this means that the total bit rate field in the component group does not exist in the descriptor. When this bit is "1," this means that the total bit rate field in the component group exists in the descriptor. Num_of_group (number of groups) has a 4-bit field representing the number of component groups in an event.

Component_group_id (component group identification) has a 4-bit field describing component group identification according to FIG. 8. Num_of_CA_unit (number of charging units) has a 4-bit field representing the number of charging/non-charging units in the component group. CA_unit_id (charging unit identification) has a 4-bit field describing identification of the charging unit to which the component belongs according to FIG. 9.

Num_of_component (number of components) has a 4-bit field representing the number of components that belong to the component group and also belong to the charging/non-charging unit indicated by immediately preceding CA_unit_id. Component_tag (component tag) has an 8-bit field representing the value of a component tag that belongs to the component group.

Total_bit_rate (total bit rate) has an 8-bit field describing the total bit rate of a component in a component group by rounding up the transmission rate of a transport stream packet every ¼ Mbps. Text_length (component group description length) has an 8-bit field representing the byte length of the following component group description. Text_char (component group description) has an 8-bit field. A series of character information fields describes a description regarding the component group.

As described above, the reception device 4 monitors component_group_type and thereby provides an effect that it is possible to recognize that a program currently being received or to be received in the future is a 3D program.

Next, an example where a new descriptor representing information on the 3D program will be described. FIG. 10(a) shows an example of the structure of a 3D program detail descriptor which is one element of the program information. The 3D program detail descriptor indicates detailed information when a program is a 3D program and is used to make a decision on the 3D program in the receiver or the like. This descriptor is arranged in PMT and/or EIT. The 3D program detail descriptor may coexist with stream_content (component contents) or component_type (component type) for the 3D video program shown in FIGS. 5(c) to (e) already described above. However, a configuration may also be adopted in which the 3D program detail descriptor is transmitted, whereas stream_content (component contents) or component_type (component type) for the 3D video program is not transmitted. The 3D program detail descriptor has the following meanings. Next, descriptor_tag has an 8-bit field describing a value that allows this descriptor to be identified as a 3D program detail descriptor (e.g., 0xE1). Descriptor_length has an 8-bit field describing the size of this descriptor.

3d_2d_type (3D/2D type) has an 8-bit field representing the type of 3D video/2D video in the 3D program according to FIG. 10(b). This field provides information to identify whether video is 3D video or 2D video in such a 3D program that a program main part is 3D video and commercials or the like inserted in the middle of the program are made up of 2D video, and is arranged for the purpose of preventing misoperation in the reception device (problem with display (output) that may occur when the reception device is performing 3D processing but broadcasting program is 2D video). 0x01 represents 3D video and 0x02 represents 2D video.

3d_method_type (3D mode type) has an 8-bit field representing a 3D mode type according to FIG. 11. 0x01 represents "3D 2-viewpoint in respective ESs transmission scheme," 0x02 represents side-by-side scheme, 0x03 represents top-and-bottom scheme. Stream type (stream format type) has an 8-bit field representing the ES format of the program according to FIG. 3 described above.

A configuration may also be adopted in which the 3D program detail descriptor is transmitted in the case of a 3D video program, but not transmitted in the case of a 2D video program. This makes it possible to identify whether the program is 2D video program or 3D video program only based on the presence or absence of transmission of the 3D program detail descriptor.

Component_tag (component tag) has an 8-bit field. The component stream of the service can refer to the description contents (FIG. 5) shown by the component descriptor using this 8-bit field. In the program map section, the values of the component tag given to the respective streams should be different values. The component tag is a label to identify the component stream and has the same value as the component tag in the stream identification descriptor (provided that the stream identification descriptor exists in PMT).

As described above, monitoring the 3D program detail descriptor by the reception device 4 provides, if this descriptor exists, an effect that it is possible to recognize that a program currently being received or received in the future is a 3D program. In addition, when the program is a 3D program, it is possible to recognize the type of the 3D transmission scheme and when 3D video and 2D video coexist, identification thereof is possible.

Next, an example will be described where identification of 3D video or 2D video is performed in service (organized channel) units. FIG. 12 shows an example of the structure of a service descriptor which is one element of the program information. The service descriptor represents the name of an organized channel and the name of the provider together with the service format type using a character code. This descriptor is arranged in SDT.

The service descriptor has the following meanings. That is, service_type (service format type) has an 8-bit field representing the type of a service according to FIG. 13. 0x01 represents a 3D video service. The 8-bit field of service_provider_name_length (provider name length) represents the byte length of the provider name that follows. Char (character code) has an 8-bit field. A series of character information fields represents the provider name or service name. The 8-bit field of service_name_length (service name length) represents the byte length of the service name that follows.

As described above, monitoring service_type by the reception device 4 provides an effect that it is possible to recognize that a service (organized channel) is a channel of a 3D program. Thus, if it is possible to identify whether a service (organized channel) is 3D video service or a 2D video service, it is possible to display, for example, that the service is a 3D video program broadcasting service or the like using an EPG display or the like. However, even with a service that is broadcasting mainly 3D video programs, there can also be a case where 2D video must be broadcast, for example, when only 2D video is available as the source for advertisement video. Therefore, identification of a 3D video service using service_type (service format type) of the service descriptor is preferably used together with identification of a 3D video program using a combination of stream_content (component contents) and component_type (component type) which has already been described, identification of 3D video program using component_group_type (component group type) or identification of a 3D video program using a 3D program detail descriptor. When identification is performed by combining a plurality of pieces of information, it is also possible to identify that although the service is a 3D video broadcasting service, only some programs are provided as 2D video. In the case that such identification is possible, the reception device can clearly demonstrate, for example, in EPG that the service is a "3D video broadcasting service" and even when a 2D video program is mixed with the service besides the 3D video program, it is possible to switch display control or the like between the 3D video program and the 2D video program if necessary when the program is received or the like.

FIG. 14 shows an example of the structure of a service list descriptor which is one element of the program information. The service list descriptor provides a list of services based on service identification and the service format type. That is, the service list descriptor describes a list of organized channels and their types. This descriptor is arranged in NIT.

The service list descriptor has the following meanings. That is, service_id (service identification) has a 16-bit field uniquely identifying an information service within its transport stream. Service identification is equal to broadcasting program number identification (program_number) within the corresponding program map section. Service_type (service format type) has an 8-bit field representing the type of a service according to FIG. 12 described above.

Such service_type (service format type) makes it possible to identify whether the service is a "3D video broadcasting service" or not, and thereby perform a display that groups only "3D video broadcasting services" in EPG display using, for example, the organized channel indicated in the service list descriptor and the list of types.

As described above, monitoring service_type by the reception device 4 provides an effect that it is possible to recognize that the organized channel is a 3D program channel.

The examples of the descriptors described above only describe typical members, and it is also conceivable to have other members, bring together a plurality of members or divide one member into a plurality of members having detailed information.

<Example of Program Information Transmission Operation Rule>

The above-described component descriptor, component group descriptor, 3D program detail descriptor, service descriptor and service list descriptor of the program information are information generated and added, for example, by the management information adding unit 16, stored in PSI of MPEG-TS (for example, PMT) or SI (for example, EIT, SDT or NIT) and transmitted from the transmission device 1.

An example of the program information transmission operation rule in the transmission device 1 will be described below.

FIG. 15 shows an example of transmission processing of the component descriptor in the transmission device 1. "0x50" which means a component descriptor is described in "descriptor_tag." The descriptor length of the component descriptor is described in "descriptor_length." A maximum value of the descriptor length is not defined. "0x01" (video) is described in "stream_content."

The video component type of the component is described in "component_type." The component type is set from FIG. 5. A component tag value which is unique within the program is described in "component_tag." "Jpn ("0x6A706E")" is described in "ISO_639_language_code."

"Text_char" is described in 16 or fewer bytes (8 full size characters) as a video type name when a plurality of video components exist. No line feed code is used. When the component description is a default character string, this field can be omitted. The default character string is "video."

One "text_char" must be transmitted to all video components having component_tag values of 0x00 to 0x0F included in an event (program).

Performing transmission operation by the transmission device 1 and monitoring stream_content and component_type by the reception device 4 in this way provides an effect that it is possible to recognize that a program currently being received or received in the future is a 3D program.

FIG. 16 shows an example of transmission processing of the component group descriptor in the transmission device 1.

"0x9" which means the component group descriptor is described in "descriptor_tag." The descriptor length of the component group descriptor is described in "descriptor_length." No maximum value of the descriptor length is defined. "Component_group_type" shows the type of the component group. '000' indicates a multi-view television and '001' indicates 3D television.

"Total_bit_rate_flag" indicates '0' when all total bit rates in a group in an event are default values, and '1' when any one of total bit rates in a group in an event exceeds a specified default value.

The number of component groups in an event is described in "num_of_group." "Num_of_group" is set to maximum 3 in the case of multi-view television (MV TV) and set to maximum 2 in the case of 3D television (3D TV).

Component group identification is described in "component_group_id." "0x0" is assigned in the case of a main group and a broadcasting provider assigns a unique value in an event in the case of each subgroup.

The number of charging/non-charging units in the component group is described in "num_of_CA_unit." Suppose the maximum value is 2. "Num_of_CA_unit" is set to "0x1" when no component to be charged is included in the component group.

Charging unit identification is described in "CA_unit_id." The broadcasting provider assigns "CA_unit_id" which is unique in an event. The number of components that belong to the component group and also belong to the charging/non-charging unit indicated by the immediately preceding "CA_unit_id" is described in "num_of_component." Suppose a maximum value thereof is 15.

A value of a component tag that belongs to a component group is described in "component_tag." A total bit rate in the component group is described in "total_bit_rate." However, "0x00" is described therein in the case of a default value.

A byte length of a component group description that follows is described in "text_length." Suppose a maximum value thereof is 16 (8 full size characters). A description regarding a component group is must be described in "text_char." No default character string is defined. No line feed code is used either.

When a multi-view television service is performed, "component_group_type" must be set to '000' and transmitted. Furthermore, when a 3D television service is performed, "component_group_type" must be set to '001' and transmitted.

Performing transmission operation by the transmission device 1 and monitoring component_group_type by the reception device 4 in this way provides an effect that it is possible to recognize that a program currently being received or received in the future is a 3D program.

FIG. 17 shows an example of transmission processing on a 3D program detail descriptor by the transmission device 1. "0xE1" which means a 3D program detail descriptor is described in "descriptor_tag." The descriptor length of a 3D program detail descriptor is described in "descriptor_length." 3D/2D identification is described in "3_d_2d_type." This is set from FIG. 10(b). 3D mode identification is described in "3d_method_type." This is set from FIG. 11. The format of ES of the program is described in "stream_type." This is set from FIG. 3. A component tag value which is unique in the program is described in "component_tag."

Performing transmission operation by the transmission device 1 and monitoring a 3D program detail descriptor by the reception device 4 in this way provides an effect that if this descriptor exists, it is possible to recognize that a program currently being received or received in the future is a 3D program.

FIG. 18 shows an example of transmission processing on a service descriptor by the transmission device 1. "0x48" which means a service descriptor is described in "descriptor_tag." The descriptor length of the service descriptor is described in "descriptor_length." A service format type is described in "service_type."

The service format type is set from FIG. 13. The provider name length is described in "service_provider_name_length" in the case of BS/CS digital television broadcasting. Suppose a maximum value thereof is 20. "0x00" is described therein because service_provider_name is not used in digital terrestrial television broadcasting.

The provider name is described in "char" in the case of BS/CS digital television broadcasting. The provider name is described in a maximum of 10 full size characters. Nothing is described in the case of digital terrestrial television broadcasting. An organized channel name length is described in "service_name_length." Suppose a maximum value thereof is 20. An organized channel name is described in "char." The organized channel name is described in 20 or fewer bytes and in 10 or fewer full size characters. Only one organized channel name must be arranged for a channel to be organized.

Performing transmission operation by the transmission device 1 and monitoring service_type by the reception device 4 in this way provides an effect that it is possible to recognize that the organized channel is a 3D program channel.

FIG. 19 shows an example of transmission processing on a service list descriptor by the transmission device 1. "0x41" which means a service list descriptor is described in "descriptor_tag." The descriptor length of the service list descriptor is described in "descriptor_length." A loop with a number of services included in a target transport stream is described in "loop."

Service_id included in the transport stream is described in "service_id." A service type of a target service is described in "service_type." The service type is set from FIG. 13. These must be arranged for a TS loop in NIT.

Performing transmission operation by the transmission device 1 and monitoring service_type by the reception device 4 in this way provides an effect that it is possible to recognize that the organized channel is a 3D program channel.

Transmission examples of the program information by the transmission device 1 have been described so far. When a program is switched from a 2D program to a 3D program, on a first screen from which the 3D program starts and using a telop or the like, messages like "a 3D program starts from now," "3D viewing glasses should be worn for viewing in 3D display," "2D display view is recommended if your eyes are tired or your physical condition is not good," "viewing a 3D program for a long time may cause your eyes to be tired or your physical condition to worsen" or the like are inserted in the video of the 3D program created by the transmission device 1 and transmitted, which provides a merit that it is possible to give a caution or warning of the 3D program viewing to the user who watches the 3D program using the reception device 4.

<Hardware Configuration of Reception Device>

Figure 25:
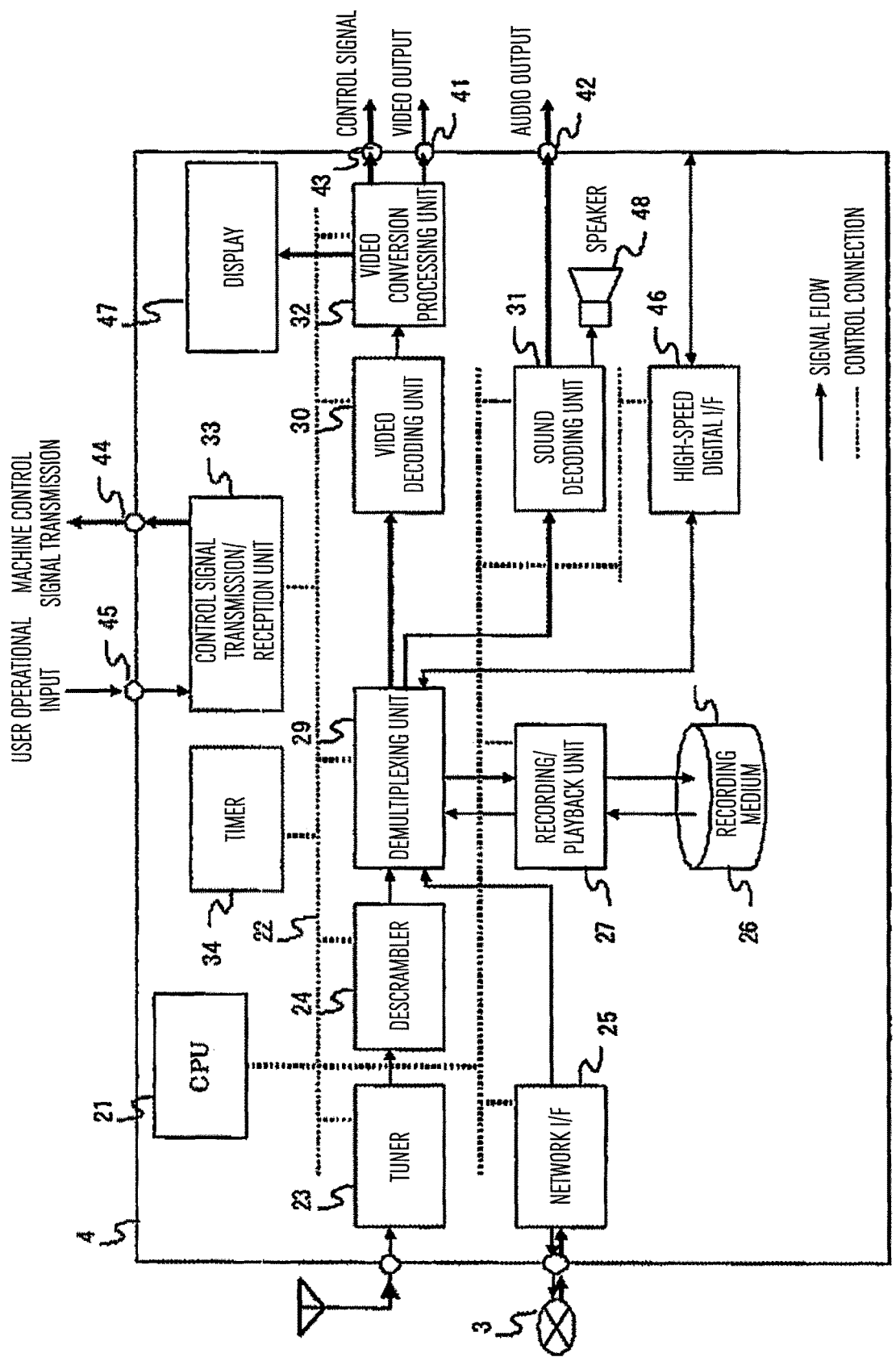
FIG. 25 shows an example of a configuration diagram of a reception device of the present invention.

FIG. 25 is a hardware configuration diagram illustrating a configuration example of the reception device 4 of the system in FIG. 1. Reference numeral 21 denotes a CPU (Central Processing Unit) that controls the entire receiver, 22 denotes a general-purpose bus for controlling and transmitting information between the CPU 21 and the respective sections in the reception device, 23 denotes a tuner that receives a broadcasting signal transmitted from the transmission device 1 via a broadcasting transmission network of radio (satellite, terrestrial), cable or the like, tunes into a specific frequency, demodulates, performs error correcting processing or the like and outputs a multiplexed packet such as MPEG2-Transport Stream (hereinafter also referred to as TS), 24 denotes a descrambler that decodes a signal scrambled by the scrambling unit 13, 25 denotes a network I/F (Interface) that transmits/receives information to/from a network and transmits/receives various types of information and MPEG2-TS between the Internet and the reception device, 26 denotes a recording medium such as HDD (Hard Disk Drive) incorporated in the reception device 4, flash memory or removable HDD, disk type recording medium, flash memory, 27 denotes a recording/playback unit that controls the recording medium 26 and controls signal recording onto the recording medium 26 or signal playback from the recording medium 26, and 29 denotes a demultiplexing unit that demultiplexes a signal multiplexed in a format such as MPEG2-TS into a signal such as video ES (Elementary Stream), sound ES or program information. "ES" refers to compressed/coded image and/or sound data. Reference numeral 30 denotes a video decoding unit that decodes video ES into a video signal, 31 denotes a sound decoding unit that decodes sound ES into an audio signal and outputs the audio signal to a speaker 48 or outputs the audio signal from an audio output 42, 32 denotes a video conversion processing unit that performs processing of converting a 3D or 2D video signal decoded by the video decoding unit 30 to a predetermined format through conversion processing which will be described later according to an instruction from the CPU, processing of superimposing a display such as OSD (On Screen Display) created by the CPU 21 on the video signal, outputs the processed video signal to a display 47 or a video signal output 41 and outputs a synchronous signal or control signal (used for machine control) corresponding to the format of the processed video signal from the video signal output 41 and the control signal output 43, 33 denotes a control signal transmission/reception unit that receives an operational input from a user operational input 45 (e.g., key code from a remote controller that transmits an IR (Infrared Radiation) signal) and transmits a machine control signal (e.g., IR) to an external device generated by the CPU 21 or video conversion processing unit 32 from the machine control signal transmission unit 44, 34 denotes a timer that incorporates a counter and maintains a current time, 46 denotes a high-speed digital I/F such as serial interface or IP interface that performs necessary processing such as encryption on TS reconfigured in the demultiplexing unit, outputs TS to the outside or decodes TS received from the outside and inputs the decoded TS to the demultiplexing unit 29, 47 denotes the display that displays 3D video and 2D video decoded by the video decoding unit 30 and video-converted by the video conversion processing unit 32, and 48 denotes the speaker that outputs sound based on the audio signal decoded by the sound decoding unit, and the reception device 4 is mainly constructed of these devices. Even when video is displayed in 3D on the display, the synchronous signal or control signal is outputted from the control signal output 43 or the machine control signal transmission terminal 44 if necessary.

Figure 35:
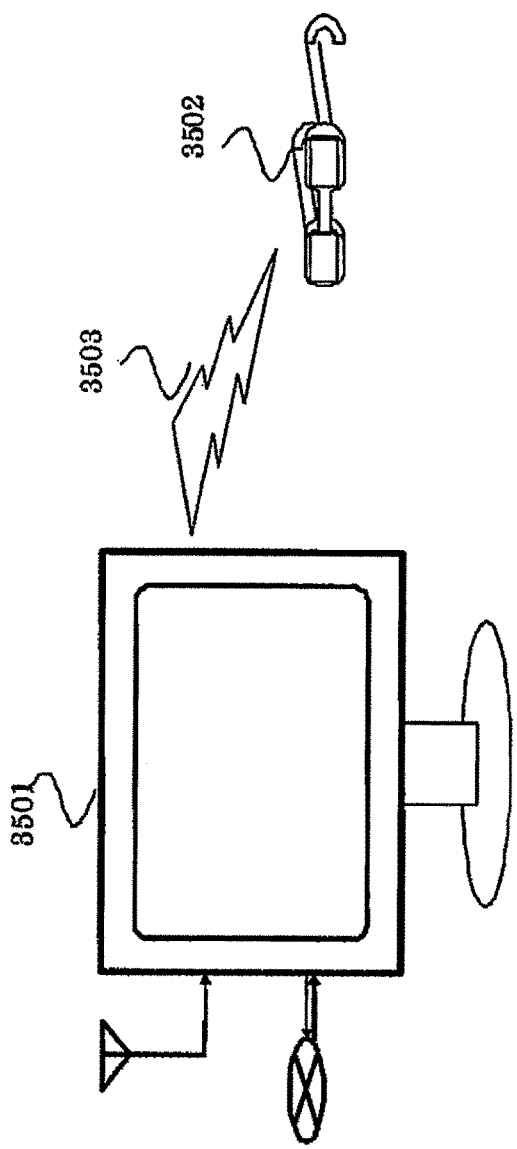
FIG. 35 shows an example of a block diagram illustrating a system configuration.
Figure 36:
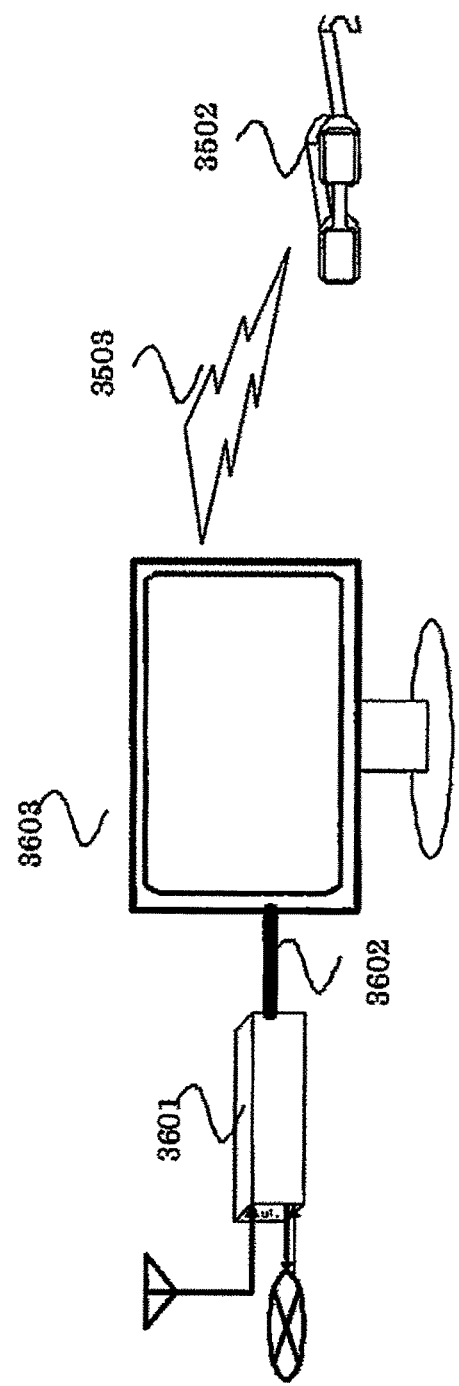
FIG. 36 shows an example of a block diagram illustrating a system configuration.

FIG. 35 and FIG. 36 show examples of the system configuration including the reception device, viewing device and 3D auxiliary viewing device (e.g., 3D glasses). FIG. 35 shows an example of the system configuration in which the reception device and the viewing device are integrated as one unit and FIG. 36 shows an example of the system configuration in which the reception device and the viewing device are configured as separate bodies.

In FIG. 35, reference numeral 3501 denotes a display device that includes the configuration of the reception device 4 and can perform 3D video display and audio output, 3503 denotes a 3D auxiliary viewing device control signal (e.g., IR signal) outputted from the display device 3501, and 3502 denotes a 3D auxiliary viewing device. In the example of FIG. 35, a video signal is displayed from a video display provided for the display device 3501 and an audio signal is outputted from a speaker provided for the display device 3501. Similarly, the display device 3501 is provided with an output terminal that outputs a 3D auxiliary viewing device control signal outputted from the output of the machine control signal 44 or control signal 43.

An example has been described above assuming that the display device 3501 and the 3D auxiliary viewing device 3502 shown in FIG. 35 perform display based on an active shutter scheme, which will be described later, but in the case of a scheme whereby the display device 3501 and the 3D auxiliary viewing device 3502 shown in FIG. 35 perform 3D video display through polarization splitting, which will be described later, the 3D auxiliary viewing device 3502 needs only to perform polarization splitting so that different videos impinge upon the left eye and the right eye, and there is no need to output the 3D auxiliary viewing device control signal 3503 outputted from the output of the machine control signal 44 or the control signal 43 from the display device 3501 to the 3D auxiliary viewing device 3502.

Furthermore, in FIG. 36, reference numeral 3601 denotes a video/audio output apparatus including the configuration of the reception device 4, 3602 denotes a transmission path (e.g., HDMI cable) that transmits a video/audio/control signal, and 3603 denotes a display that outputs and displays a video signal or an audio signal inputted from outside.

In this case, the video signal outputted from the video output 41 of the video/audio output apparatus 3601 (reception device 4), the audio signal outputted from the audio output 42 and the control signal outputted from the control signal output 43 are converted to a transmission signal of a format suitable for the format defined in the transmission path 3602 (e.g., format defined in the HDMI standard) and inputted to the display 3603 via the transmission path 3602. The display 3603 receives the transmission signal, decodes it into the original video signal, audio signal and control signal, outputs video and sound and outputs the 3D auxiliary viewing device control signal 3503 to the 3D auxiliary viewing device 3502.

An example has been described above assuming that the display device 3603 and the 3D auxiliary viewing device 3502 shown in FIG. 36 perform display based on the active shutter scheme, which will be described later. In the case of a scheme whereby the display device 3603 and the 3D auxiliary viewing device 3502 shown in FIG. 36 perform 3D video display through polarization splitting, which will be described later, the 3D auxiliary viewing device 3502 needs only to perform polarization splitting so that different videos impinge upon the left eye and the right eye, and there is no need to output the 3D auxiliary viewing device control signal 3603 from the display device 3603 to the 3D auxiliary viewing device 3502.

Some of the components 21 to 46 shown in FIG. 25 may be constructed of one or a plurality of LSIs. Furthermore, functions of some of the components 21 to 46 shown in FIG. 25 may be implemented by software.

<Function Block Diagram of Reception Device>

Figure 26:
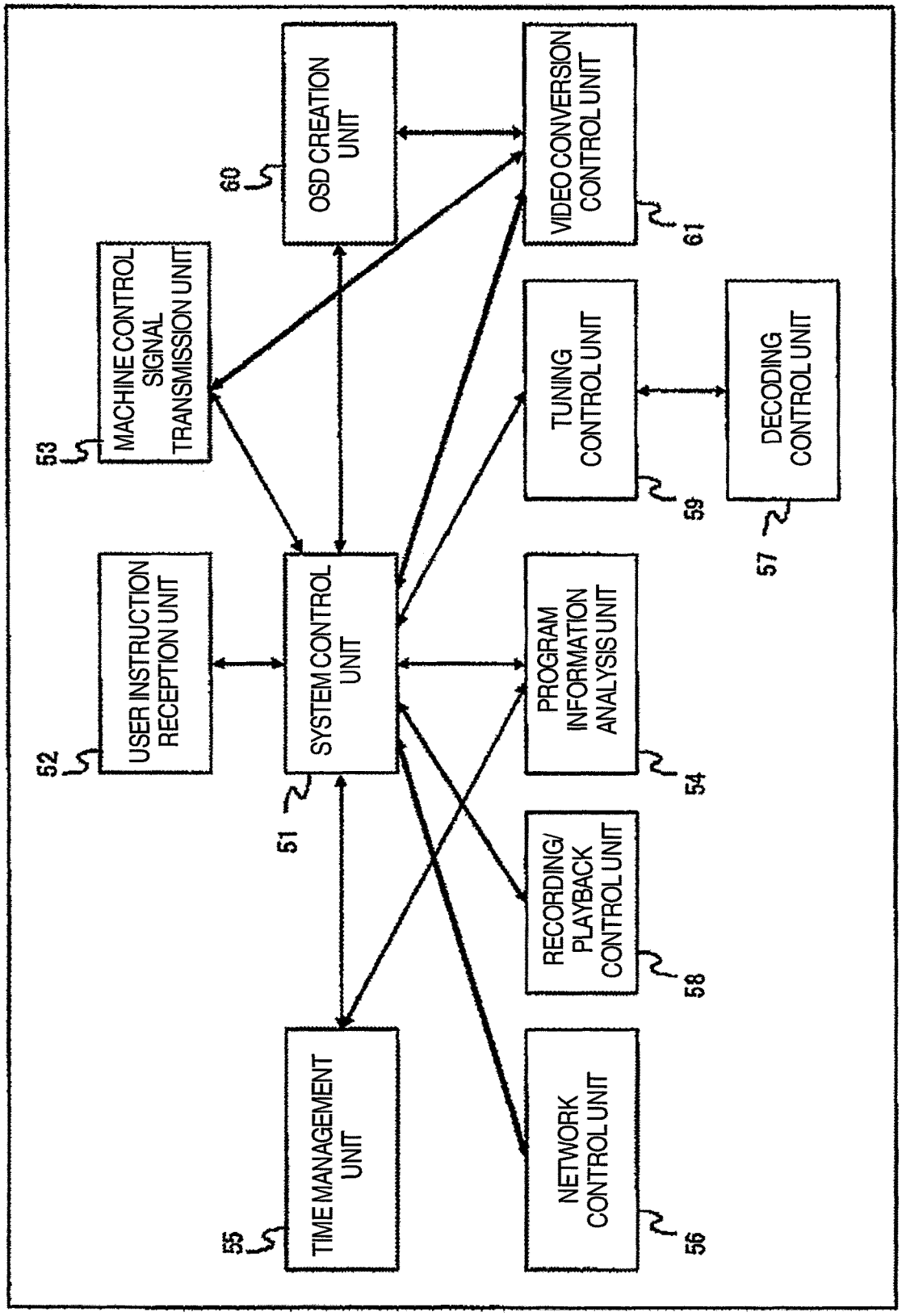
FIG. 26 shows an example of schematic diagram of a CPU internal function block diagram of the reception device of the present invention.

FIG. 26 shows an example of a function block configuration of processing inside the CPU 21. Here, each function block exists, for example, as a software module executed by the CPU 21 and information or data and control instructions are exchanged among the modules through certain means (e.g., message passing, function call, event transmission) or the like.

Furthermore, each module also transmits/receives information to/from each hardware component inside the reception device 4 via the general-purpose bus 22. Relational lines (arrows) illustrated in this figure mainly describe parts associated with the present description, but there are also communication means and processing requiring communication among other modules. For example, a tuning control unit 59 acquires program information necessary for tuning from a program information analysis unit 54 as appropriate.

Next, functions of the respective function blocks will be described. A system control unit 51 manages a state of each module and an instruction state of the user or the like and provides control instructions for each module. A user instruction reception unit 52 receives and interprets an input signal of the user operation received by the control signal transmission/reception unit 33 and transmits the user instruction to the system control unit 51. Following the instructions from the system control unit 51 or other modules, a machine control signal transmission unit 53 instructs the control signal transmission/reception unit 33 to transmit a machine control signal.

A program information analysis unit 54 acquires program information from the demultiplexing unit 29, analyzes contents and provides necessary information to each module. A time management unit 55 acquires time correction information (TOT: Time offset table) included in TS from the program information analysis unit 54, manages the current time and notifies an alarm (notification of arrival of a specified time) or one-shot timer (notification of lapse of a certain time) at the request of each module using the counter provided for the timer 34.

A network control unit 56 controls the network I/F 25 and acquires various types of information and TS from a specific URL (Unique Resource Locater) or specific IP (Internet Protocol) address. A decoding control unit 57 controls the video decoding unit 30 and the sound decoding unit 31 to start or stop decoding and acquire information included in a stream.

A recording/playback control unit 58 controls the recording/playback unit 27 to read a signal from the recording medium 26 from a specific position of specific content and in an arbitrary reading format (normal playback, fast forward, rewind, pause). The recording/playback control unit 58 also controls recording of a signal inputted to the recording/playback unit 27 onto the recording medium 26.

A tuning control unit 59 controls the tuner 23, the descrambler 24, the demultiplexing unit 29 and the decoding control unit 57 to receive broadcasting and record a broadcasting signal. Alternatively, the tuning control unit 59 performs control over processes from playback from the recording medium to output of a video signal and an audio signal. Details of broadcasting reception operation, broadcasting signal recording operation, and playback operation from the recording medium will be described later.

An OSD creation unit 60 creates OSD data containing a specific message and instructs a video conversion control unit 61 to superimpose the created OSD data on a video signal and output the signal. Here, the OSD creation unit 60 performs 3D message display or the like by creating OSD data with a parallax for the left eye and for the right eye and requesting the video conversion control unit 61 to perform 3D display based on the OSD data for the left eye and for the right eye.

The video conversion control unit 61 controls the video conversion processing unit 32 to convert the video signal inputted from the video decoding unit 30 to the video conversion processing unit 32 to 3D or 2D video according to an instruction from the system control unit 51, superimpose the converted video on the OSD inputted from the OSD creation unit 60, further process (scaling, PinP, 3D display or the like) the video if necessarily, display the video on the display 47 or output the video to outside. Details of a method of conversion of 3D video or 2D video to a predetermined format in the video conversion processing unit 32 will be described later. The respective function blocks provide these functions.

<Broadcasting Reception>

Here, a control procedure and a signal flow thereof when performing broadcasting reception will be described. First, the system control unit 51 that has received the user's instruction (e.g., pressing of a CH button of the remote controller) indicating broadcasting reception of a specific channel (CH) from the user instruction reception unit 52 instructs the tuning control unit 59 to tune in the CH instructed by the user (hereinafter referred to as specified CH).

The tuning control unit 59 that has received the instruction instructs the tuner 23 to perform reception control over the specified CH (tuning into a specified frequency band, broadcasting signal demodulation processing, error correcting processing) and output TS to the descrambler 24.

Next, the tuning control unit 59 instructs the descrambler 24 to descramble the TS and output the TS to the demultiplexing unit 29 and instructs the demultiplexing unit 29 to demultiplex the inputted TS, output the demultiplexed video ES to the video decoding unit 30 and output sound ES to the sound decoding unit 31.

Furthermore, the tuning control unit 59 instructs the decoding control unit 57 to decode video ES and sound ES inputted to the video decoding unit 30 and the sound decoding unit 31. The decoding control unit 31 that has received the decoding instruction controls the video decoding unit 30 to output the decoded video signal to the video conversion processing unit 32, and controls the sound decoding unit 31 to output the decoded audio signal to the speaker 48 or the audio output 42. In this way, control is performed to output video and sound of the user specified CH.

Furthermore, in order to display a CH banner (OSD to display the CH number, program name, program information or the like) during tuning, the system control unit 51 instructs the OSD creation unit 60 to create and output the CH banner. The OSD creation unit 60 that has received the instruction transmits data of the created CH banner to the video conversion control unit 61 and the video conversion control unit 61 that has received the data performs control so that the CH banner is superimposed on the video signal and outputted. A message is displayed during tuning or the like in this way.

<Recording of Broadcasting Signal>

Next, recording control of a broadcasting signal and a signal flow thereof will be described. When recording a specific CH, the system control unit 51 instructs the tuning control unit 59 to tune into the specific CH and output a signal to the recording/playback unit 27.

The tuning control unit 59 that has received the instruction instructs the tuner 23 to perform reception control over the specified CH as in the case of the broadcasting reception processing and controls the descrambler 24 to descramble MPEG2-TS received from the tuner 23 and control the demultiplexing unit 29 to output the input from the descrambler 24 to the recording/playback unit 27.

Furthermore, the system control unit 51 instructs the recording/playback control unit 58 to record the input TS to the recording/playback unit 27. The recording/playback control unit 58 that has received the instruction performs necessary processing such as encryption on the signal (TS) inputted to the recording/playback unit 27, creates additional information necessary for recording/playback (program information of recording CH, content information such as bit rate) and records management data (ID of recording content, recording position on the recording medium 26, recording format, encryption information or the like), and then performs processing of writing the MPEG2-TS and additional information, management data to the recording medium 26. The broadcasting signal is recorded in this way.

<Playback from Recording Medium>

Next, playback processing from a recording medium will be described. When playing back a specific program, the system control unit 51 instructs the recording/playback control unit 58 to play back the specific program. In this case, the system control unit 51 instructs the content ID and playback starting position (e.g., start of the program, position of 10 minutes from the start, continuation from the last scene, position of 100 Mbytes from the start or the like). The recording/playback control unit 58 that has received the instruction controls the recording/playback unit 27 to read the signal (TS) from the recording medium 26 using the additional information and the management data, perform necessary processing such as decoding of encryption and then perform processing on the demultiplexing unit 29 so as to output TS.

Furthermore, the system control unit 51 instructs the tuning control unit 59 to output video and sound of the playback signal. The tuning control unit 59 that has received the instruction performs control such that the input from the recording/playback unit 27 is outputted to the demultiplexing unit 29 and instructs the demultiplexing unit 29 to demultiplex the inputted TS, output the demultiplexed video ES to the video decoding unit 30 and output the demultiplexed sound ES to the sound decoding unit 31.

Furthermore, the tuning control unit 59 instructs the decoding control unit 57 to decode the video ES and sound ES inputted to the video decoding unit 30 and the sound decoding unit 31. The decoding control unit 31 that has received the decoding instruction controls the video decoding unit 30 to output the decoded video signal to the video conversion processing unit 32 and controls the sound decoding unit 31 to output the decoded audio signal to the speaker 48 or the audio output 42. Processing of signal playback from the recording medium is performed in this way.

<3D Video Display Method>

Examples of 3D video display scheme applicable to the present invention include several schemes that create video for the left eye and for the right eye to cause the left eye and right eye to feel a parallax and cause people to recognize as if a three-dimensional object exists.

One such scheme is an active shutter scheme in which the left and right glasses worn by the user are alternately light-shielded using a liquid crystal shutter or the like, videos for the left eye and for the right eye are displayed in synchronization therewith to produce a parallax in images reflected in the left and right eyes.

In this case, the reception device 4 outputs a synchronous signal and a control signal to the active shutter glasses worn by the user from the control signal output 43 or the machine control signal transmission terminal 44. Furthermore, the reception device 4 outputs a video signal from the video signal output 41 to an external 3D video display device to cause the 3D video display device to alternately display video for the left eye and video for the right eye. Alternatively, the reception device 4 causes the display 47 provided for the reception device 4 to perform similar 3D display. This allows the user wearing the active shutter mode glasses to view the 3D video on the display 47 provided for the 3D video display device or the reception device 4.

Furthermore, another scheme is a polarization scheme whereby films whose linear polarizations are orthogonal to each other are pasted to the left and right glasses worn by the user or linear polarization coating is applied thereto, or films having mutually opposite rotation directions of the polarization axis of circular polarization are pasted to the glasses or circular polarization coating is applied thereto, video for the left eye and video for the right eye using different polarizations corresponding to polarizations of the left eye and right eye glasses are simultaneously outputted, and videos impinging upon the left eye and the right eye are thereby separated according to their polarization states respectively to produce a parallax between the left eye and the right eye.

In this case, the reception device 4 outputs a video signal from the video signal output 41 to the external 3D video display device and the 3D video display device displays the video for the left eye and the video for the right eye in different polarization states. Alternatively, the display 47 provided for the reception device 4 performs similar display. This allows the user wearing polarization glasses to view 3D video on the display 47 provided for the 3D video display device or reception device 4. The polarization scheme enables 3D video to be viewed without the need for sending a synchronous signal or a control signal from the reception device 4 to the polarization glasses, and it is therefore not necessary to output a synchronous signal or a control signal from the control signal output 43 or the machine control signal transmission terminal 44.

In addition, a color separation scheme whereby videos of the left and right eyes are separated may also be used. Furthermore, a parallax barrier scheme whereby 3D video is created using a parallax barrier which is viewable by naked eyes may also be used.

The 3D display scheme according to the present invention is not limited to any specific scheme.

<Specific Example of Method of Deciding 3D Program Using Program Information>

As an example of a method of deciding a 3D program, it is possible to acquire information for deciding whether a program is a newly included 3D program or not from various tables and descriptors included in the program information of the broadcasting signal described above and the playback signal and decide whether the program is a 3D program or not.

It is decided whether the program is a 3D program or not by checking information for deciding whether the program is a 3D program newly included in a component descriptor component group descriptor described in tables such as PMT or EIT (schedule basic/schedule extended/present/ following), or checking a 3D program detail descriptor which is a new descriptor for deciding a 3D program, checking information for deciding whether the program is a 3D program newly included in the service descriptor, service list descriptor or the like described in tables such as NIT or SDT or the like. Such information is added to a broadcasting signal in the aforementioned transmission device and transmitted. In the transmission device, the information is added to a broadcasting signal, for example, by the management information adding unit 16.

The respective tables are used for different purposes, for example, PMT describes only information on a current program, and it is therefore not possible to check about information on future programs but PMT has a feature that its reliability is high. On the other hand, EIT [schedule basic/schedule extended] allows not only information on the current program but also future programs to be acquired, but EIT has such demerits that it requires a long time until reception is completed, requires a large storage region and has low reliability because EIT handles future events. Since EIT [following] allows information on a program of the next broadcasting time to be acquired, EIT is suitable for application to the present embodiment. Furthermore, EIT [present] can be used to acquire the current program information and it is possible to acquire information different from that of PMT.

Next, detailed examples of processing of the reception device 4 relating to the program information described in FIG. 4, FIG. 6, FIG. 10, FIG. 12 and FIG. 14 transmitted from the transmission device 1 will be described.

FIG. 20 shows an example of processing on each field of a component descriptor in the reception device 4.

When "descriptor_tag" is "0x50," the descriptor is decided to be a component descriptor. With "descriptor_length," the descriptor is decided to indicate the descriptor length of a component descriptor. When "stream_content" is "0x01", "0x05", "006", "0x07," the descriptor is decided to be valid (video). When "stream_content" is other than "0x01", "0x05", "0x06", "0x07," the descriptor is decided to be invalid. When "stream_content" is "0x01", "0x05", "0x06", "0x07," subsequent processing is performed.

With "component_type" the descriptor is decided to indicate a video component type of the component. Any one value in FIG. 5 is specified for this component type. The contents thereof make it possible to decide whether the component is a component about a 3D video program or not.

"Component_tag" is a component tag value which is unique in the program and can be used in association with the component tag value of a stream identifier of PMT.

"ISO_639_language_code" handles a character code arranged later as "jpn" even other than "jpn ("0x6A706E")."

With "text_char," the descriptor within 16 bytes (8 full size characters) is decided to be a component description.

When this field is omitted, the descriptor is decided to indicate a default component description. The default character string is "video."

As described above, the component descriptor makes it possible to decide a video component type making up an event (program) and the component description can be used to select a video component in the receiver.

Only video components whose component_tag value is set to value 0x00 to 0x0F can be singly regarded as selection targets. Video components set with values other than the above-described component_tag values are not singly regarded as selection targets and should not be targets of the component selection function or the like.

Furthermore, due to a mode change or the like in an event (program), the component description may not match the actual component. (Component_type of the component descriptor describes a typical component type of the component and this value must not be changed in real time when a mode change occurs in the middle of the program.)

Furthermore, component_type described by the component descriptor is referenced to decide default maximum_bit_rate when information for controlling a copy generation in a digital recording device and a digital copy control descriptor which is a description of a maximum transmission rate are omitted for the event (program).

Performing processing on each field of the present descriptor by the reception device 4 and thereby monitoring stream_content and component_type by the reception device 4 in this way provides an effect that it is possible to recognize that a program currently being received or received in the future is a 3D program.

FIG. 21 shows an example of processing on each field of a component group descriptor in the reception device 4.

When "descriptor_tag" is "0xD9," the descriptor is decided to be a component group descriptor. With "descriptor_length," the descriptor is decided to indicate a descriptor length of the component group descriptor.

When "component_group_type" is '000,' the descriptor is decided to indicate a multi-view television service and when it is '001,' the descriptor is decided to indicate a 3D television service.

When "total_bit_rate_flag" is '0,' the total bit rate in the group in an event (program) is decided not to be described in the descriptor. When it is '1,' the total bit rate in the group in an event (program) is decided to be described in the descriptor.

With "num_of_group," the descriptor is decided to indicate the number of component groups in an event (program). When a maximum value exists and if the maximum value is exceeded, it may be handled as the maximum value.

When "component_group_id" is "0x0," the descriptor is decided to indicate a main group. When it is other than "0x0," the descriptor is decided to indicate a subgroup.

With "num_of_CA_unit," the descriptor is decided to indicate the number of charging/non-charging units in the component group. When a maximum value is exceeded, it may be handled as 2.

When "CA_unit_id" is "0x0," the descriptor is decided to indicate a non-charging unit group. When it is "0x1," the descriptor is decided to indicate a charging unit including a default ES group. When it is other than "0x0" and "0x1," the descriptor is decided to be charging unit identification other than that described above.

With "num_of_component," the descriptor is decided to indicate the number of components that belong to the component group and also belong to the charging/non-charging unit indicated by immediately preceding CA_unit_id. When a maximum value is exceeded, it may be handled as 15.

With "component_tag," the descriptor is decided to indicate a value of a component tag that belongs to the component group and can be used in association with the component tag value of a stream identifier of PMT.

With "total_bit_rate," the descriptor is decided to indicate a total bit rate in the component group. When "total_bit_rate" is "0x00," it is decided to be a default.

When "text_length" is equal to or less than 16 (8 full size characters), the descriptor is decided to indicate a component group description length and when "text_length" is greater than 16 (8 full size characters), a descriptive text corresponding to its portion in which the component group description length exceeds 16 (8 full size characters) may be ignored.

"Text_char" refers to a descriptive text relating to the component group. Based on the arrangement of the component group descriptor of component_group_type='000,' it is possible to decide that a multi-view television service is provided in the event (program) and use the descriptive text for processing per component group.

Furthermore, based on the arrangement of the component group descriptor of component_group_type='001;' it is possible to decide that a 3D television service is provided in the event (program) and use the descriptive text for processing per component group.

Furthermore, the default ES group of each group must be described in a component loop disposed at the beginning of a CA_unit loop.

In a main group (component_group_id=0x0), if the default ES group of the group is a non-charging target, free_CA_mode=0 is set, but the component loop of CA_unit_id=0x1 should not be set.

if the default ES group of the group is a charging target, free_CA_mode=1 is set and the component loop of CA_unit_id="0x1" must be set and described.

Furthermore, in a subgroup (component_group_id>0x0), for the subgroup, only the same charging unit as that of the main group or non-charging unit can be set.

if the default ES group of the group is a non-charging target, the component loop of CA_unit_id=0x0 is set and described.

if the default ES group of the group is a charging target, the component loop of CA_unit_id=0x1 is set and described.

Performing processing on each field of the present descriptor by the reception device 4 and thereby monitoring component_group_type by the reception device 4 in this way provides an effect that it is possible to recognize that a program currently being received or received in the future is a 3D program.

FIG. 22 shows an example of processing on each field of a 3D program detail descriptor in the reception device 4.

When "descriptor_tag" is "0xE1," the descriptor is decided to be a 3D program detail descriptor. With "descriptor_length," the descriptor is decided to indicate a descriptor length of the 3D program detail descriptor. With "3d_2d_type," the descriptor is decided to indicate 3D/2D identification in the 3D program. The 3D/2D identification is specified from FIG. 10(*b*). With "3d_method_type," the descriptor is decided to indicate 3D mode identification in the 3D program. The 3D mode identification is specified from FIG. 11.

With "stream_type," the descriptor is decided to indicate an ES format of the 3D program. The ES format of the 3D program is specified from FIG. 3. With "component_tag,"

the descriptor is decided to indicate a component tag value which is unique in the 3D program. The component tag value can be used in association with the component tag value of a stream identifier of PMT.

A configuration may also be adopted in which the program is decided to be a 3D video program or not based on the presence or absence of the 3D program detail descriptor itself. That is, in this case, the program is decided to be a 2D video program if there is no 3D program detail descriptor and the program is decided to be a 3D video program if there is a 3D program detail descriptor.

Performing processing on each field of the present descriptor by the reception device 4 and thereby monitoring the 3D program detail descriptor by the reception device 4 in this way provides an effect that if this descriptor exists, it is possible to recognize that a program currently being received or received in the future is a 3D program.

FIG. 23 shows an example of processing on each field of the service descriptor in the reception device 4. When "descriptor_tag" is "0x48," the descriptor is decided to be a service descriptor. With "descriptor_length," the descriptor is decided to indicate the descriptor length of a service descriptor. When "service_type" is other than service_type shown in FIG. 13, the descriptor is decided to be invalid.

In the case of reception of BS/CS digital television broadcasting, with "service_provider_name_length" equal to or less than 20, the descriptor is decided to indicate a provider name length and when "service_provider_name_length" is greater than 20, the provider name is decided to be invalid. On the other hand, in the case of reception of digital terrestrial television broadcasting, with "service_provider_name_length" other than "0x00," the descriptor is decided to be invalid.

With "char," the descriptor is decided to indicate a provider name in the case of reception of BS/CS digital television broadcasting. On the other hand, in the case of reception of digital terrestrial television broadcasting, the described contents are ignored. With "service_name_length" equal to or less than 20, the descriptor is decided to indicate an organized channel name length and with "service_name_length" greater than 20, the organized channel name is decided to be invalid.

With "char," the descriptor is decided to indicate an organized channel name. When SDT in which descriptors are arranged cannot be received according to the example of transmission processing shown in FIG. 18 above, basic information of the target service is decided to be invalid.

Performing processing on each field of the present descriptor by the reception device 4 and thereby monitoring service_type by the reception device 4 in this way provides an effect that the organized channel is a 3D program channel.

FIG. 24 shows an example of processing on each field of the service list descriptor in the reception device 4. When "descriptor_tag" is "0x41," the descriptor is decided to be a service list descriptor. With "descriptor_length," the descriptor is decided to indicate the descriptor length of a service list descriptor.

With "loop," the descriptor describes a loop with a number of services included in a target transport stream. With "service_id," the descriptor is decided to indicate service_id corresponding to the transport stream. With "service_type," the descriptor indicates the service type of a target service. Any "service_type" other than the service type defined in FIG. 13 is decided to be invalid.

As described above, the service list descriptor can be decided to be information on transport streams included in the target network.

Performing processing on each field of the present descriptor by the reception device 4 and thereby monitoring service_type by the reception device 4 in this way provides an effect that it is possible to recognize that the organized channel is a 3D program channel.

Next, descriptors in each table will be described more specifically. First, it is possible to decide the ES format by the type of data in stream_type described in the 2nd loop (loop per ES) of PMT as described in FIG. 3 above and if a description indicating that the stream currently being broadcast is 3D video exists therein, that program is decided to be a 3D program (e.g., if 0x1F indicating a subbit stream (other viewpoint) of multi-viewpoint video coding (e.g., H.264/MVC) stream exists in stream_type, that program is decided to be a 3D program).

Furthermore, in addition to stream_type, it is also possible to assign a 2D/3D identification bit to newly identify a 3D program or 2D program for a region assumed to be currently reserved in PMT and make a decision in the region.

EIT can be likewise decided by newly assigning a 2D/3D identification bit to the reserved region.

When deciding a 3D program using component descriptors arranged in PMT and/or EIT, it is possible, as described in FIGS. 4 and 5 above, to assign the type indicating 3D video to a component descriptor component_type (e.g., FIGS. 5(*c*) to (*e*)), and if there is one whose component_type indicates 3D, that program can be decided as a 3D program. (E.g., FIGS. 5(*c*) to (*e*) or the like are assigned and it is checked that the values exist in the program information of the target program.)

As the deciding method using component group descriptors arranged in EIT, as described in FIGS. 6 and 7 above, a description indicating a 3D service is assigned to the value of component_group_type and if the value of component_group_type indicates a 3D service, the program can be decided to be a 3D program (e.g., when the bit field is 001, a 3D TV service or the like is assigned and it is checked that the value exists in the program information of the target program).

As the deciding method using 3D program detail descriptors arranged in PMT and/or EIT, as described in FIGS. 10 and 11 above, when deciding whether the target program is a 3D program or not, it is possible to make a decision based on contents of 3d_2d_type (3D/2D type) in the 3D program detail descriptor. Furthermore, when no 3D program detail descriptor is transmitted about the reception program, the program is decided to be a 2D program. Furthermore a method may also be adopted whereby if the 3D mode type (above-described 3d_method_type) included in the descriptor indicates a 3D mode that can be supported by the reception device, the next program is decided to be a 3D program. In that case, though analyzing processing of descriptors becomes more complicated, it is possible to stop the operation of performing message display processing or recording processing on the 3D program supported by the reception device.

In the information on service_type included in service descriptors arranged in SDT and service list descriptors arranged in NIT, when a 3D video service is assigned to 0x01 as described in FIGS. 12 and 13 and 14 above, if the descriptors acquire certain program information, the program can be decided to be a 3D program. In this case, the decision is made not in program units but in service (CH, organized channel) units, and although it is not possible to make a 3D program decision on the next program in the same organized channel, there is also an advantage that information is acquired easily because the information is not acquired in program units.

Furthermore, program information may also be acquired using a dedicated communication path (broadcasting signal or the Internet). In that case, a 3D program decision can be likewise made as long as there are identifiers indicating the program start time, CH (broadcasting organized channel, URL or IP address) and that the program is a 3D program.

Various types of information (information included in tables and descriptors) to decide whether video is 3D video or not in service (CH) or program units have been described above, but all the information need not be transmitted in the present invention. Only necessary information may be transmitted according to the broadcasting mode. Among those types of information, it may be possible to decide whether video is 3D video or not in service (CH) or program units by checking a single piece of information or decide whether video is 3D video or not in service (CH) or program units by combining a plurality of pieces of information. When such a decision is made by combining a plurality of pieces of information, it is also possible to make such a decision that only some programs are 2D video though the service is a 3D video broadcasting service. When such a decision can be made, the reception device can clearly state, for example, on EPG that the service is a "3D video broadcasting service" and even when besides the 3D video program, a 2D video program is mixed in the service, it is possible to switch display control between the 3D video program and 2D video program when receiving the program.

When a program is decided to be a 3D program using the above-described 3D program deciding method, if, for example, 3D components specified in FIGS. 5(*c*) to (*e*) can be appropriately processed (displayed, outputted) by the reception device 4, the 3D components are processed (played back, displayed, outputted) in 3D and if the 3D components cannot be processed (played back, displayed, outputted) appropriately by the reception device 4 (e.g., when there is no 3D video playback function corresponding to the specified 3D transmission scheme), the 3D components may be processed (played back, displayed, outputted) in 2D. In this case, information indicating that the reception device cannot display or output the 3D video program in 3D appropriately may be displayed along with 2D video display and output.

Figure 50:
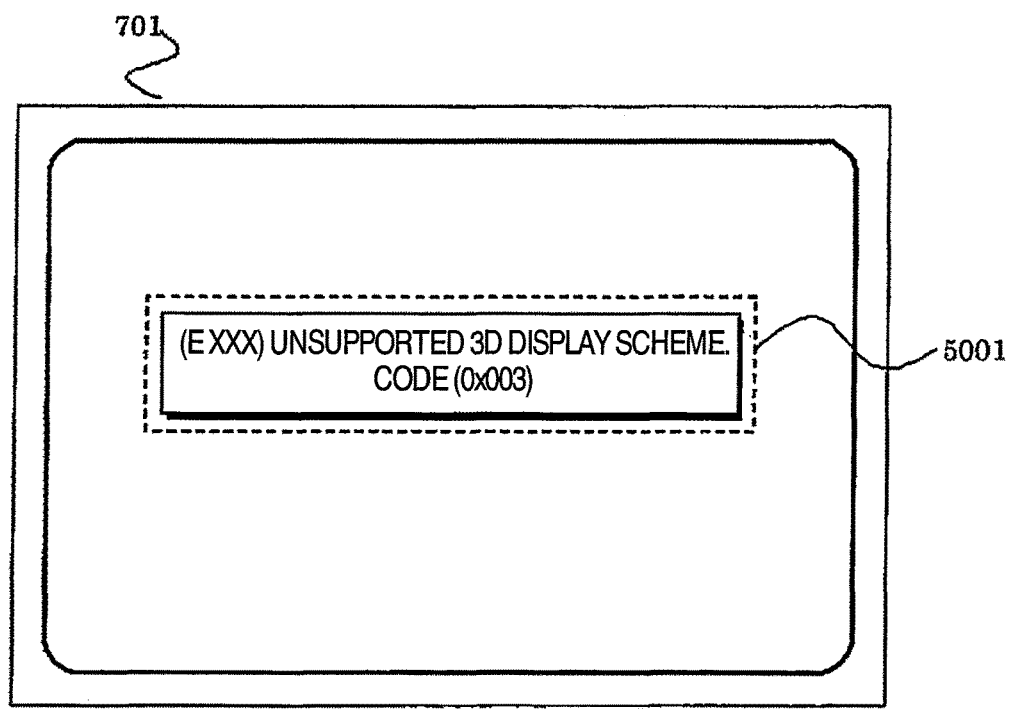
FIG. 50 shows an example of message display.

FIG. 50 shows an example of message display in this case. Reference numeral 701 denotes the entire screen displayed or outputted by the device and 5001 shows an example of a message notifying the user that it is a 3D mode type that cannot be processed by the reception device 4. The message 5001 may also display an error code indicating the type of error, 3D mode type (e.g., value of 3d_method_type) and a value that combines them. This gives a merit of allowing the user to decide the internal situation of the reception device.

Figure 49:
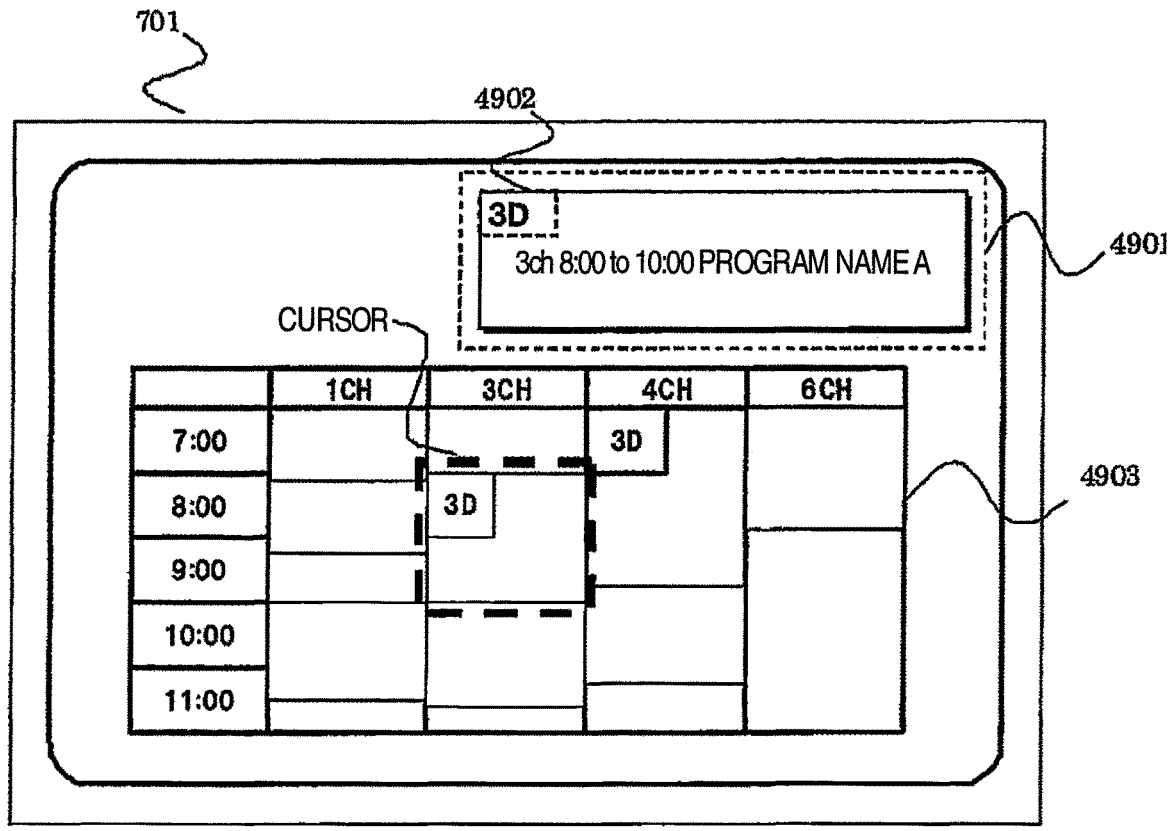
FIG. 49 shows an example of a program table display.

An example of the processing flow of the system control unit 51 when displaying an error message will be described using FIG. 51. The system control unit 51 acquires program information on the current program from the program information analysis unit 54 (S201) and decides whether the current program is a 3D program or not using the above-described 3D program deciding method. When the current programs is not a 3D program (no in S202), the system control unit 51 does not perform processing in particular. Next, when the current program is a 3D program (yes in S202), the system control unit 51 checks whether the reception device supports the 3D mode type for the current program or not (S802). To be more specific, a method may be available which decides whether the 3D mode type included in the program information (e.g., 3d_method_type described in the 3D program detail descriptor) is a value indicating the 3D mode supported by the reception device 4 or not. The values of supported 3D mode types may be stored in the storage section or the like of the reception device 4 beforehand to be used for decisions. When the decision result shows that the program is a 3D mode type supported by the reception device (yes in S802), no message or the like is displayed particularly. In the case of a 3D mode type not supported by the reception device (no in S802), a message indicating that the type is unsupported by the device is displayed as shown in FIG. 49 is displayed (S803).

By doing so, the user can comprehend whether the program is a program broadcast as a 2D video program or a program which is broadcast as a 3D video program but is displayed as 2D video because it cannot be processed appropriately by the reception device.

<Display Example of Electronic Program Table and Display Example of Screen Display of 3D Program>

Figure 48:
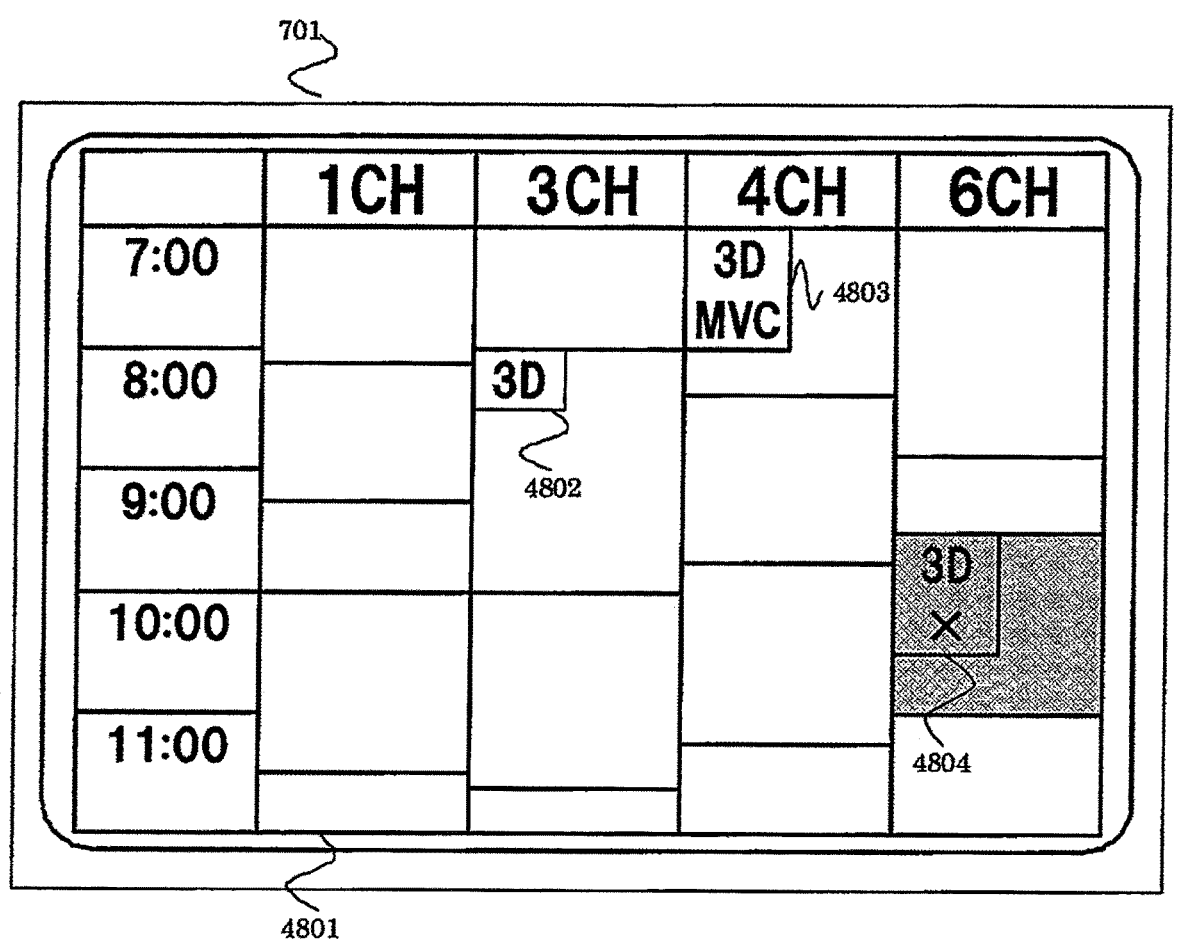
FIG. 48 shows an example of a program table display.

FIG. 48 shows a display example of en electronic program table including a 3D program. The electronic program table is configured mainly based on program information included in EIT multiplexed with a broadcasting signal and transmitted, and besides this, program information data may be transmitted using broadcasting specific multiplexing scheme or program information may be transmitted via the Internet or the like. Examples of information used for the electronic program table include event (program)-related program name, broadcasting start time, broadcasting period, other detailed information of program (actors, director, information relating to video and/or sound decoding, series name or the like), and the electronic program table as shown in FIG. 48 is configured based on such information. EIT is transmitted for not only a program currently being broadcast but also programs to be broadcast in the future. That is, the reception device can perform display processing on the electronic program table shown below using information contained in EIT regarding the program currently being received and programs to be received in the future.

Reference numeral 701 in FIG. 48 denotes the entire screen displayed or outputted by the device, 4801 denotes the entire electronic program table presented on the screen, the horizontal axis shows a service (CH: channel), the vertical axis shows a time scale, and an electronic program table including services 1CH, 3CH, 4CH, 6CH and time 7:00 to 12:00 is displayed in this example. When the electronic program table is displayed, only the electronic program table may be displayed without playing back the program currently being received. Alternatively, the electronic program table may be displayed superimposed on the video of the program currently being received. Such processing may be performed in the reception device in FIG. 25 through the video conversion processing unit 32 under the control of the CPU 21 (system control unit 51, OSD creation unit 60).

In this example, when a 3D program which is decided using the above-described method exists in an event (program) included in electronic program table data (e.g., EIT) (e.g., program represented by a rectangle displayed with 8:00 to 10:00 of 3CH in the example of FIG. 48), a mark such as one shown by reference numeral 4802 that makes it possible to identify that the program is a 3D program (hereinafter referred to as 3D program mark) is displayed in a range within which the mark assigned is noticeable (e.g., within a rectangular range representing the program or a specified range around the rectangle). This allows the user to easily recognize which program is a 3D program within the electronic program table.

Here, as the method of displaying a 3D program mark, in addition to the display example of 4802, a 3D mode type of the program may be acquired and decided from the information of 3d_method_type, for example, as 4803, and characters or a mark indicating the 3D broadcasting scheme may be displayed. This example shows a case where a mark "MVC" representing a multi-viewpoint coding scheme is displayed. In this case, the user can easily decide, from the electronic program table, that the program is a 3D program and in what 3D mode type the program is broadcast.

Furthermore, the following method may be available as another display method; as an example shown by reference numeral 4804, when the reception device does not support the 3D mode type acquired from above-described 3d_method_type, a mark indicating that the type is not supported (e.g., "x" in the figure) is displayed or the display color is changed (displayed with shading as shown in the figure or the color of the display region of the electronic program is changed to gray or the like), and when the program is a 3D mode type supported by the reception device, a mark indicating that the type is supported is displayed (e.g., "○" is displayed at the display position of x in the figure instead), that is, display contents are changed depending on whether the reception device supports the 3D mode type of the program or not. This allows the user to easily recognize whether the program is a program of the 3D mode type supported by the reception device or not.

Furthermore, it is also possible to combine these displays, display the 3D mode type of the program, and change the display color to indicate that the 3D mode type is not supported by the device. In such a case, the user can check the 3D mode type of the program and easily decide whether the 3D mode type is supported by the reception device or not.

Furthermore, when the user operates a cursor (selected region) which is displayed on the electronic program table using a remote controller, and if the focus of the cursor is located at a 3D program, a 3D program mark may be displayed in a region different from the selected region. As a specific example, as shown in 4902 of FIG. 49, a 3D program mark may be displayed together with, for example, detailed information of the program (e.g., CH number, broadcasting time, program name as shown in 4901) outside the rectangular range shown by the selected program. In the example of FIG. 49, the regions for the 3D program mark display 4902 and detailed information display of the program 4901 are provided outside a program list display region 4903 of the electronic program table.

As another method of displaying an electronic program table, when the user performs a specific operation (e.g., pressing of a button, setting in a menu) via a remote controller, or when the user opens an electronic program table specialized for 3D programs, or in the case of a 3D compatible device, only the 3D programs may be displayed in the electronic program table. This allows the user to easily search a 3D program.

Figure 53:
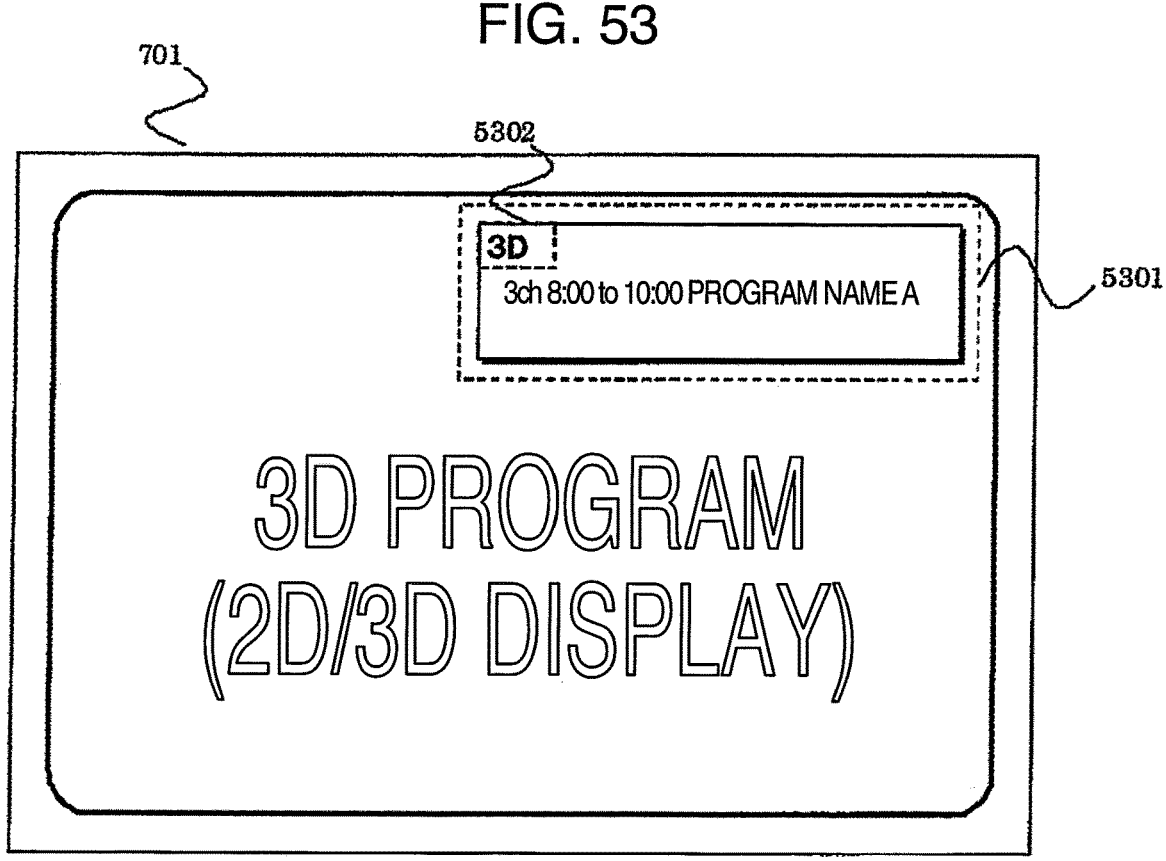
FIG. 53 shows an example of program display.

In addition to the electronic program table, a 3D program mark may also be displayed in a program display (e.g., CH banner) which is displayed when a program is selected or program information is changed or when the user presses a specific button (e.g., "screen display"). When the current program is decided to be a 3D program using a 3D program deciding method similar to that described above, as shown in an example of FIG. 53, the aforementioned 3D program mark may be displayed in a program display 5301 when a 3D program is displayed in 2D. In this way, the user can decide whether the program is a 3D program or not without the user opening the program table. In this case, the 3D program may also be displayed together with detailed information of the program such as CH number, broadcasting time, program name shown by reference numeral 5301. The display of FIG. 53 may be performed also when a 3D program is displayed in 3D.

Here, regarding the display of the 3D program mark, in addition to the descriptor used in the above-described 3D program deciding method, a character "3D" included at a specific position (e.g., starting part) of character data of the electronic program table (e.g., the text_char part of a short format event descriptor included in EIT) may be used. In this case, the user can recognize a 3D program from the electronic program table even using the existing reception device.

<3D Playback/Output/Display Processing on 3D Content of 3D 2-Viewpoint in Respective ESs Transmission Scheme>

Next, processing when 3D content (digital content including 3D video) is played back will be described. Here, playback processing in the case of a 3D 2-viewpoint in respective ESs transmission scheme in which a main viewpoint video ES and a sub-viewpoint video ES exist in one TS as shown in FIG. 47 will be described first. First, when the user instructs switching to 3D output/display (e.g., pressing a "3D" key of a remote controller), the user instruction reception unit 52 that has received the key code instructs the system control unit 51 to switch to 3D video (in the following processing, the same processing is performed even when switching is made to 3D output/display under conditions other than the user instruction for switching 3D content to 3D display/output regarding content of a 3D 2-viewpoint in respective ESs transmission scheme). Next, the system control unit 51 decides whether the current program is a 3D program or not using the above-described method.

When the current program is a 3D program, the system control unit 51 instructs the tuning control unit 59 to output 3D video first. The tuning control unit 59 that has received the instruction acquires a PID (packet ID) and coding scheme (e.g., H.264/MVC, MPEG2, H.264/AVC or the like) for the main viewpoint video ES and the sub-viewpoint video ES from the program information analysis unit 54 first, and then controls the demultiplexing unit 29 so as to demultiplex the main viewpoint video ES and the sub-viewpoint video ES and output the demultiplexed video ESs to the video decoding unit 30.

Here, the tuning control unit 59 controls the demultiplexing unit 29 so as to input, for example, the main viewpoint video ES to the first input of the video decoding unit and the sub-viewpoint video ES to the second input of the video decoding unit. After that, the tuning control unit 59 transmits information indicating that the first input of the video decoding unit 30 is the main viewpoint video ES and the second input is the sub-viewpoint video ES, and the respective coding schemes to the decoding control unit 57 and instructs the decoding control unit 57 to decode these ESs.

In order to decode a 3D program whose coding scheme differs between the main viewpoint video ES and the sub-viewpoint video ES as combination example 2 and combination example 4 of the 3D 2-viewpoint in respective ESs transmission scheme shown in FIG. 47, the video decoding unit 30 may be configured to have a plurality of types of decoding functions corresponding to the respective coding schemes.

In order to decode a 3D program whose coding scheme is the same between the main viewpoint video ES and the sub-viewpoint video ES as combination example 1 and combination example 3 of the 3D 2-viewpoint in respective ESs transmission scheme shown in FIG. 47, the video decoding unit 30 may be configured to have only the decoding function corresponding to a single coding scheme. In this case, the video decoding unit 30 can be configured at low cost.

The decoding control unit 57 that has received the instruction performs decoding corresponding to the respective coding schemes of the main viewpoint video ES and the sub-viewpoint video ES, and outputs video signals for the left eye and for the right eye to the video conversion processing unit 32. Here, the system control unit 51 instructs the video conversion control unit 61 to perform 3D output processing. The video conversion control unit 61 that has received the instruction from the system control unit 51 controls the video conversion processing unit 32 to output 3D video from the video output 41. Alternatively, the video conversion control unit 61 displays the 3D video on the display 47 provided for the reception device 4.

The 3D playback/output/display method will be described using FIG. 37.

Figure 37A:
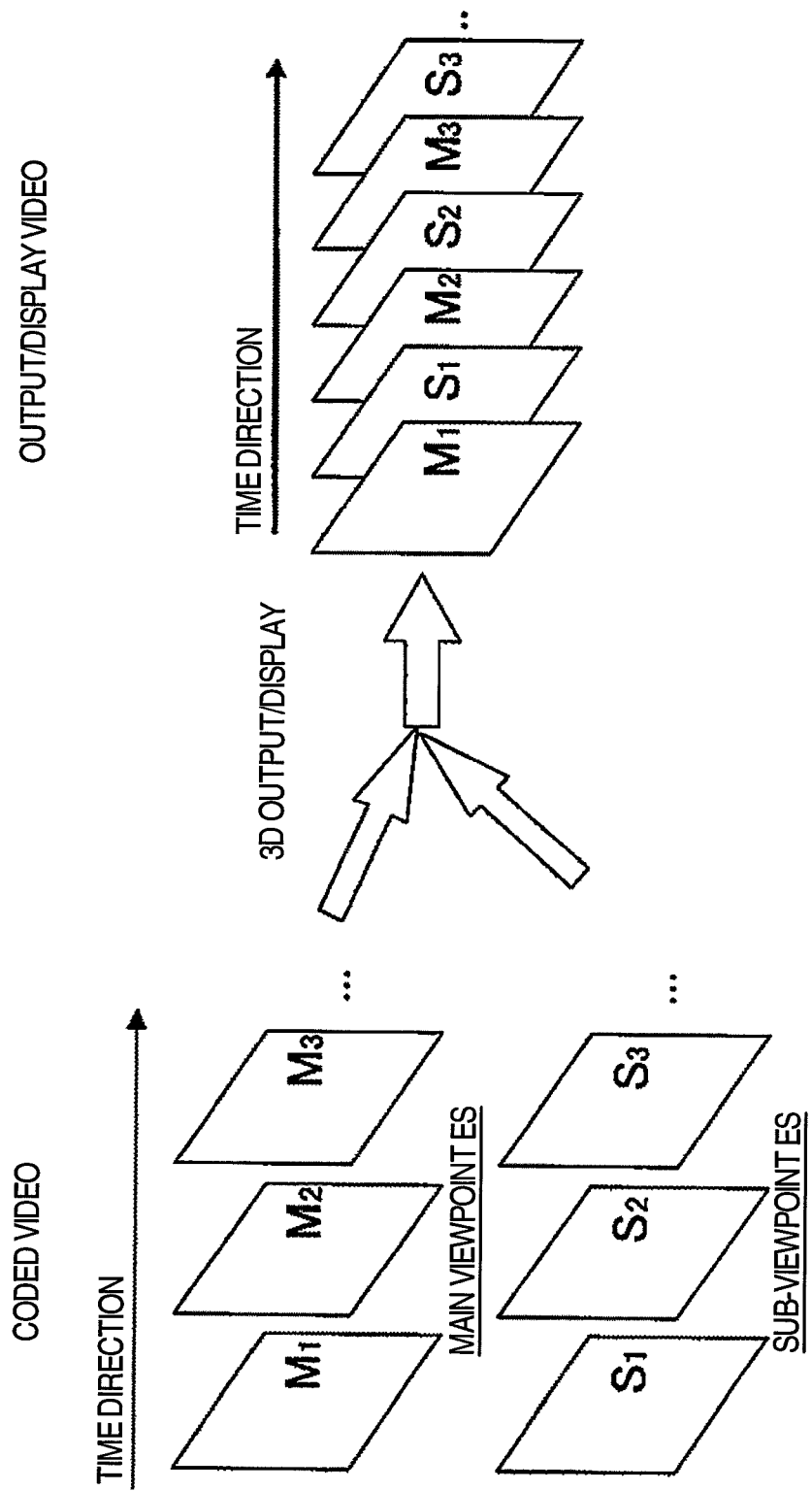
FIG. 37 is a diagram illustrating an example of 3D playback/output/display processing on 3D content.

FIG. 37(a) is a diagram illustrating a playback/output/display method corresponding to frame-sequential output/display whereby videos of 3D content left and right viewpoints of a 3D 2-viewpoint in respective ESs transmission scheme are alternately displayed and outputted. Frame sequence (M1, M2, M3, . . . ) at the top left in the figure represent a plurality of frames included in the main viewpoint (for the left eye) video ES of a 3D 2-viewpoint in respective ESs transmission scheme content and frame sequence (S1, S2, S3, . . . ) at the bottom left in the figure represents a plurality of frames included in the sub-viewpoint (for the right eye) video ES of the 3D 2-viewpoint in respective ESs transmission scheme content. The video conversion processing unit 32 alternately outputs/displays the respective frames of the inputted main viewpoint (for the left eye) and sub-viewpoint (for the right eye) video signals as a video signal as expressed by a frame sequence (M1, S1, M2, S2, M3, S3, . . . ) on the right side of the figure. According to such an output/display scheme, it is possible to use to a maximum the resolution displayable on the display for each viewpoint and realize a 3D display with high resolution.

In the system configuration of FIG. 36, when the scheme of FIG. 37(a) is used, a synchronous signal that allows the respective video signals to be distinguished as signals for the main viewpoint (left eye) and for the sub-viewpoint (right eye) is outputted together with the output of the above-described video signals from the control signal 43. The external video output apparatus that has received the video signal and the video signal synchronizes the video signal with the synchronous signal, outputs the main viewpoint (for the left eye) video and the sub-viewpoint (for the right eye) video and transmits the synchronous signal to the 3D auxiliary viewing device, and can thereby perform 3D display. The synchronous signal outputted from the external video output device may be generated by an external video output apparatus.

Furthermore, in the system configuration of FIG. 35, when the video signal is displayed on the display 47 provided for the reception device 4 using the scheme of FIG. 37(a), the synchronous signal is outputted from the machine control signal transmission terminal 44 via the machine control signal transmission unit 53 and the control signal transmission/reception unit 33 to perform control over the external 3D auxiliary viewing device (e.g., switching light-shielding of the active shutter) and thereby perform 3D display.

FIG. 37(b) is a diagram illustrating the playback/output/display method corresponding to output/display according to a scheme whereby 3D content left and right viewpoint videos of the 3D 2-viewpoint in respective ESs transmission scheme are displayed in different regions of the display. The processing is performed by the video decoding unit 30 decoding a stream of the 3D 2-viewpoint in respective ESs transmission scheme and the video conversion processing unit 32 performing video conversion processing. Here, examples of methods of "displaying the left and right viewpoint videos in different regions" include a method of displaying odd-numbered lines and even-numbered lines of the display as display regions for the main viewpoint (left eye) and for the sub-viewpoint (right eye) respectively. Alternatively, the display region need not always be formed in line units, and in the case of a display that has different pixels for different viewpoints, display regions may be formed for a combination of a plurality of pixels for the main viewpoint (left eye) and for a combination of a plurality of pixels for the sub-viewpoint (right eye) respectively. For example, the display device according to the aforementioned polarization scheme may output, for example, videos in different polarization states corresponding to the respective polarization states of the left eye and the right eye of the 3D auxiliary viewing device. According to such an output/display scheme, the resolution displayable on the display for each viewpoint is lower than that of the scheme in FIG. 37(a), but the video for the main viewpoint (left eye) and the video for the sub-viewpoint (right eye) can be outputted/displayed simultaneously and need not be displayed alternately. This allows a 3D display with less flickering than the scheme in FIG. 37(a).

In any one of the system configurations in FIG. 35 and FIG. 36, when the scheme in FIG. 37(b) is used, the 3D auxiliary viewing device may be polarization splitting glasses and need not particularly perform electronic control. In this case, the 3D auxiliary viewing device can be provided at lower cost.

<2D Output/Display Processing on 3D Content According to 3D 2-Viewpoint in Respective ESs Transmission Scheme>

The operation when performing 2D output/display of 3D content according to the 3D 2-viewpoint in respective ESs transmission scheme will be described below. When the user gives an instruction for switching to 2D video (e.g., pressing of the "2D" key of the remote controller), the user instruction reception unit 52 that has received the key code instructs the system control unit 51 to switch the signal to 2D video (in the following processing, similar processing is also performed even when switching is made to 2D output/display under conditions other than the user instruction for switching to the 2D output/display of 3D content of the 3D 2-viewpoint in respective ESs transmission scheme). Next, the system control unit 51 instructs the tuning control unit 59 to output 2D video first.

The tuning control unit 59 that has received the instruction acquires a PID of 2D video ES (the main viewpoint ES or ES having a default tag) from the program information analysis unit 54 first and controls the demultiplexing unit 29 so as to output the ES to the video decoding unit 30. After that, the tuning control unit 59 instructs the decoding control unit 57 to decode the ES. That is, since a substream or ES differs between the main viewpoint and the sub-viewpoint according to the 3D 2-viewpoint in respective ESs transmission scheme, only the substream or ES of the main viewpoint may be decoded.

The decoding control unit 57 that has received the instruction controls the video decoding unit 30 to decode the ES and outputs a video signal to the video conversion processing unit 32. Here, the system control unit 51 controls the video conversion control unit 61 so as to output 2D video. The video conversion control unit 61 that has received the instruction from the system control unit 51 controls the video conversion processing unit 32 so as to output a 2D video signal from the video output terminal 41 or to display the 2D video on the display 47.

The 2D output/display method will be described using FIG. 38. The configuration of coded video is the same as that in FIG. 37, and since the video decoding unit 30 does not decode the second ES (sub-viewpoint video ES) as described above, the video signal on the one ES side which is not decoded in the video conversion processing unit 32 is converted to a 2D video signal represented by a frame sequence (M1, M2, M3, . . . ) on the right side of FIG. 38 and outputted. The video signal is thus outputted/displayed in 2D.

The method whereby ES for the right eye is not decoded has been described as the 2D output/display method here, but both the ES for the left eye and the ES for the right eye may be decoded, the video conversion processing unit 32 may perform processing of puncturing the video signal for the right eye and thereby perform 2D display as in the case of 3D display. In that case, there is no more need for switching processing between decoding processing and demultiplexing processing, and effects such as a reduction of the switching time and simplification of software processing can be expected.

<3D Output/Display Processing on 3D Content According to Side-by-Side Scheme/Top-and-Bottom Scheme>

Next, 3D content playback processing when video for the left eye and video for the right eye exist in one video ES (e.g., when video for the left eye and video for the right eye are stored in one 2D screen as in the case of the side-by-side scheme or top-and-bottom scheme) will be described. When the user instructs the switching to 3D video as in the above-described case, the user instruction reception unit 52 that has received the key code instructs the system control unit 51 to perform switching to 3D video (in the following processing, similar processing is performed even when switching is made to 2D output/display under conditions other than a user instruction for switching to 2D output/display of 3D content according to the side-by-side scheme or top-and-bottom scheme). Next, the system control unit 51 likewise decides whether the current program is a 3D program or not using the above-described method.

When the current program is a 3D program, the system control unit 51 instructs the tuning control unit 59 to output 3D video first. The tuning control unit 59 that has received the instruction acquires a HD (packet ID) and coding scheme (e.g., MPEG2, H.264/AVC or the like) of a 3D video ES containing 3D video from the program information analysis unit 54 first and then controls the demultiplexing unit 29 so as to demultiplex the 3D video ES and output the demultiplexed 3D video ESs to the video decoding unit 30, controls the video decoding unit 30 so as to perform decoding processing corresponding to the coding scheme and output the decoded video signal to the video conversion processing unit 32.

Here, the system control unit 51 instructs the video conversion control unit 61 to perform 3D output processing.

The video conversion control unit 61 that has received the instruction from the system control unit 51 instructs the video conversion processing unit 32 to separate the inputted video signal into video for the left eye and video for the right eye and perform processing such as scaling (details will be described later). The video conversion processing unit 32 outputs the converted video signal from the video output 41 or displays video on the display 47 provided for the reception device 4.

The 3D video playback/output/display method will be described using FIG. 39.

FIG. 39(*a*) is a diagram illustrating a playback/output/display method corresponding to frame-sequential output/display for alternately displaying/outputting left and right viewpoint videos of 3D content according to the side-by-side scheme or top-and-bottom scheme. The coded videos according to the side-by-side scheme and top-and-bottom scheme are illustrated together, and both videos are different only in the arrangement of video for the left eye and video for the right eye in the video, and therefore the following description will be given using the side-by-side scheme and description of the top-and-bottom scheme will be omitted. The frame sequence (L1/R1, L2/R2, L3/R3, . . . ) on the left of this figure represents a side-by-side scheme video signal in which video for the left eye and video for the right eye are arranged on the left/right sides of one frame. The video decoding unit 30 decodes the side-by-side scheme video signal arranged on the left/right sides of one frame of video for the left eye and video for the right eye, the video conversion processing unit 32 separates each frame of the decoded side-by-side scheme video signal into video for the left eye and video for the right eye to the left and to the right, and further performs scaling (extension/interpolation or compression/puncturing or the like so that the videos match the lateral size of the output video). Furthermore, the video conversion processing unit 32 alternately outputs frames as video signals as shown by a frame sequence (L1, R1, L2, R2, L3, R3, . . . ) on the right side in this figure.

In FIG. 39(*a*), the processing after converting frames to the output/display video in which frames are alternately outputted/displayed and processing of outputting a synchronous signal or control signal to the 3D auxiliary viewing device or the like are similar to the 3D playback/output/display processing on 3D content according to the 3D 2-viewpoint in respective ESs transmission scheme described in FIG. 37(*a*), and therefore descriptions thereof will be omitted.

FIG. 39(*b*) is a diagram illustrating a playback/output/display method corresponding to output/display in a scheme of displaying left and right viewpoint videos of 3D content according to the side-by-side scheme or top-and-bottom scheme in different regions of the display. In the same way as in FIG. 39(*a*), coded videos according to the side-by-side scheme and top-and-bottom scheme are illustrated together, and both videos are different only in the arrangement of video for the left eye and video for the right eye in the video, and therefore the following description will be given using the side-by-side scheme and description of the top-and-bottom scheme will be omitted. The frame sequence (L1/R1, L2/R2, L3/R3, . . . ) on the left of this figure represents a side-by-side scheme video signal in which video for the left eye and video for the right eye are arranged on the left/right sides of one frame. The video decoding unit 30 decodes the side-by-side scheme video signal arranged on the left/right sides of one frame of video for the left eye and video for the right eye, the video conversion processing unit 32 separates each frame of the decoded side-by-side scheme video signal into video for the left eye and video for the right eye to the left and to the right, and further performs scaling (extension/interpolation or compression/puncturing or the like so that the videos match the lateral size of the output video). Furthermore, the video conversion processing unit 32 outputs/displays the scaled video for the left eye and video for the right eye to/in different regions. As in the case of the description in FIG. 37(*b*), examples of methods of "displaying the left and right viewpoint videos in different regions" include a method of displaying odd-numbered lines and even-numbered lines of the display as display regions for the main viewpoint (left eye) and for the sub-viewpoint (right eye). In addition, display processing in different regions and display method using a display device according to a polarization scheme or the like are similar to the 3D playback/output/display processing on 3D content according to the 3D 2-viewpoint in respective ESs transmission scheme described in FIG. 37(*b*), and therefore descriptions thereof will be omitted.

According to the scheme in FIG. 39(*b*), even when the vertical resolution of the display is the same as the vertical resolution of the input video, if video for the left eye and video for the right eye are outputted to and displayed on odd-numbered lines and even-numbered lines of the display respectively, the respective vertical resolutions may have to be reduced, but even in such a case, puncturing corresponding to the resolutions of the display regions of video for the left eye and video for the right eye may be performed in the above-described scaling processing.

<2D Output/Display Processing on 3D Content According to Side-by-Side Scheme/Top-and-Bottom Scheme>

The operation of each section when 3D content according to the side-by-side scheme or top-and-bottom scheme is displayed in 2D will be described below. When the user gives an instruction for switching to 2D video (e.g., pressing the "2D" key of the remote controller), the user instruction reception unit 52 that has received the key code instructs the system control unit 51 to switch a signal to 2D video (in the following processing, similar processing is performed even when switching is made to 2D output/display under conditions other than the user instruction for switching to 2D output/display of 3D content according to the side-by-side scheme or top-and-bottom scheme). The system control unit 51 that has received the instruction instructs the video conversion control unit 61 to output 2D video. The video conversion control unit 61 that has received the instruction from the system control unit 51 controls the video conversion processing unit 32 so as to perform 2D video output for the inputted video signal.

Figure 40A:
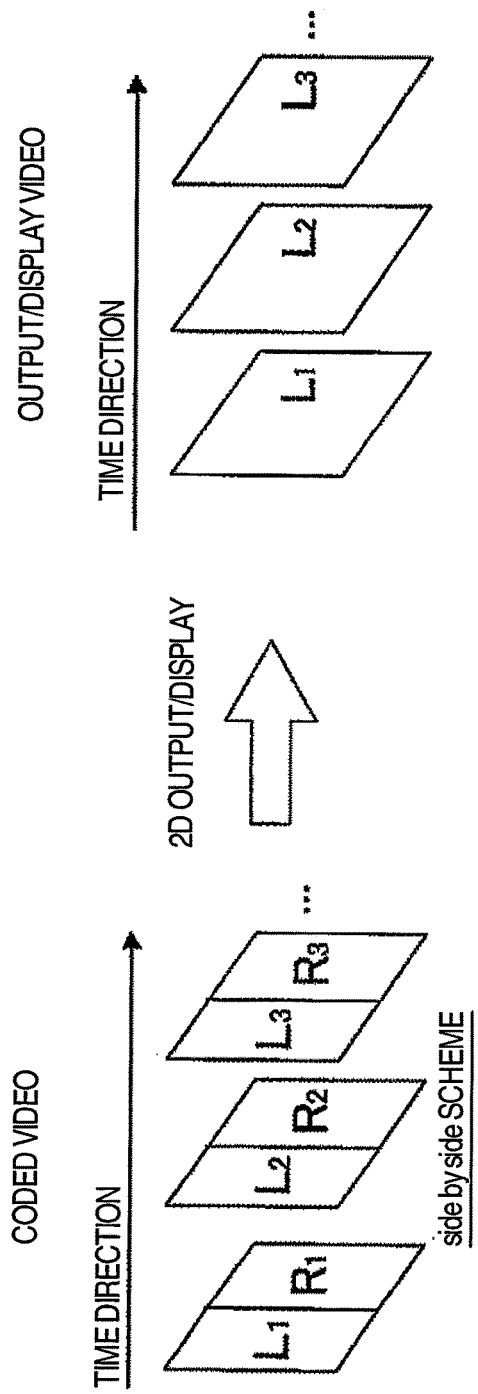
FIG. 40 is a diagram illustrating an example of 2D playback/output/display processing on 3D content.
Figure 40B:
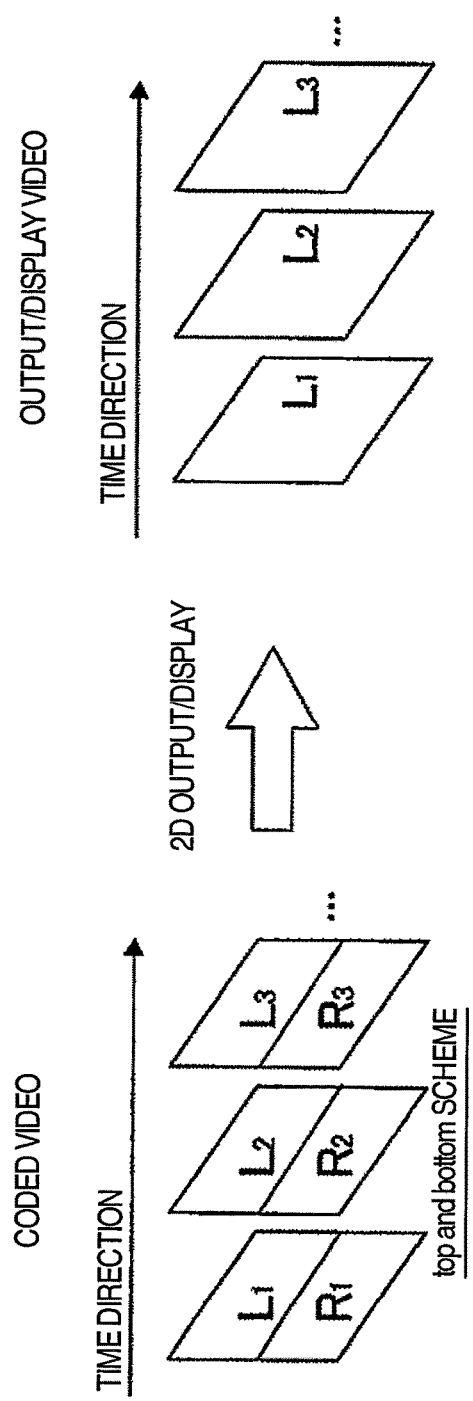

The video 2D output/display method will be described using FIG. 40. FIG. 40(*a*) illustrates the side-by-side scheme and FIG. 40(*b*) illustrates the top-and-bottom scheme, and since the two schemes are different only in the arrangement of video for the left eye and video for the right eye in the video, a description will be given using only the side-by-side scheme in FIG. 40(*a*). The frame sequence (L1/R1, L2/R2, L3/R3, . . . ) on the left side of this figure represents a side-by-side scheme video signal in which video signals for the left eye and for the right eye are arranged on the left and right sides of one frame. The video conversion processing unit 32 separates each frame of the inputted side-by-side scheme video signal into left and right frames of video for the left eye and video for the right eye, then performs scaling on only the main viewpoint video (video for the left eye) and outputs only the main viewpoint video (video for the left eye) as a video signal as shown in the frame sequence (L1, L2, L3, . . . ) on the right side of this figure.

The video conversion processing unit 32 outputs the video signal subjected to the above-described processing from the video output 41 as 2D video and outputs a control signal from the control signal 43. Video is outputted/displayed in 2D in this way.

FIGS. 40(*c*) and (*d*) also show examples where 3D content according to the side-by-side scheme or top-and-bottom scheme is stored in one image with two viewpoints and outputted/displayed in 2D without modification. For example, as shown in FIG. 36, in the case where the reception device and the viewing device are configured as separate bodies, the reception device may output video which is video according to the side-by-side scheme or top-and-bottom scheme stored in one image with two viewpoints without modification, and the viewing device may perform conversion for 3D display.

<Example of 2D/3D Video Display Processing Flow Based on Whether Current Program is 3D Content or Not>

Next, the content output/display processing when the current program is 3D content or when the current program is changed to 3D content will be described. Regarding the viewing of 3D content when the current program is 3D content or when the current program is changed to 3D content, if the display of the 3D content starts unconditionally, the user cannot view the content, which may impair the convenience of the user. However, the convenience of the user can be improved by performing the following processing.

Figure 41:
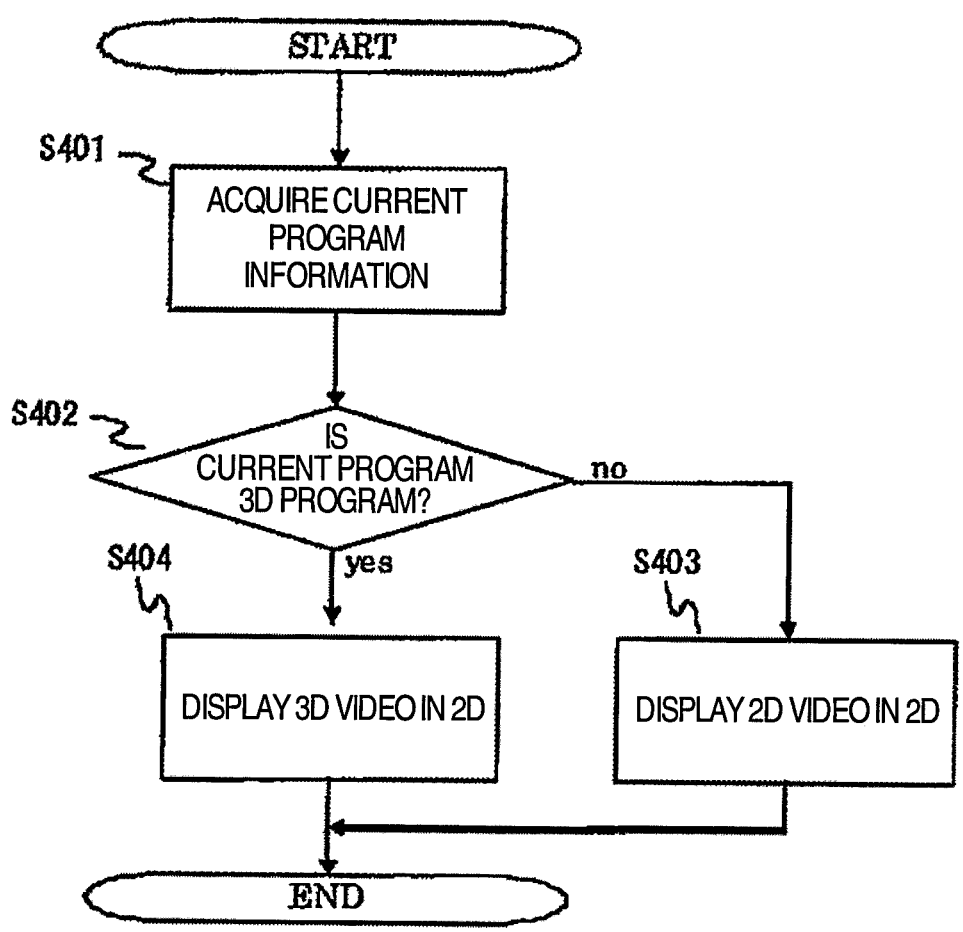
FIG. 41 shows an example of a flowchart of 2D/3D video display processing based on whether the current program is 3D content or not.

FIG. 41 shows an example of a processing flow of the system control unit 51 executed at moments when the current program or program information is changed at the time of program switching. The example in FIG. 41 shows a flow in which video with one viewpoint of a 2D program or 3D program (e.g., main viewpoint) is displayed in 2D.

The system control unit 51 acquires program information of the current program from the program information analysis unit 54, decides whether the current program is a 3D program or not using the above-described 3D program deciding method and further acquires the 3D mode type of the current program (for example, decides the 2-viewpoint in respective ESs transmission scheme/side-by-side scheme or the like from the 3D mode type described in the 3D program detail descriptor) from the program information analysis unit 54 likewise (S401). The program information of the current program may be acquired not only when the program is switched but also periodically.

When the decision result shows that the current program is not a 3D program (no in S402), control is performed so that 2D video is displayed in 2D (S403).

Figure 38:
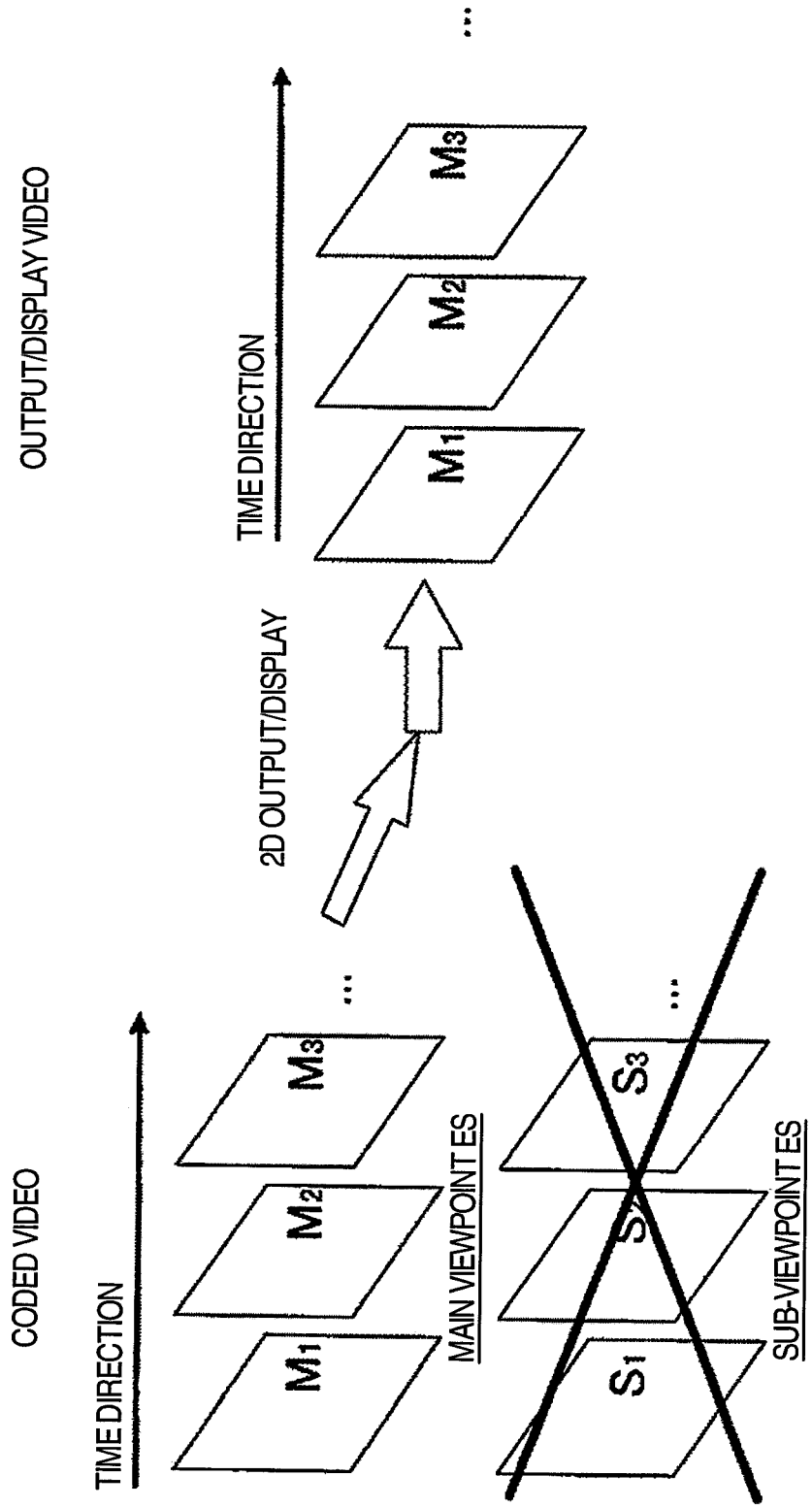
FIG. 38 is a diagram illustrating an example of 2D playback/output/display processing on 3D content.

When the current program is a 3D program (yes in S402), the system control unit 51 performs control using the method described in FIG. 38, FIGS. 40(*a*) and (*b*) so that one viewpoint (e.g., main viewpoint) of the 3D video signal is displayed in 2D in a format corresponding to the 3D mode type (S404). In this case, the display indicating that the program is a 3D program may be displayed superimposed on the 2D display video of the program. In this way, when the current program is a 3D program, video with one viewpoint (e.g., main viewpoint) is displayed in 2D.

Also when a tuning operation is performed and the current program is changed, the system control unit 51 performs the above-described flow.

Thus, when the current program is a 3D program, video with one viewpoint (e.g., main viewpoint) is displayed in 2D for the time being. Even when the user is not ready for 3D viewing, for example, when the user is not wearing the 3D auxiliary viewing device, this allows the user to view the video in substantially the same way as for a 2D program for the time being. In the case of 3D content according to the side-by-side scheme or top-and-bottom scheme in particular, instead of outputting the video stored in one image with two viewpoints as is as shown in FIGS. 40(c) and (d), and by outputting/displaying the video with one viewpoint in 2D as shown in FIGS. 40(a) and (b), the user can view the video in the same way as a normal 2D program without the user manually instructing 2D display with one viewpoint of the video stored in one image with two viewpoints via a remote controller or the like.

Figure 42:
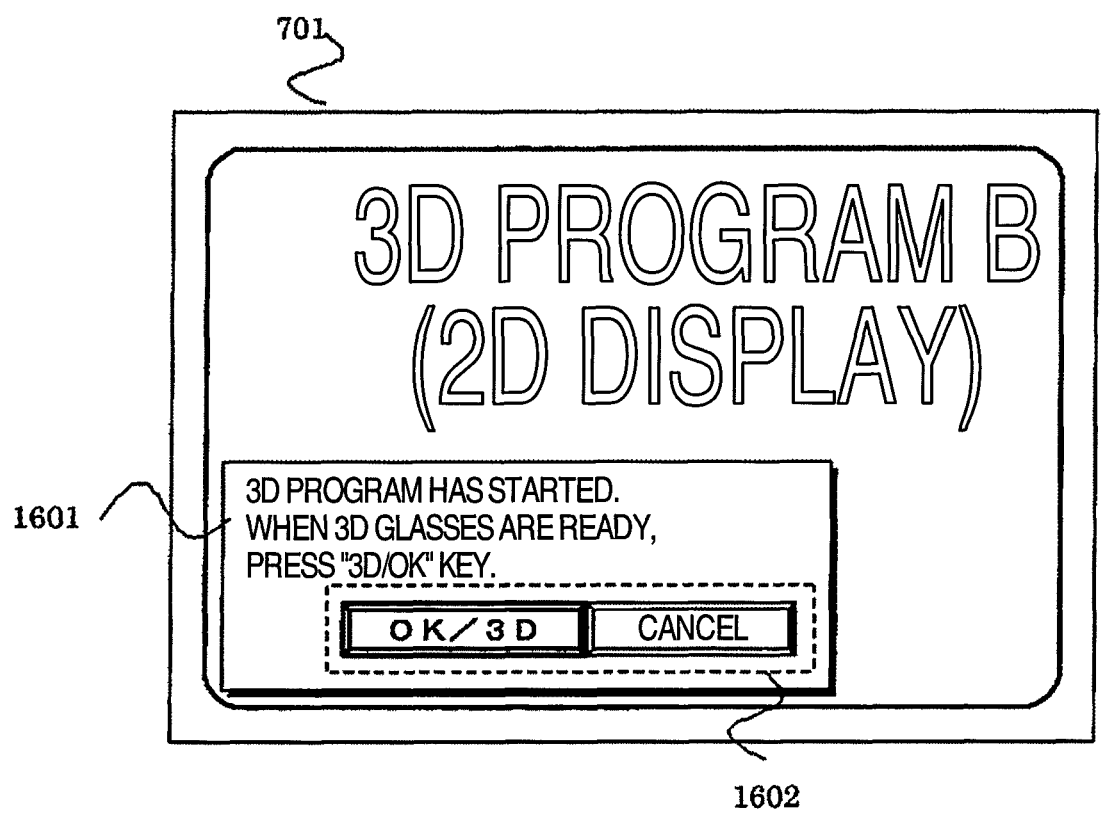
FIG. 42 shows an example of message display.

Next, FIG. 42 shows video displayed in 2D in step S404 and an example of a message displayed on the OSD creation unit 60 by the system control unit 51. A message is displayed to notify the user that a 3D program is started and further an object (hereinafter referred to as user response receiving object: for example, a button on the OSD) 1602 to which the user responds is displayed and the user is prompted to select the subsequent operation.

When the message 1601 is displayed, if, for example, the user presses the "OK" button of the remote controller, the user instruction reception unit 52 notifies the system control unit 51 that "OK" is pressed.

As an example of a user selection deciding method on the screen display in FIG. 42, when the user operates the remote controller to press the <3D> button of the remote controller or points the cursor to "OK/3D" on the screen and presses the <OK> button of the remote controller, the user selection is decided to be "switching to 3D."

Alternatively, when the user presses the <Cancel> button or <return> button of the remote controller, or points the cursor to <Cancel> on the screen and presses <OK> of the remote controller, the user selection is decided to be "other than switching to 3D." In addition, when, for example, an operation for making the state as to whether the user has completed preparations for 3D viewing or not (3D viewing ready state) OK is performed (e.g., wearing of 3D glasses), the user selection is decided to be "switching to 3D."

Figure 43:
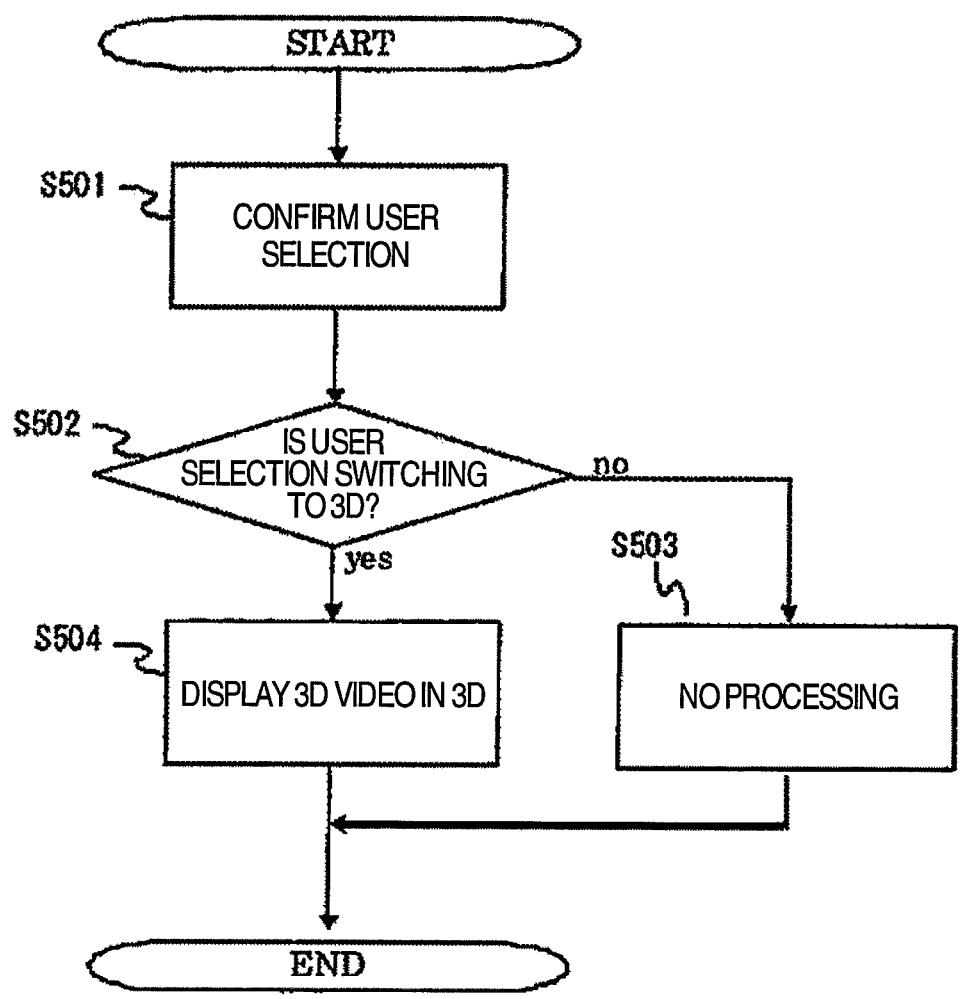
FIG. 43 shows an example of a display processing flowchart after user selection.

FIG. 43 shows a processing flow of the system control unit 51 executed after the user selection. The system control unit 51 acquires the user selection result from the user instruction reception unit 52 (S501). When the user selection is not "switching to 3D" (no in S502), the video ends, remaining displayed in 2D and no particular processing is performed.

When the user selection is "switching to 3D" (yes in S502), the video is displayed in 3D using the above-described 3D display method (S504).

Following the above-described flow, when the 3D program starts, video with one viewpoint is outputted/displayed in 2D, and after the user performs an operation or makes preparations for 3D viewing, the user can output/display 3D video and view the video in 3D when the user wants 3D viewing, and it is thereby possible to provide a viewing method tailored to the user's convenience.

The display example in FIG. 42 shows an object for the user to respond thereto, but a character, logo, mark or the like indicating that the program is a program corresponding to "3D viewing" such as "3D program" may be simply displayed. In this case, the user who recognizes that the program supports "3D viewing" may press the "3D" key of the remote controller to switch 2D display to 3D display at the moment when the user instruction reception unit 52 that has received the signal from the remote controller notifies the system control unit 51.

Figure 44:
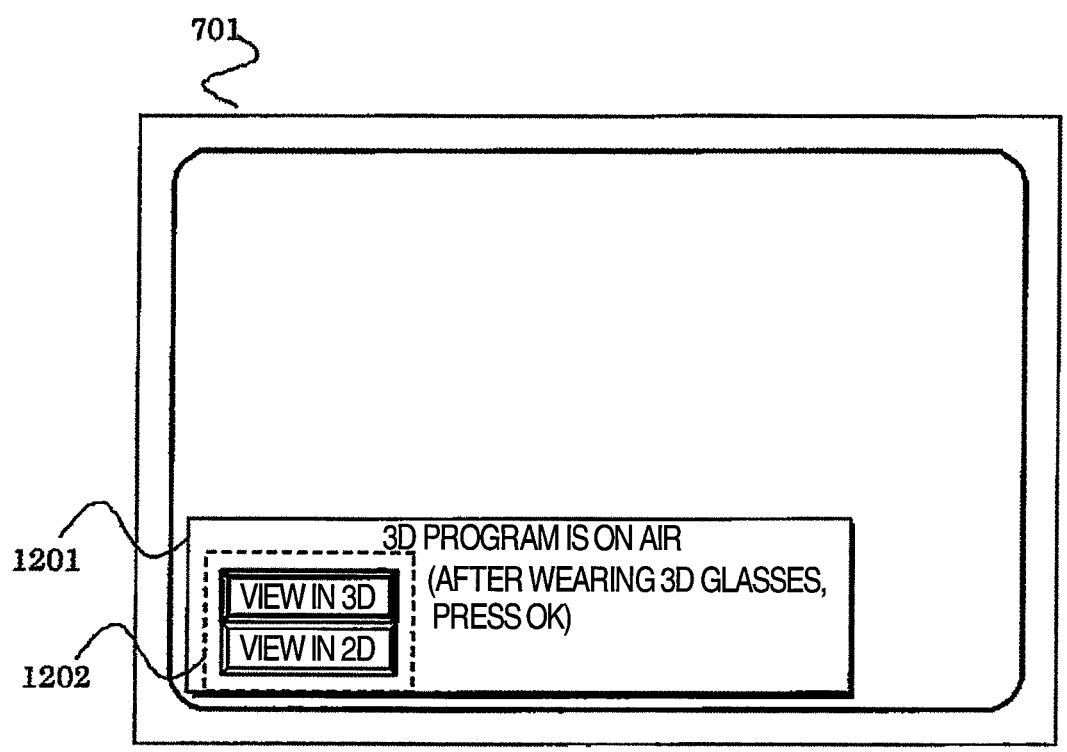
FIG. 44 shows an example of message display.

As another example of the message displayed in step S404, a method is also considered which not only specifies OK as shown in FIG. 42 but also specifies whether the program is displayed in 2D video or 3D video. FIG. 44 shows a message and an example of the user response receiving object in that case.

This allows the user to more easily decide the operation after pressing the button or more explicitly instruct the 2D display or the like (when the "View in 2D" button shown by reference numeral 1202 is pressed, the "user 3D viewing ready" state is judged "NG") compared to the display of "OK" shown in FIG. 42, thus improving the convenience.

Figure 52A:
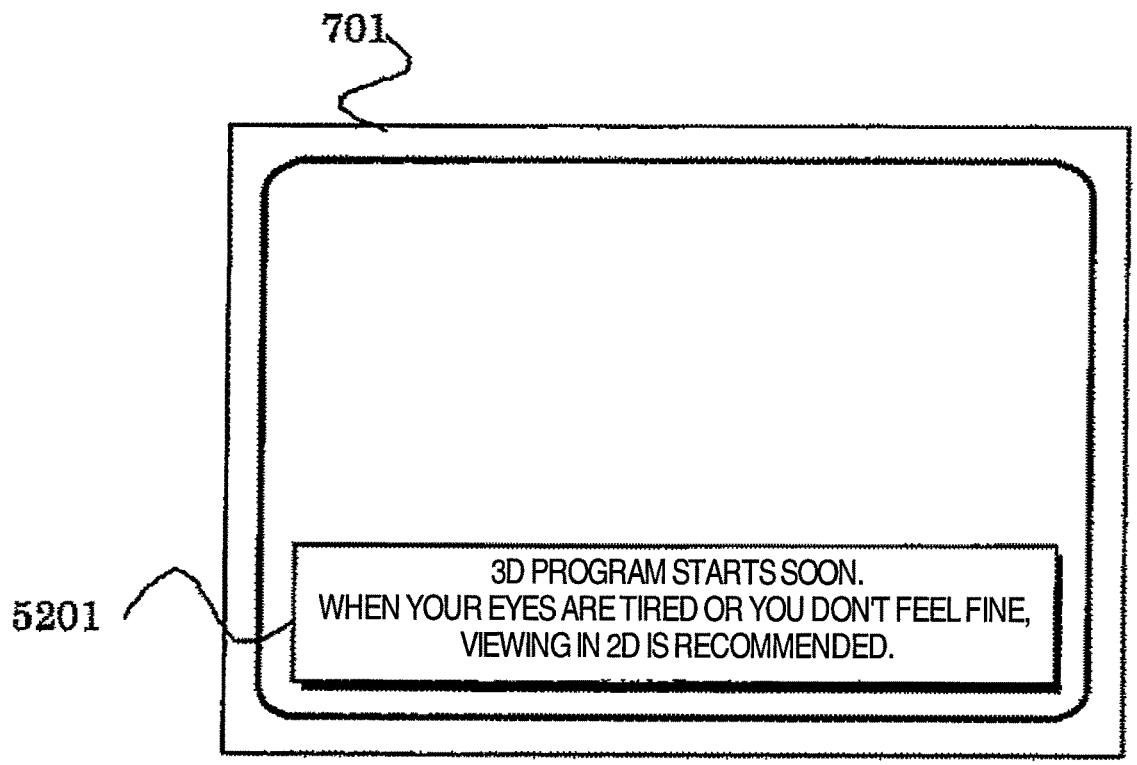
FIG. 52 shows an example of message display.
Figure 52B:
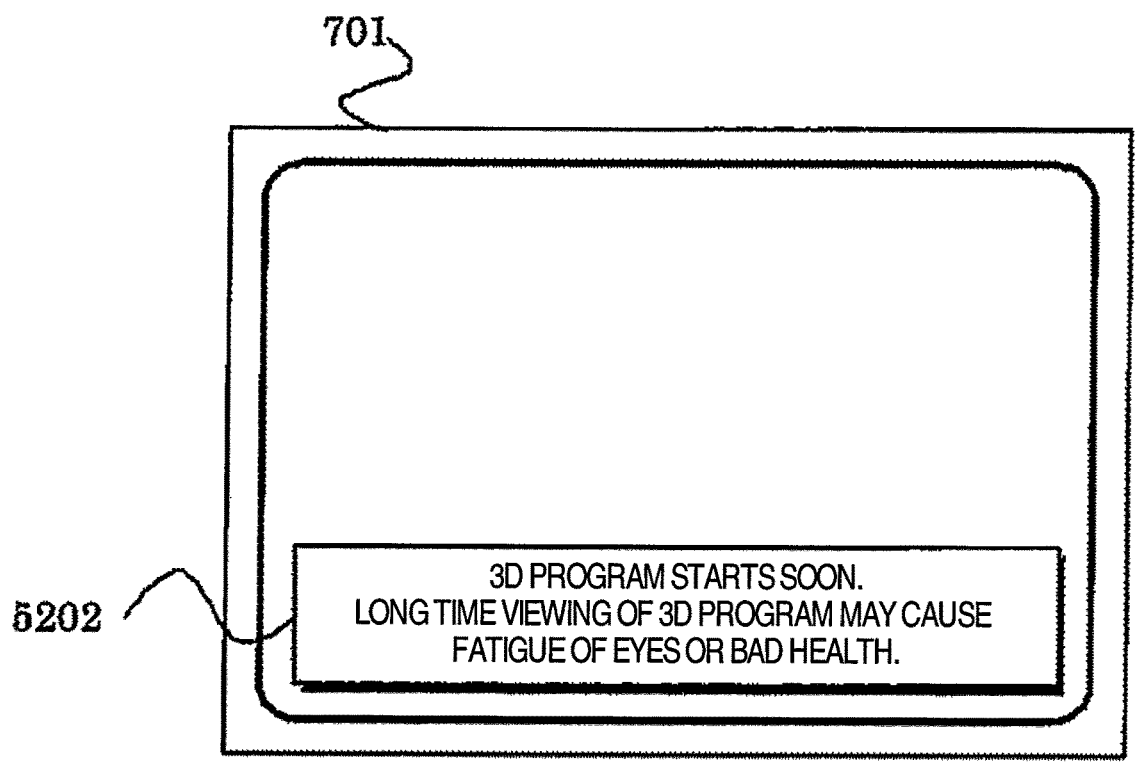
Figure 52C:
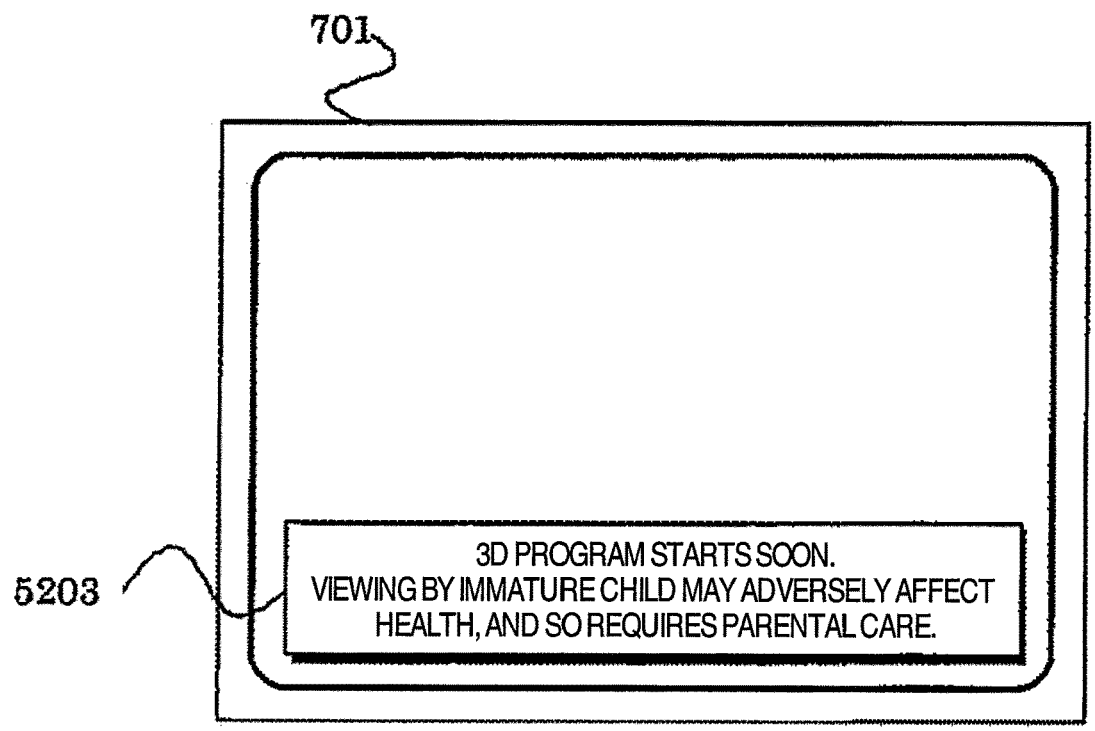

Instead of the message display in FIG. 42 or FIG. 44 (message shown by reference numeral 1601 or 1201), warning messages shown by reference numerals 5201, 5202 and 5203 in FIGS. 52(a) to (c) may be displayed. Displaying the message shown by 5201 shows consideration for the user's health and urges 2D video viewing, displaying the message shown by 5202 calls the user's attention to health and displaying the message shown by 5203 calls the parents' attention to viewing by their child.

Along with these messages, the user response reception responding object shown in FIG. 42 or FIG. 44 may also be displayed on the screen. In that case, the user can switch the video to 2D/3D while confirming the message.

Regarding the timing to display the messages in FIGS. 52(a), (b) and (c), timing before the program starts as shown in the above example is convenient for the user to prepare for viewing. The messages may also be displayed after the program starts or displayed when switching is made to 3D video. In the case where a message is displayed when the program starts, this is the point at which video is switched, and therefore there is a merit of making it easier to allow the user to recognize that this is a message relating to the program and call the user's attention. On the other hand, displaying the message at the timing at which the video is switched to 3D video (e.g., when the user presses the 3D button) provides a merit that the user is more likely to notice the message because there is a high possibility that the user may be performing operation.

Furthermore, simultaneously with displaying the messages in FIGS. 52(a), (b) and (c), an effect sound may be played back or outputted. That case provides an effect of attracting the user's attention to the message. When, for example, starting transmission of a 3D broadcasting program or starting transmission of a descriptor associated with 3D broadcasting, the broadcasting station side may multiplex the effect sound with a sound ES or data broadcasting ES and transmit the multiplexed ES and the reception device that has received it may play it back or output it. Alternatively, an effect sound incorporated in the reception device may be played back and outputted (e.g., data is read from the inside of the sound decoding apparatus 31, ROM or recording medium 26, decoded and outputted).

Next, regarding viewing of 3D content, an example will be described where specific video/sound is outputted when viewing of a 3D program starts or video/sound is muted (a black screen is displayed/display is stopped, or audio output is stopped). This is because when the user starts viewing a 3D program, if the display of 3D content starts unconditionally, the user may not be able to view the content, which may impair the convenience of the user. To solve this problem, performing the following processing can improve the convenience of the user.

Figure 45:
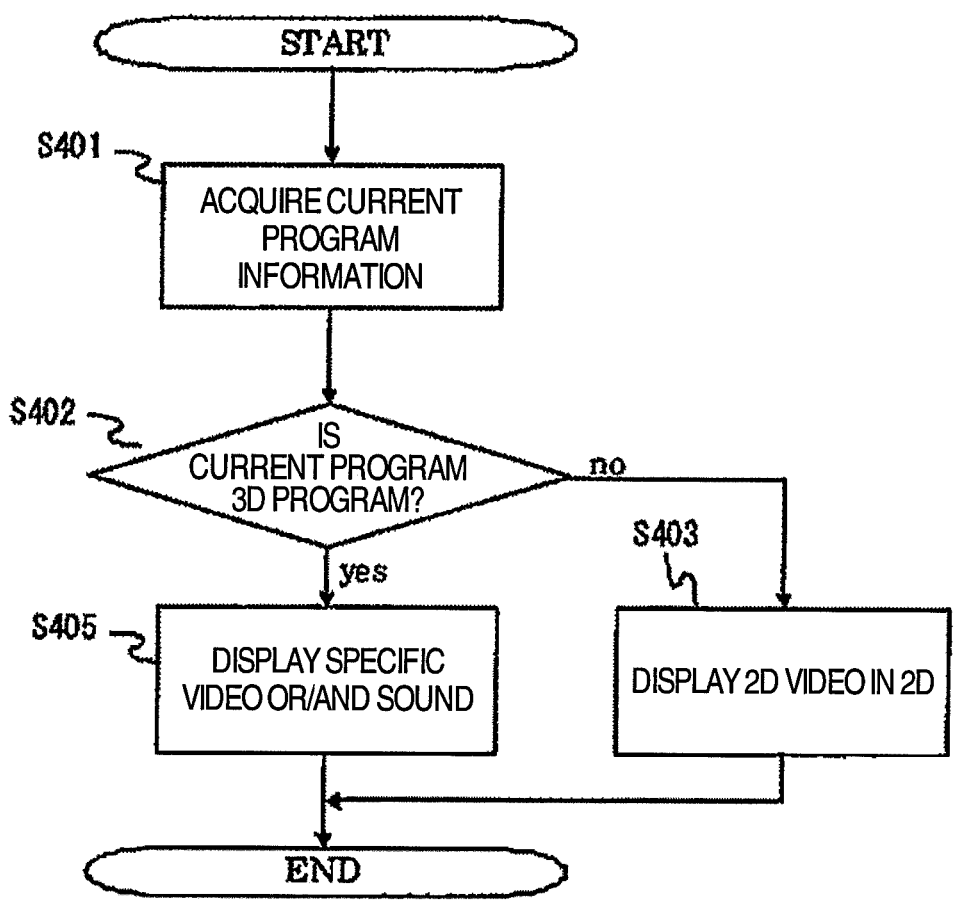
FIG. 45 shows an example of a flowchart of 2D/3D video display processing based on whether the current program is 3D content or not.

FIG. 45 shows a processing flow executed in the system control unit 51 when the 3D program starts in this case. This processing flow is different from the processing flow in FIG. 41 in that a step (S405) of outputting specific video/sound is added instead of the processing in 5404.

The term "specific video/sound" here is, for example, a message prompting to prepare for 3D, black screen, still image of a program or the like in the case of video, and silence or music in a fixed pattern (ambient music) or the like in the case of sound.

The display of a fixed pattern video (message, environmental video, 3D video or the like) can be realized by reading data from the inside of the video decoding unit 30 or ROM (not shown) or the recording medium 26 and by the video decoding unit 30 decoding and outputting the data. Output of a black screen can be realized, for example, by the video decoding unit 30 outputting only video of a signal representing a black color or by the video conversion processing unit 32 muting the output signal or outputting black video.

The fixed pattern sound (silence, ambient music) can be likewise realized by reading data from the inside of the sound decoding unit 31, ROM or the recording medium 26, decoding and outputting it and muting the output signal or the like.

Output of a still image of program video can be realized by the system control unit 51 instructing the recording/playback control unit 58 to pause the playback of the program or video. The processing by the system control unit 51 after performing user selection is executed as shown in FIG. 43 as described above.

This makes it possible to prevent video or sound of the program from being outputted until the user completes preparations for 3D viewing.

Figure 46:
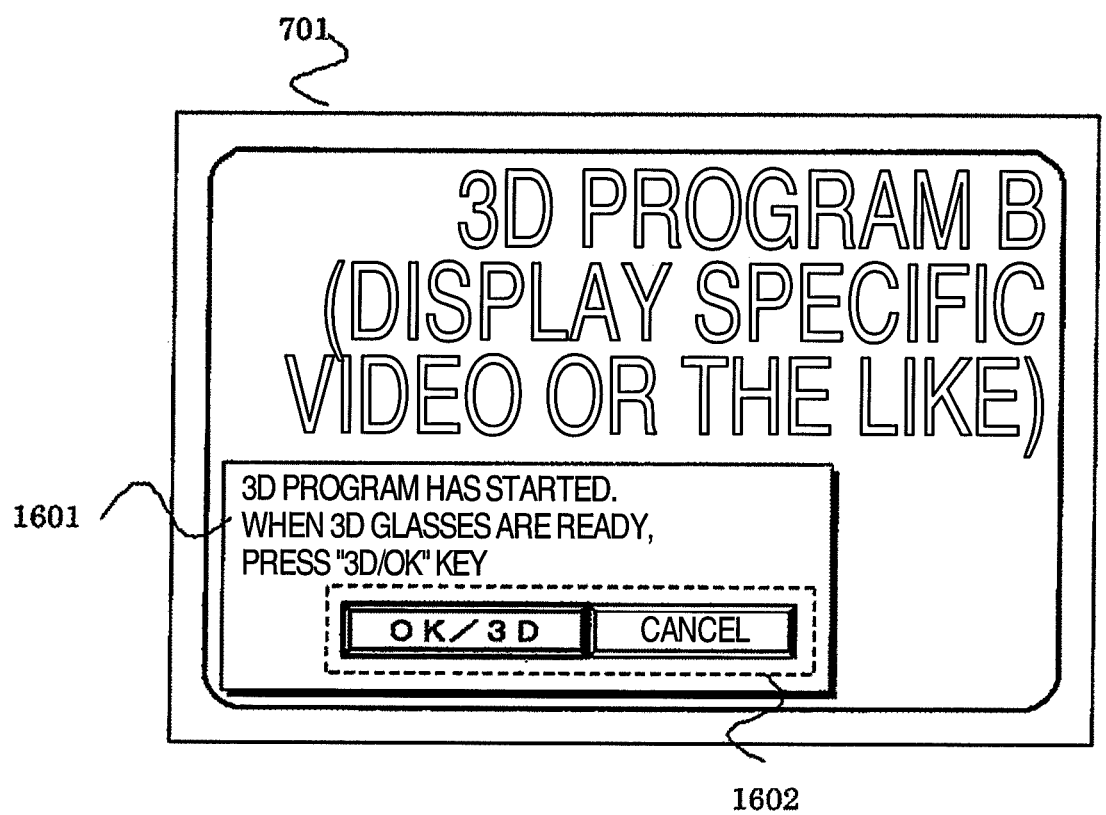
FIG. 46 shows an example of message display.

As in the case of the example above, a message displayed in step S405 is as shown in FIG. 46. This figure is different from FIG. 42 in that only the video and sound displayed are different, and the displayed message, the configuration of the user response receiving object and the operation of the user response receiving object are the same.

Regarding the display of a message, not only simply displaying OK as in FIG. 46 but also a method of specifying whether the display scheme of the program is set to 2D video or 3D video may be considered. The message and the example of the user response receiving object in that case can also be displayed in the same way as in FIG. 44, and doing so allows the user to more easily decide the operation after pressing the button compared to the display of "OK" and it is possible to explicitly instruct the display in 2D or the like, and the convenience is improved as in the case of the example above.

<Example of 2D/3D Video Display Processing Flow Based on Whether Next Program is 3D Content or Not>

Next, content output/display processing when the next program is 3D content will be described. Regarding viewing of a 3D content program which is the next program when the next program is 3D content, if the display of the 3D content starts although the user is not ready to view the 3D content, the user cannot view the content in best conditions, which may impair the convenience of the user. Applying the following processing to this case can improve the convenience of the user.

Figure 27:
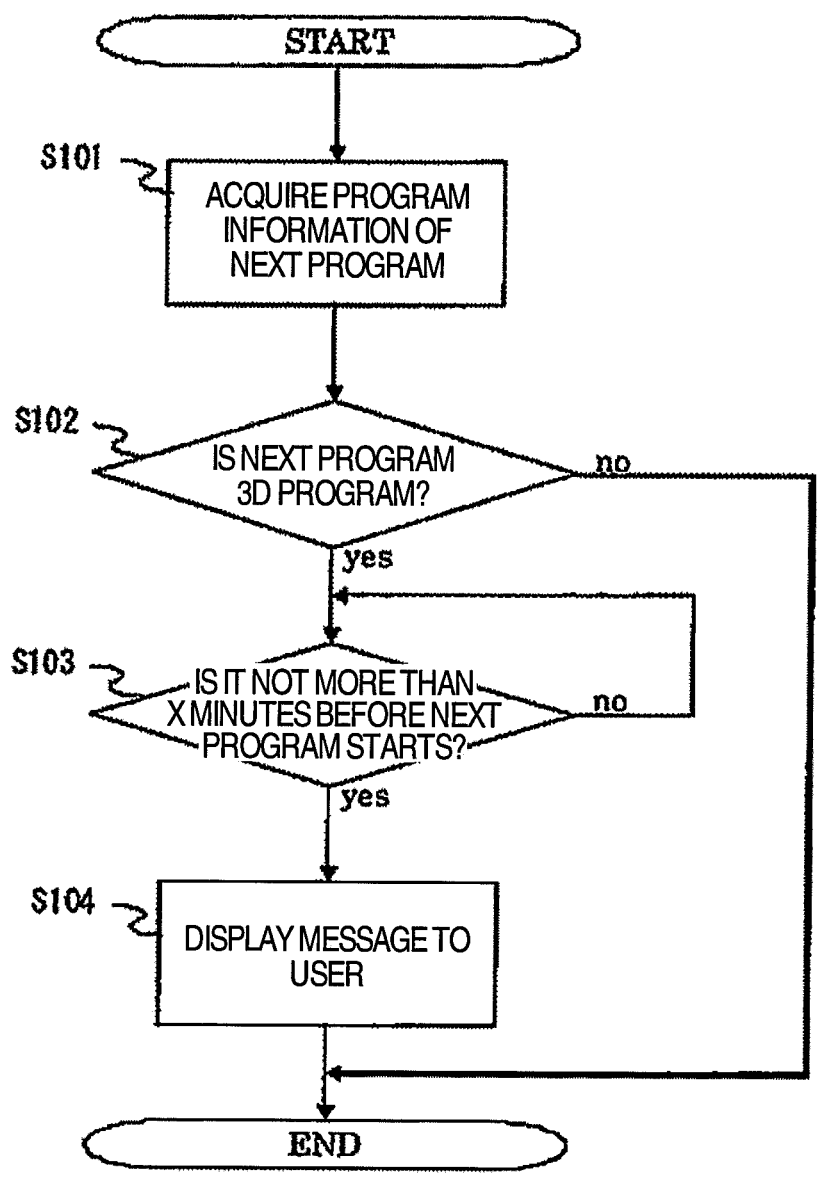
FIG. 27 shows an example of a flowchart of 2D/3D video display processing based on whether the next program is 3D content or not.

FIG. 27 shows an example of a flow executed in the system control unit 51 when the time until the next program start is changed due to tuning processing or the like or when it is decided, according to information on the start time of the next program or the end time of the current program contained in EIT of the program information transmitted from the broadcasting station, that the start time of the next program has changed. First, the system control unit 51 acquires program information of the next program from the program information analysis unit 54 (S101) and decides whether the next program is a 3D program or not using the above 3D program deciding method.

When the next program is not a 3D program (no in S102), the process ends without particularly performing processing. When the next program is a 3D program (yes in S102), the time until the next program starts is calculated. To be more specific, the start time of the next program or the end time of the current program is acquired from EIT of the acquired program information, the current time is acquired from the time management unit 55 and a difference thereof is calculated.

When it is more than X minutes before the next program starts (no in S103), the process waits until X minutes before the next program starts without particularly performing processing. When it is not more than X minutes before the next program starts (yes in S103), a message is displayed notifying the user that the 3D program starts soon (S104).

Figure 28:
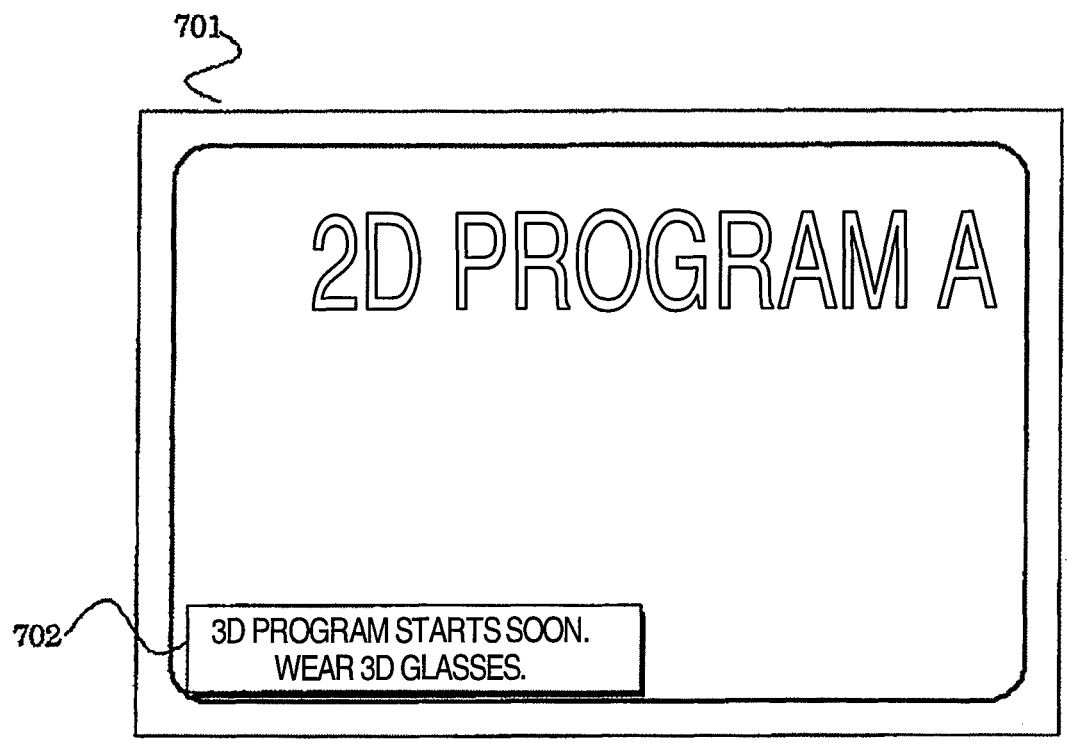
FIG. 28 shows an example of message display.

FIG. 28 shows an example of the message display. Reference numeral 701 denotes an entire screen displayed by the device and 702 denotes a message displayed by the device. In this way, it is possible to call the user's attention so as to prepare the 3D auxiliary viewing device before the 3D program is started.

Regarding the decision time X before the above-described program starts, reducing X may cause the user to fail to complete preparations for 3D viewing by the time the program starts. On the other hand, increasing X may result in demerits like causing the message display for a long period of time to obstruct the viewing or causing too much time to remain after completing the preparation, and it is therefore necessary to adjust X to an appropriate time.

Figure 29:
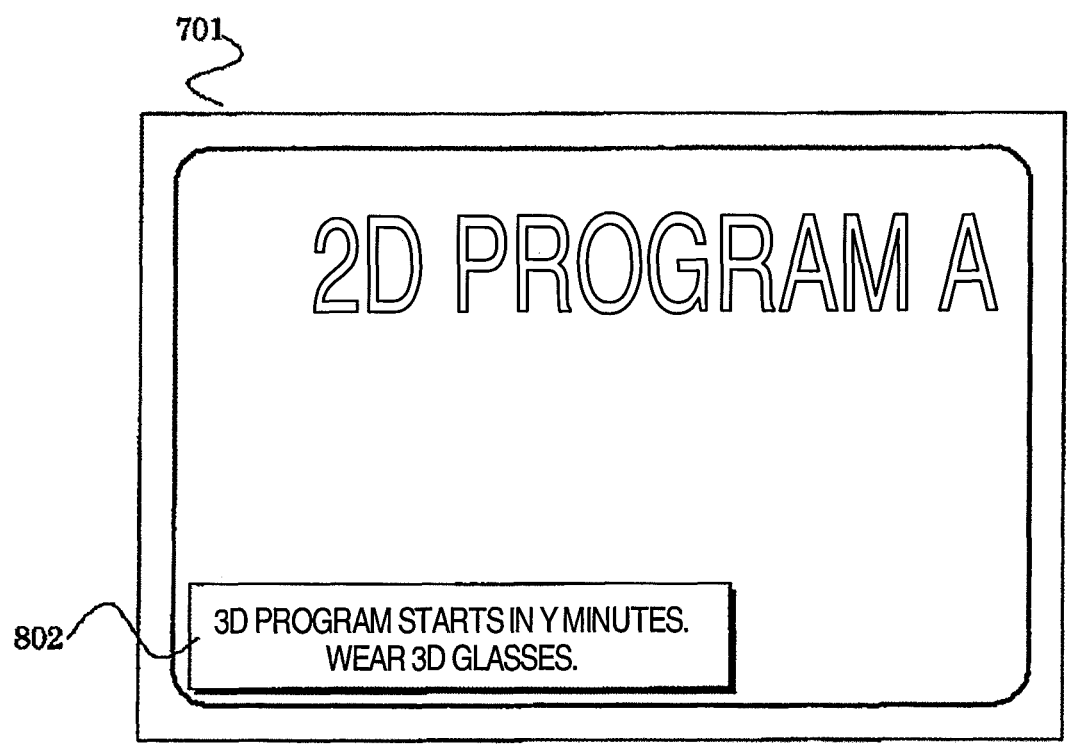
FIG. 29 shows an example of message display.

Furthermore, when a message is displayed to the user, the start time of the next program may be displayed more specifically. FIG. 29 shows an example of screen display in that case. Reference numeral 802 denotes a message indicating the time until the 3D program starts. Here, the time is indicated in minutes, but the time may also be indicated in seconds. In that case, the user can know a more detailed start time of the next program, but there is also a demerit of increasing the processing load.

FIG. 29 shows an example where the time until the 3D program starts is displayed, but the time at which the 3D program starts may also be displayed. When the 3D program starts at 9 pm, a message indicating "3D program starts at 9 pm, so please wear 3D glasses" may be displayed. Displaying such a message allows the user to know the start time of the next program and prepare for 3D viewing at an appropriate pace.

Figure 30:
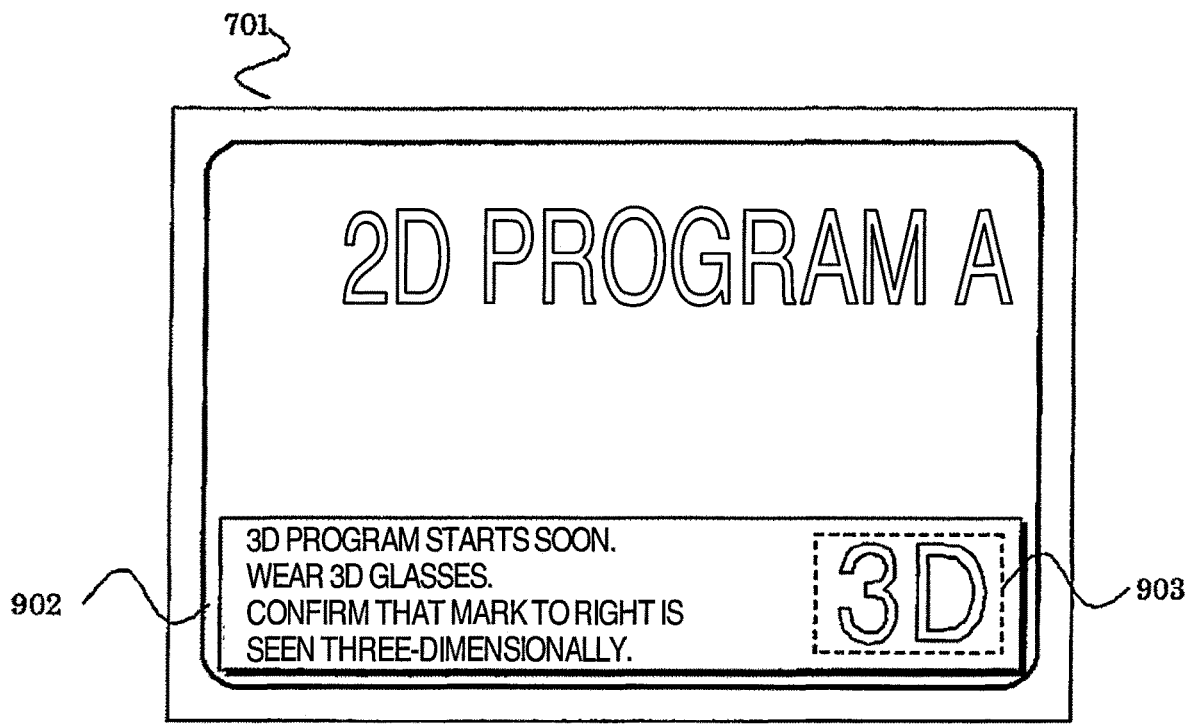
FIG. 30 shows an example of message display.

Furthermore, as shown in FIG. 30, it may be possible to add a mark (3D check mark) that is seen three-dimensionally when the user is wearing the 3D auxiliary viewing device. Reference numeral 902 denotes a message predicting that the 3D program will start, and 903 denotes the mark that is seen three-dimensionally when the user is wearing the 3D auxiliary viewing device. This allows the user to check whether the 3D auxiliary viewing device normally operates or not before the 3D program starts. If, for example, a problem (e.g., battery shortage, malfunction or the like) occurs in the 3D auxiliary viewing device, measures such as repair, replacement can be taken by the time the program starts.

Next, after the user is notified that the next program is 3D, a method of deciding the state as to whether the user's preparation for 3D viewing has completed or not (3D viewing preparation status) and switching the video of the 3D program to 2D display or 3D display will be described.

Figure 31:
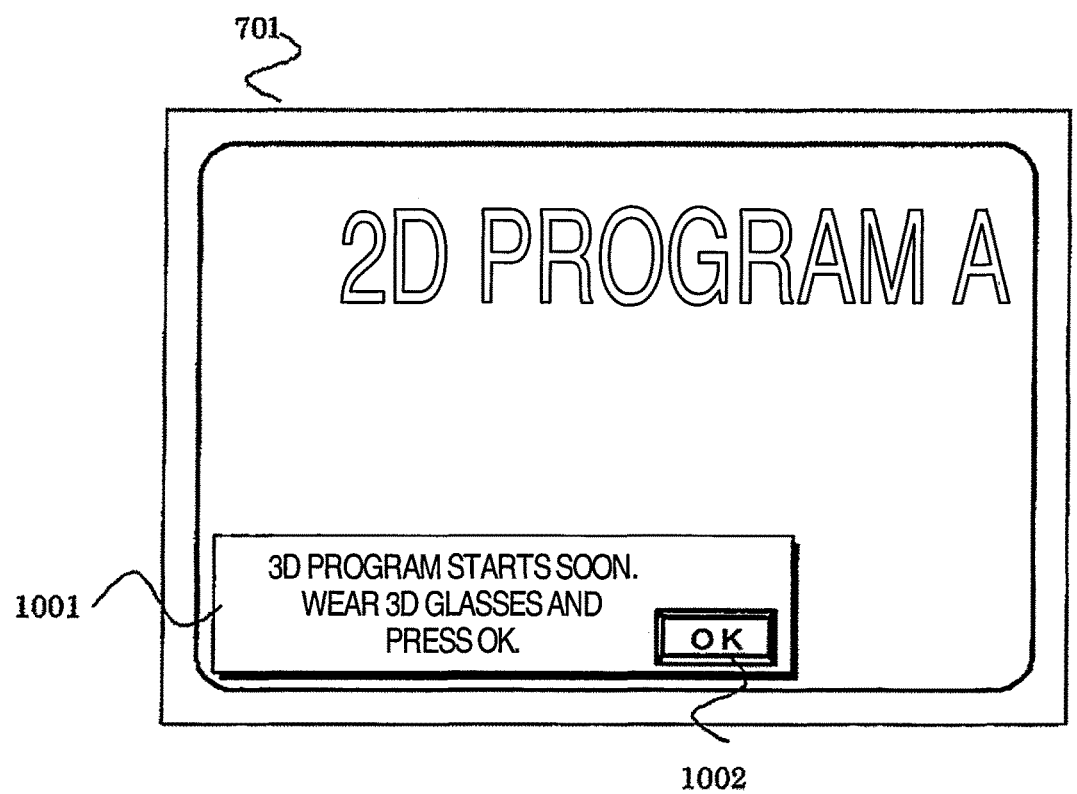
FIG. 31 shows an example of message display.

The method of notifying the user that the next program is 3D has been described above. However, the method is different in that an object (hereinafter referred to as user response receiving object; for example, button on the OSD) is displayed whereby the user makes a response about the message displayed to the user in step S104. FIG. 31 shows an example of this message.

Reference numeral 1001 denotes an entire message and 1002 denotes a button for the user to make a response. When the message 1001 in FIG. 31 is displayed, if, for example, the user presses the "OK" button of the remote controller, the user instruction reception unit 52 notifies the system control unit 51 that "OK" has been pressed.

Figure 32:
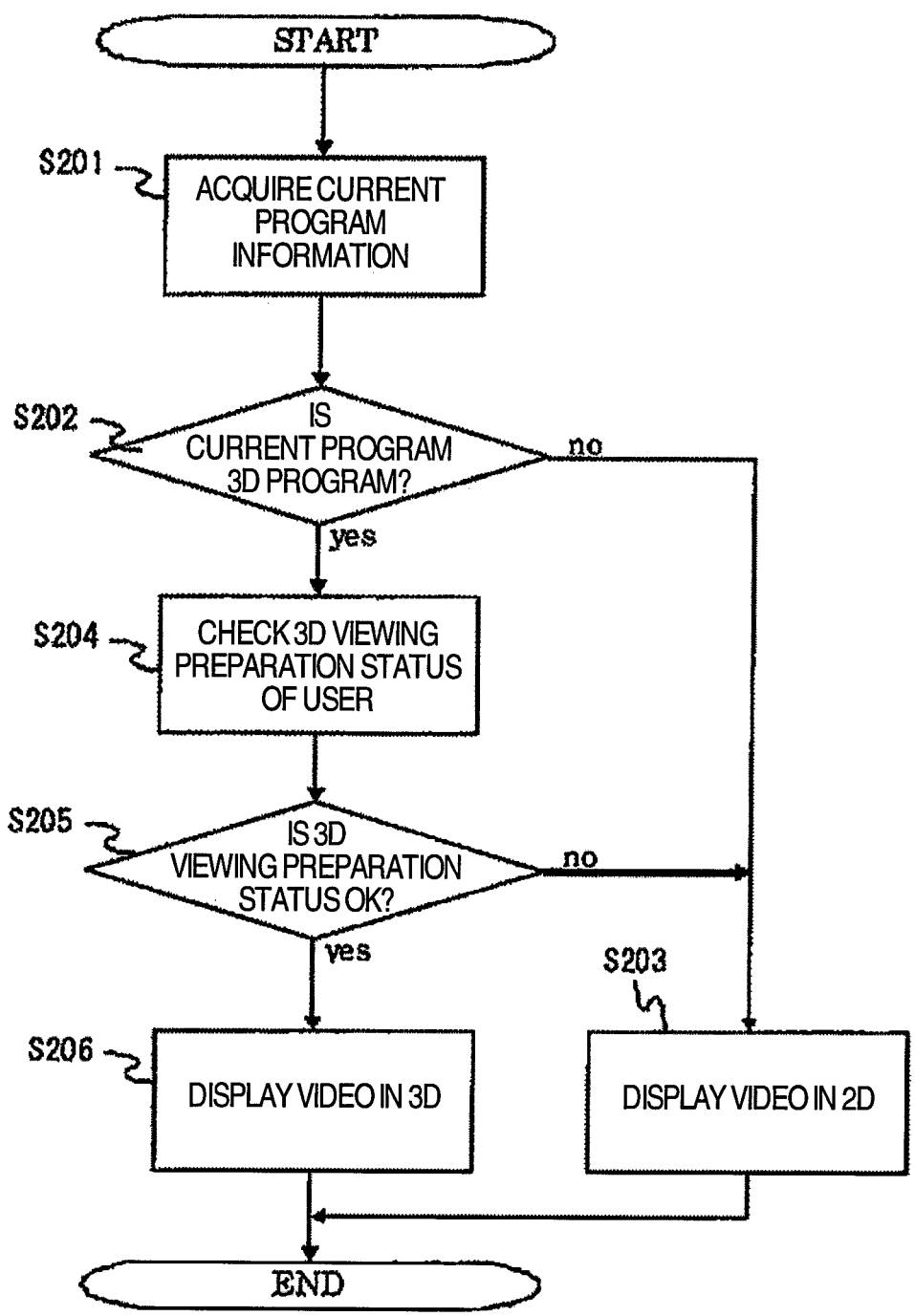
FIG. 32 shows an example of a flowchart of the system control unit when the next program starts.

The system control unit 51 that has received the notification saves the fact that the 3D viewing preparation status of the user is OK as a status. Next, a processing flow of the system control unit 51 when a time has elapsed and the current program becomes a 3D program will be described using FIG. 32.

The system control unit 51 acquires program information of the current program from the program information analysis unit 54 (S201) and decides whether the current program is a 3D program or not using the above-described 3D program deciding method. When the current program is not a 3D program (no in S202), the system control unit 51 performs control so that the video is displayed in 2D using the above-described method (S203).

When the current program is a 3D program (yes in S202), the 3D viewing preparation status of the user is checked next (S204). When the 3D viewing preparation status saved by the system control unit 51 is not OK (no in S205), control is performed so that the video is likewise displayed in 2D (S203).

When the 3D viewing preparation status is OK (yes in S205), control is performed so that the video is displayed in 3D using the above-described method (S206). When it is possible to confirm in this way that the current program is a 3D program and the user has completed preparations for 3D viewing, the video is displayed in 3D.

Figure 33:
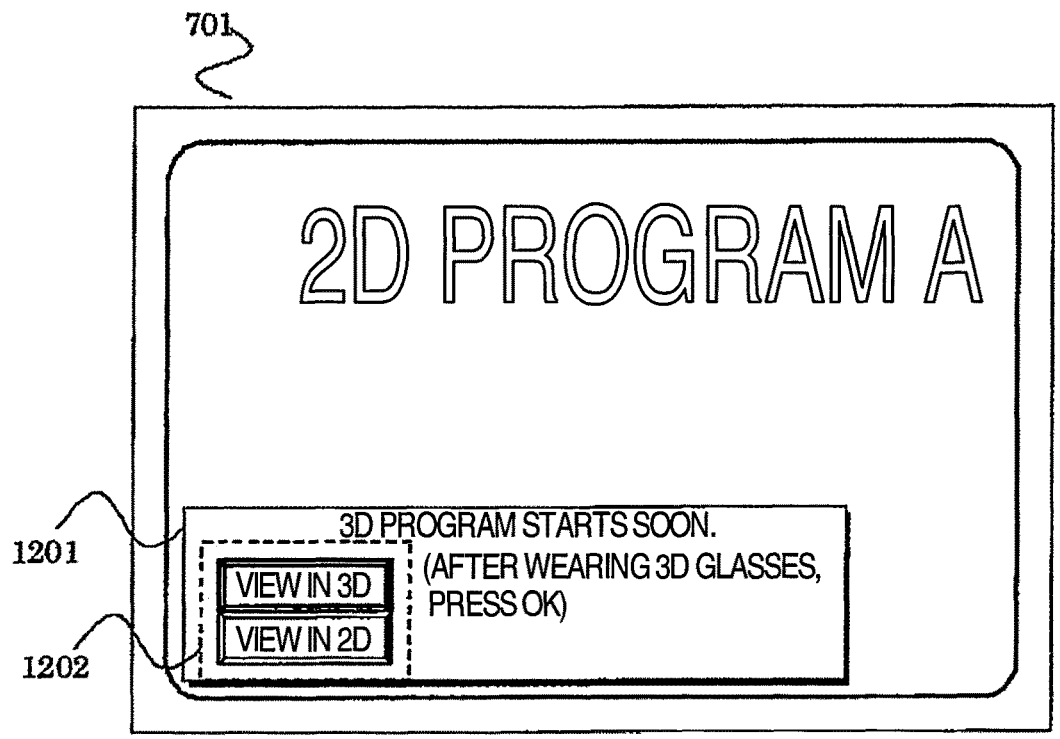
FIG. 33 shows an example of message display.
Figure 34:
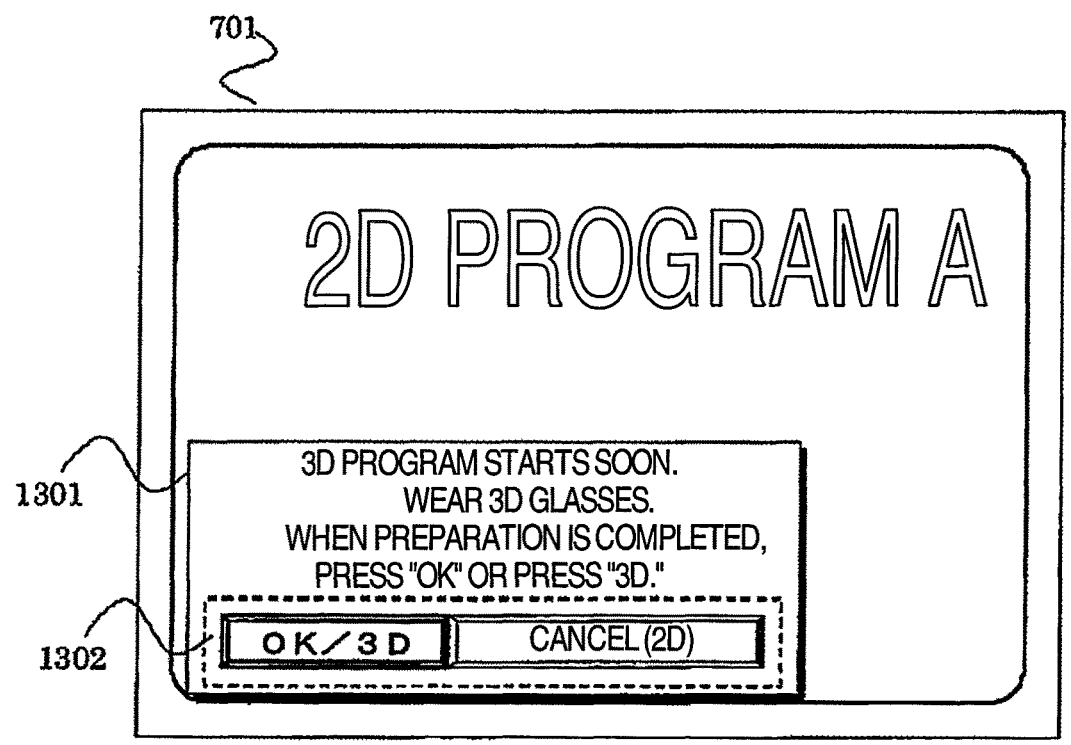
FIG. 34 shows an example of message display.

As the message display shown in step S104, a method may be considered which not only places OK as shown in FIG. 31 but also specifies whether the display scheme of the next program should be 2D video or 3D video. FIG. 33 and FIG. 34 show examples of the message and user response receiving object in that case.

This allows the user to more easily decide the operation after pressing the button compared to the display of "OK" and moreover allows the user to explicitly instruct the display in 2D (when the "View in 2D" button shown by 1202 is pressed, the user 3D viewing preparation status is judged NG), which improves the convenience.

Furthermore, the 3D viewing preparation status of the user is decided through the operation of the user menu using the remote controller here, but other methods may also be used such as deciding the 3D viewing preparation status based on, for example, a user wearing completion signal transmitted from the 3D auxiliary viewing device or taking a picture of the viewing state of the user using an image pickup device, recognizing the image and recognizing the user's face based on the image taking result and deciding that the user is wearing the 3D auxiliary viewing device.

Introducing such a deciding method can save the user time and trouble of performing certain operation on the reception device, and further avoid any misoperation such as erroneously setting 2D video viewing and 3D video viewing.

Furthermore, another method may be a method that decides the 3D viewing preparation status as OK when the user presses the <3D> button of the remote controller and decides the 3D viewing preparation status as NG when the user presses the <2D> button or <Return> button or <Cancel> button of the remote controller. In this case, the user can clearly and easily notify his/her status to the device, but there may also be a demerit of status transmission or the like caused by misoperation or misunderstanding.

Furthermore, in the above example, instead of acquiring information of the current program, processing may be performed by deciding only the program information of the next program acquired beforehand. In this case, instead of deciding in step S201 of FIG. 32 whether the current program is a 3D program or not, a method using program information acquired beforehand (e.g., step S101 in FIG. 27) may also be adopted. In this case, there can be a merit that the processing structure becomes simpler or the like, whereas there is also a demerit that 3D video switching processing may be executed even when the program configuration is suddenly changed and the next program ceases to be a 3D program.

The message display to each user described in the present embodiment is preferably erased after the user operation. In that case, there is a merit that video viewing becomes easier after the user performs that operation. Furthermore, even after a lapse of certain time, erasing the message assuming that the user already recognizes information of the message and making video viewing easier may likewise enhance the convenience of the user.

According to the embodiment described above, regarding the 3D program starting portion, the user can complete preparations for 3D viewing beforehand or if the user cannot complete preparations for 3D viewing by the time the program starts, the recording/playback function may be used to display the video again after the user completes preparations for 3D viewing, and the user can thereby view the 3D program in a better condition. Furthermore, it is possible to automatically switch the video display to a display method assumed to be desirable for the user (3D video display when 3D video viewing is desired or 3D video viewing when 3D video display is desired), thus making it possible to enhance the convenience of the user.

Furthermore, similar effects can be expected when switching is made to a 3D program by tuning or when playback of a recorded 3D program starts.

An example has been described above where the 3D program detail descriptors described in FIG. 10(a) are transmitted, arranged in a table such as PMT (Program Map Table) or EIT (Event Information Table). Instead of or in addition to this, information contained in the 3D program detail descriptors may be stored in a user data region which is coded together with video at the time of video coding or in an additional information region, and transmitted. In this case, such information is included in a video ES of the program.

Examples of the information to be stored include 3d_2d_type (3D/2D type) information described in FIG. 10(b) and 3_method_type (3D mode type) information described in FIG. 11. The 3d_2d_type (3D/2D type) information and 3d_method_type (3D mode type) information may be stored as different pieces of information or identification whether video is 3D video or 2D video and identification to which 3D mode the 3D video belongs may be combined together as identification information.

To be more specific, when the video coding scheme is an MPEG2 scheme, the above-described 3D/2D type information or 3D mode type information may be included in the user data region that follows Picture header and Picture Coding Extension, and coded.

Furthermore, when the video coding scheme is an H.264/AVC scheme, the above-described 3D/2D type information or 3D mode type information may be included in the additional information (supplemental enhancement information) region included in the access unit, and coded.

Transmitting information indicating the type of 3D video/2D video or information indicating the type of the 3D mode in the coding layer of video in an ES in this way provides an effect that it is possible to identify video in frame (picture) units.

In this case, the above-described identification is made possible in units shorter than those when stored in PMT (Program Map Table), and it is thereby possible to improve the response speed of the receiver with respect to switching of 3D video/2D video in the video transmitted and further suppress noise or the like that may be generated at the time of 3D video/2D video switching.

Furthermore, if none of the above-described 3D program detail descriptors is arranged in PMT (Program Map Table) and the above-described information is stored in a video coding layer to be coded together with video at the time of video coding, when a conventional 2D broadcasting station newly starts 2D/3D mixed broadcasting, for example, the broadcasting station side may adopt a configuration in which only the encoding unit 12 in the transmission device 1 in FIG. 2 is newly made compatible with 2D/3D mixed broadcasting, and the configuration of PMT (Program Map Table) added by the management information adding unit 16 need not be changed and 2D/3D mixed broadcasting can be started at lower cost.

When 3D-related information (information identifying 3D/2D in particular) such as 3_d_2d_type (3D/2D type) information or 3d_method_type (3D mode type) information is not stored in a predetermined region such as a user data region coded together with video at the time of video coding or additional information region, the receiver may be configured so as to decide that the video is 2D video. In this case, the broadcasting station can omit storage of such information during coding processing for 2D video and can thereby reduce processing man-hours in broadcasting.

Cases have been described above as examples of arranging identification information identifying 3D video in program (event) units or service units, where the identification information is included in program information of component descriptors, component group descriptors, service descriptors, service list descriptors or the like and where 3D program detail descriptors are newly provided. Furthermore, these descriptors are included in tables such as PMT, EIT [schedule basic/schedule extended/present/following], NIT, SDT, and transmitted.

Moreover, information of the 3D transmission scheme of a target event (program) may be displayed.

Furthermore, the receiver that has received the above EIT can search a program not containing 3D video, a program containing 3D video and can be played back in 3D by the present receiver, a program that contains 3D video but cannot be played back in 3D by the present receiver or the like, and can display corresponding programs in list form or the like.

Furthermore, the receiver can also search a program for each 3D transmission scheme for programs containing 3D video and also display programs in list form for each 3D transmission scheme. A search for a program that contains 3D video but cannot be played back in 3D or a program search for each 3D transmission scheme are effective, for example, when 3D video cannot be played back by the present receiver but can be played back by another 3D video program player owned by the user. This is because even in the case of a program containing 3D video that cannot be played back by the present receiver, the program may be outputted from the video output unit of the present receiver to the other 3D video program player in the same transport stream format, and the received transport stream format program can be played back in 3D, and if the present receiver is provided with a recording unit that records content onto a removable media, it is possible to record the program onto the removable media and play back the program recorded on the removable media in 3D using the other 3D video program player.

REFERENCE SIGNS LIST

1 Transmission device
2 Relay device
3 Network
4 Reception device
10 Recording/playback unit
11 Source generator
12 Encoding unit
13 Scrambling unit
14 Modulation unit
15 Transmission antenna section
16 Management information
17 Encryption unit
18 Communication path coding unit
19 Network I/F unit
21 CPU
22 General-purpose bus
23 Tuner
24 Descrambler
25 Network I/F
26 Recording medium
27 Recording/playback unit
29 Demultiplexing unit
30 Video decoding unit
31 Sound decoding unit
32 Video conversion processing unit
33 Control signal transmission/reception unit
34 Timer
41 Video output unit
42 Audio output unit
43 Control signal output unit
44 Machine control signal transmission
45 User operational input
46 High-speed digital interface
47 Display
48 Speaker
51 System control unit
52 User instruction reception unit
53 Machine control signal transmission unit
54 Program information analysis unit
55 Time management unit
56 Network control unit
57 Decoding control unit
58 Recording/playback control unit
59 Tuning control unit
60 OSD creation unit
61 Video conversion control unit

The invention claimed is:

1. A reception device comprising:
a receiver that receives video program content and video program information to be broadcast or to be delivered, the video program information relating to the video program content;
a display control unit configured to control display of an electronic program guide based on the video program information received by the receiver and to control switch of states to display a 2D video or a 3D video of video data of the video program content received by the receiver; and
a microprocessor that controls the receiver and the display control unit,
wherein the video program information includes first identification information and second identification information, the first identification information indicating whether the video program content is a 2D video content or a 3D video content, and the second identification information indicating a first state or a second state if the video program content is the 3D video content, the first state indicating that different videos for different viewpoints are included in a single video data stream, and the second state indicating that different videos for different viewpoints are included in different video data streams and the respective coding schemes of the different video data streams are different,
wherein the video program information includes:
third identification information for identifying an arrangement scheme of the different images for different viewpoints in the single video data stream and fourth identification information for identifying a coding scheme of the single video data stream if the second identification information indicates the first state, or
the fourth identification information for identifying a coding scheme of one of the video data streams for a main viewpoint and a coding scheme of the other of the video data streams for a different viewpoint if the second identification information indicates the second state,
wherein the display control unit is configured to:
convert at least a part of video data of the received video program content based on the first identification information, the second identification information, the third identification information and the fourth identification information to display a 2D video or a 3D video,
display information indicating the 3D video program content on the electronic program guide to be displayed based on the video program information if the first identification information indicates the video program content is a 3D video content, and display information indicating the second state on the electronic program guide if the second identification information indicates the second state.

2. The reception device according to claim 1,
wherein the first identification information further comprises information identifying a 3D mode of the video program content,
when the display unit that displays the video program content is not compatible with the 3D mode indicated in the first identification information, the microprocessor performs display control indicating the incompatibility.

3. A display control method comprising:
a receiving step of receiving, by a receiver, video program content and video program information to be broadcast or to be delivered, the video program information relating to the video program content; and
displaying, by a display control unit on a display, an electronic program guide based on the video program information received by the receiver and controlling, by the display control unit, switch of states to display a 2D video or a 3D video of video data of the video program content received by the receiver,
wherein the video program information includes first identification information and second identification information, the first identification information indicating whether the video program content is a 2D video content or a 3D video content, and the second identification information indicating a first state or a second state if the video program content is the 3D video content, the first state indicating that different videos for different viewpoints are included in a single video data stream, and the second state indicating that different videos for different viewpoints are included in different video data streams, and the respective coding schemes of the different video data streams are different,
wherein the video program information includes:
third identification information for identifying an arrangement scheme of the different images for different viewpoints in the single video data stream and fourth identification information for identifying a coding scheme of the single video data stream if the second identification information indicates the first state, or
the fourth identification information for identifying a coding scheme of one of the video data stream for a main viewpoint and a coding scheme of the other of the video data streams for a different viewpoint if the second identification information indicates the second state, and
wherein the method further comprises steps of:
converting, by the display control unit, at least a part of video data of the received video program content based on the first identification information, the second identification information, the third identification information and the fourth identification information to display a 2D video or a 3D video;
and displaying, by the display control unit, information indicating the 3D video program content on the electronic program guide to be displayed based on the video program information if the first identification information indicates the video program content is a 3D video content, and display information indicating the second state on the electronic program guide if the second identification information indicates the second state.

4. The display control method according to claim 3,
wherein the first identification information further comprises information identifying a 3D mode of the video program content, and
wherein in the display control step, when the video program content is not compatible with the 3D mode indicated in the first identification information, generating a display indicating an incompatibility.

5. The reception device according to claim 1,
wherein the program information includes program information on a video program content currently broadcasted or delivered and program information on a video program content to be broadcasted or delivered next to a currently broadcasted or delivered video program content, the program information on the video program content currently broadcasted or delivered includes the first identification information for the video program content currently broadcasted or delivered, the program information on the video program content to be broadcasted or delivered next to a currently broadcasted or delivered video program content includes the first identification information for the video program content to be broadcasted or delivered next to a currently broadcasted or delivered video program content, the microprocessor is configured to display that the currently broadcasted or delivered video program content is a 3D program content according to the first identification information for the currently broadcasted or delivered video program content and to display that the program content to be broadcasted or delivered next is a 3D program content according to the first identification information for the next broadcasted or delivered video program content.

6. The reception device according to claim 1,
wherein the microprocessor, under the first control state, identifies the 2D video or the 3D video for each program using the first identification information for displaying the identified result, and
under the second control state, switches between a 2D display state and a 3D display state in a frame unit using the second identification information.

7. The reception device according to claim 1,
wherein the first identification information comprises 3D mode identification information identifying a 3D mode in a 3D video included in the video program content when the video program content includes a 3D video, and
the microprocessor displays the 3D mode of the 3D video included in the video program content using the 3D mode identification information included in the first identification information.

8. The reception device according to claim 1,
wherein the second identification information in the video elementary stream comprises 3D mode identification information identifying a 3D mode in a 3D video included in the video program content when the video program content includes a 3D video, and
the microprocessor performs a video conversion process according to the 3D mode identification information included in the second identification information in the video elementary stream when switching the program content from a 2D display status to a 3D display status.

9. The display control method according to claim 3,
wherein the program information includes program information on a video program content currently broadcasted or delivered and program information on a video program content to be broadcasted or delivered next to a currently broadcasted or delivered video program content,
the program information on the video program content currently broadcasted or delivered includes the first identification information for the video program content currently broadcasted or delivered,
the program information on the video program content to be broadcasted or delivered next to a currently broadcasted or delivered video program content includes the first identification information for the video program content to be broadcasted or delivered next to a currently broadcasted or delivered video program content, the display control step further comprising displaying that a currently broadcasted or delivered video program content is a 3D program content according to the first identification information for the currently broadcasted or delivered video program content and displaying that the program content to be broadcasted or delivered next is a 3D program content according to the first identification information for the next broadcasted or delivered video program content.

10. The display control method according to claim 9,
wherein the display control step further comprises:
under the first control state, identifying the 2D video or the 3D video for each program using the first identification information for displaying the identified result, and
under the second control state, switching between a 2D display state and a 3D display state in a frame unit using the second identification information.

11. The display control method according to claim 3,
wherein the first identification information comprises 3D mode identification information identifying a 3D mode in a 3D video included in the video program content when the video program content includes a 3D video, and
the 3D mode of the 3D video included in the 3D program contents is displayed using the video mode identification information included in the first identification information in the display control step.

12. The display control method according to claim 3,
wherein the second identification information in the video elementary stream comprises 3D mode identification information for identifying a 3D mode in a 3D video included in the video program content when the program content includes a 3D video, and
a video conversion process is performed according to the 3D mode identification information included in the second identification information in the video elementary stream when switching the program content from a 2D display status to a 3D display status in the display control step.

13. The reception device according to claim 1,
wherein when the second identification information for a frame of a video does not exist in the received video elementary stream under the second control state, the microprocessor determines that the video in the video elementary stream is a 2D video and controls the display unit to output the video as the 2D video.

14. The display control method according to claim 3,
wherein when the second identification information for a frame of a video does not exist in the received video elementary stream under the second control state, the microprocessor determines that the video in the video elementary stream is a 2D video and controls the display unit to output the video as the 2D video.

15. The reception device according to claim 1,
wherein, if the second identification information indicates the second state, the coding scheme of the video data stream for the different viewpoint is a coding scheme with a higher compressibility than the coding scheme of the video data stream for the main viewpoint.

16. The reception device according to claim 1,
wherein the following coding scheme of video data stream are a same or compatible:
(1) the coding scheme of the single video data stream if the first identification information indicates the video program content is a 3D video content and the second identification information indicates the first state, (2) the coding scheme of the video data stream for the main viewpoint if the first identification information indicates the video program content is a 3D video content and the second identification information indicates the second state, and (3) the coding scheme of the video data stream if the first identification information indicates the video program content is a 2D video content.

17. The reception device according to claim 16,
wherein the coding scheme of video data stream is Moving Picture Experts Group (MPEG)-2 or H.264 Advanced Video Coding (AVC) coding scheme for video data or a compatible coding scheme with the MPEG2 or H.264 AVC coding scheme.

18. The display control method according to claim 3,
wherein, if the second identification information indicates the second state, the coding scheme of the video data stream for the different viewpoint is a coding scheme with a higher compressibility than the coding scheme of the video data stream for the main viewpoint.

19. The display control method according to claim 3,
wherein the following coding scheme of video data stream are a same or compatible:
(1) the coding scheme of the single video data stream if the first identification information indicates the video program content is a 3D video content and the second identification information indicates the first state,
(2) the coding scheme of the video data stream for the main viewpoint if the first identification information indicates the video program content is a 3D video content and the second identification information indicates the second state, and
(3) the coding scheme of the video data stream if the first identification information indicates the video program content is a 2D video content.

20. The display control method according to claim 19,
wherein the coding scheme of video data stream is Moving Picture Experts Group (MPEG)-2 or H.264 Advanced Video Coding (AVC) coding scheme for video data or a compatible coding scheme with the MPEG2 or H.264 AVC coding scheme.

\* \* \* \* \*